(12) United States Patent
Tonami

(10) Patent No.: US 6,445,662 B1
(45) Date of Patent: Sep. 3, 2002

(54) REPRODUCING APPARATUS

(75) Inventor: Junichiro Tonami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/468,130

(22) Filed: Dec. 21, 1999

(30) Foreign Application Priority Data

Dec. 24, 1998 (JP) ............ 10-366746
Jun. 22, 1999 (JP) ............ 11-175972
Jun. 22, 1999 (JP) ............ 11-175973
Aug. 2, 1999 (JP) ............ 11-218715
Oct. 13, 1999 (JP) ............ 11-291634

(51) Int. Cl.⁷ ............ G11B 5/09
(52) U.S. Cl. ............ 369/59.21; 369/124.05
(58) Field of Search ............ 369/59.17, 59.19, 369/59.2, 59.21, 59.22; 124/124.05, 124.07, 124.11, 124.14, 124.15, 53.35, 47.18, 47.35

(56) References Cited

U.S. PATENT DOCUMENTS

| | | | |
|---|---|---|---|
| 5,355,356 A | * 10/1994 | Johann et al. | 360/51 |
| 5,461,604 A | * 10/1995 | Hasegawa | 369/124.05 |
| 5,561,647 A | 10/1996 | Kayanuma | |
| 5,583,706 A | 12/1996 | Dudley et al. | |
| 5,677,802 A | * 10/1997 | Saiki et al. | 360/51 |
| 5,805,619 A | 9/1998 | Gardner et al. | |
| 5,835,467 A | 11/1998 | Tomita et al. | |
| 6,052,350 A | * 4/2000 | Kura | 369/59.15 |
| 6,118,746 A | * 9/2000 | Verboom | 369/59.21 |
| 6,167,008 A | * 12/2000 | Kuribayashi | 369/53.3 |
| 6,198,587 B1 | * 3/2001 | Hayashi | 369/124.13 |
| 6,278,675 B1 | * 8/2001 | Kuribayashi et al. | 369/59.17 |
| 6,295,316 B1 | * 9/2001 | Tonami et al. | 369/59.15 |
| 6,304,538 B1 | * 10/2001 | Hayashi | 369/124.05 |
| 6,307,822 B1 | * 10/2001 | Shim et al. | 369/59.21 |
| 6,314,074 B1 | * 11/2001 | Kuribayashi | 369/124.05 |

FOREIGN PATENT DOCUMENTS

| | | |
|---|---|---|
| EP | 0881639 A2 | 12/1998 |
| JP | 5-191213 | 7/1993 |
| JP | 7-192270 | 7/1995 |
| JP | 10-106161 | 4/1998 |

* cited by examiner

Primary Examiner—Thang V. Tran
(74) Attorney, Agent, or Firm—Louis Woo

(57) ABSTRACT

A reproducing apparatus includes a first device for reproducing a signal of a run-length-limited code from a recording medium. A transversal filter subjects the signal reproduced by the first device to a partial-response waveform equalization to generate an equalization-resultant signal. The partial-response waveform equalization depends on tap coefficients. A second device operates for detecting whether or not the signal reproduced by the first device corresponds to a zero-cross point, and generating 0-point information in response to a result thereof. A delay circuit responsive to the 0-point information generated by the second device operates for outputting at least three successive samples of the 0-point information. A temporary decision device operates for calculating a temporary decision value of the equalization-resultant signal on the basis of a PR mode signal, an RLL mode signal, the successive samples of the 0-point information which are outputted from the delay circuit, and an actual value of the equalization-resultant signal. The PR mode signal represents a type of the partial-response waveform equalization. The RLL mode signal represents a type of the run-length-limited code. A third device operates for calculating a difference between the temporary decision value of the equalization-resultant signal and the actual value thereof, and generating an error signal in response to the calculated difference. A fourth device operates for controlling the tap coefficients of the transversal filter in response to the error signal generated by the third device.

24 Claims, 44 Drawing Sheets

→ TIME

→ TIME

FIG. 9

| PR MODE / RLL MODE | | GAIN G | 1<br>PR(1,1) | 2<br>PR(1,1,1,1) | 3<br>PR(1,2,2,1) | 4<br>PR(1,3,3,1) | 5<br>PR(2,3,3,2) | 6<br>PR(3,4,4,3) |
|---|---|---|---|---|---|---|---|---|
| RLL(1, X) {M1-7, MMVF, MD2} | 2a+2b | | | | 6→+3 | 8→+4 | 10→+5 | 14→+7 |
| | a+2b | | | | 5→+2 | 7→+3 | 8→+3 | 11→+4 |
| | 2b | | | | 4→+1 | 6→+2 | 6→+1 | 8→+1 |
| | a+b | | | | 3→0 | 4→0 | 5→0 | 7→0 |
| | 2a | | | | 2→−1 | 2→−2 | 4→−1 | 6→−1 |
| | a | | | | 1→−2 | 1→−3 | 2→−3 | 3→−4 |
| | 0 | | | | 0→−3 | 0→−4 | 0→−5 | 0→−7 |
| | | GAIN G | A | A/2 | A/3 | A/4 | A/5 | A/7 |
| RLL(2, X) {EFM, EFMP, M8-15, PR} | 2a+2b | | | 4→+2 | 6→+3 | 8→+4 | 10→+5 | 14→+7 |
| | a+2b | | 2→+1 | 3→+1 | 5→+2 | 7→+3 | 8→+3 | 11→+4 |
| | a+b | | 1→0 | 2→0 | 3→0 | 4→0 | 5→0 | 7→0 |
| | a | | 0→−1 | 1→−1 | 1→−2 | 1→−3 | 2→−3 | 3→−4 |
| | 0 | | | 0→−2 | 0→−3 | 0→−4 | 0→−5 | 0→−7 |

REPRODUCING APPARATUS

BACKGROUND OF THE INVENTION

1. Field of the Invention

This invention generally relates to an apparatus for reproducing information from a recording medium. This invention specifically relates to an information reproducing apparatus including a waveform equalization circuit for processing a reproduced signal of a run-length-limited code.

2. Description of the Related Art

Japanese published unexamined patent application 10-106161 discloses an optical information reproducing apparatus based on a PRML (partial response maximum likelihood) system. In the apparatus of Japanese patent application 10-106161, information of a run-length-limited code is reproduced from an optical disc through a reproducing section, and a transversal filter subjects the reproduced waveform to partial-response equalization.

The output signal of the transversal filter is decoded into binary data by a maximum-likelihood decoder. The apparatus of Japanese patent application 10-106161 includes a parameter setting device which selects intersymbol-interference imparting values in the partial-response equalization in accordance with the characteristics of the reproduced waveform. Also, the parameter setting device sets tap coefficients of the transversal filter and a decision point signal level for the maximum-likelihood decoder as parameters in response to the selected intersymbol-interference imparting values.

The apparatus of Japanese patent application 10-106161 premises that the optical disc has predetermined pits (reference pits) representative of parameter-setting reference data.

Accordingly, the apparatus of Japanese patent application 10-106161 fails to implement suitable waveform equalization for an optical disc which lacks such predetermined pits.

Japanese published unexamined patent application 7-192270 discloses an apparatus for reproducing a digital signal of a run-length-limited code from an optical disc. The apparatus of Japanese patent application 7-192270 uses a method suited for a high information recording density. The method in Japanese patent application 7-192270 performs ternary equalization whose objects are only an amplitude except for points corresponding to a data train provided with a minimum code inverting gap among points just before or just after the inverting position of a code and an amplitude at the inverting position of the code.

In the apparatus of Japanese patent application 7-192270, a signal is read from an optical disc by an optical head, and the read signal is applied through an amplifier to an equalizer. A decider following the equalizer discriminates the level of the output signal of the equalizer. The decider includes two comparators. The output signals of the comparators are fed to an error calculation circuit as level discrimination results. Since the decider includes the two comparators, the signal processing by the decider and also an error calculation process are relatively complicated.

SUMMARY OF THE INVENTION

It is an object of this invention to provide an improved reproducing apparatus.

A first aspect of this invention provides a reproducing apparatus comprising first means for reproducing a signal of a run-length-limited code from a recording medium; a transversal filter subjecting the signal reproduced by the first means to a partial-response waveform equalization to generate an equalization-resultant signal, the partial-response waveform equalization depending on tap coefficients; second means for detecting whether or not the signal reproduced by the first means corresponds to a zero-cross point, and generating 0-point information in response to a result of said detecting; a delay circuit responsive to the 0-point information generated by the second means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means.

A second aspect of this invention is based on the first aspect thereof, and provides a reproducing apparatus wherein at least one of the PR mode signal and the RLL mode signal remains fixed.

A third aspect of this invention is based on the first aspect thereof, and provides a reproducing apparatus further comprising fifth means for subjecting the signal reproduced by the first means to a re-sampling process to generate a re-sampling resultant signal, and feeding the re-sampling resultant signal to the transversal filter.

A fourth aspect of this invention provides a reproducing apparatus comprising first means for reproducing a signal of a run-length-limited code from a recording medium; a transversal filter subjecting the signal reproduced by the first means to a partial-response waveform equalization to generate an equalization-resultant signal, the partial-response waveform equalization depending on tap coefficients; second means for detecting whether or not the equalization-resultant signal generated by the transversal filter corresponds to a zero-cross point, and generating 0-point information in response to a result of said detecting; a delay circuit responsive to the 0-point information generated by the second means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means.

A fifth aspect of this invention is based on the fourth aspect thereof, and provides a reproducing apparatus wherein the second means comprises means for detecting a polarity inversion of the equalization-resultant signal, means for selecting one of two samples of the equalization-resultant signal which are adjacent to the detected polarity inversion, the selected one of the samples being closer to a value of "0", and means for generating the 0-point information in response to the selected sample.

A sixth aspect of this invention is based on the fourth aspect thereof, and provides a reproducing apparatus further comprising fifth means for generating a signal representing a phase error between a bit clock signal and the zero-cross point of the equalization-resultant signal.

A seventh aspect of this invention is based on the first aspect thereof, and provides a reproducing apparatus wherein the type of the partial-response waveform equalization which is represented by the PR mode signal is expressed as PR (a, b, b, a), and the successive samples of the 0-point information are three successive samples, and wherein the temporary decision device comprises means for calculating a value P on the basis of the successive samples of the 0-point information, the value P being equal to (a+b)*·G when none of the successive samples of the 0-point information corresponds to a zero-cross point, the value P being equal to (b−a)*·G when each of the successive samples of the 0-point information except a central sample corresponds to a zero-cross point and a minimum transition interval represented by the RLL mode signal is equal to "2", the value P being equal to b*·G when each of the successive samples of the 0-point information except a central sample corresponds to a zero-cross point and the minimum transition interval represented by the RLL mode signal is not equal to "2", the value P being equal to b*·G when only one of the successive samples of the 0-point information except a central sample corresponds to a zero-cross point, means for calculating the temporary decision value on the basis of the calculated value P, and means for setting the temporary decision value equal to "0" when the central sample among the successive samples of the 0-point information corresponds to a zero-cross point, where "*" denotes related values resulting from offset to equalize a central value (a+b) to "0", and G denotes a gain factor.

An eighth aspect of this invention is based on the first aspect thereof, and provides a reproducing apparatus wherein the type of the partial-response waveform equalization which is represented by the PR mode signal is expressed as PR (a, b, b, a), and the successive samples of the 0-point information are five successive samples, and wherein the temporary decision device comprises means for calculating a value P on the basis of the successive samples of the 0-point information, the value P being equal to (a+b)*·G when none of second, third, and fourth samples among the successive samples of the 0-point information corresponds to a zero-cross point, the value P being equal to (b−a)*·G when only second and fourth samples among the successive samples of the 0-point information correspond to zero-cross points and a minimum transition interval represented by the RLL mode signal is equal to "2", the value P being equal to b*·G when only second and fourth samples among the successive samples of the 0-point information correspond to zero-cross points and the minimum transition interval represented by the RLL mode signal is not equal to "2", the value P being equal to b*·G when only one of second and fourth samples among the successive samples of the 0-point information corresponds to a zero-cross point, the value P being equal to b*·G when only first and fourth samples among the successive samples of the 0-point information corresponds to a zero-cross point, the value P being equal to b*·G when only second and fifth samples among the successive samples of the 0-point information corresponds to a zero-cross point, means for calculating the temporary decision value on the basis of the calculated value P, and means for setting the temporary decision value equal to "0" when a central sample among the successive samples of the 0-point information corresponds to a zero-cross point, where "*" denotes related values resulting from offset to equalize a central value (a+b) to "0", and G denotes a gain factor.

A ninth aspect of this invention is based on the first aspect thereof, and provides a reproducing apparatus further comprising an error selection circuit for extracting effective components from the first error signal in response to the temporary decision value, and generating a second error signal in response to the extracted effective components.

A tenth aspect of this invention is based on the first aspect thereof, and provides a reproducing apparatus further comprising an error selection circuit for extracting effective components from the first error signal in response to the successive samples of the 0-point information, and generating a second error signal in response to the extracted effective components.

An eleventh aspect of this invention is based on the first aspect thereof, and provides a reproducing apparatus wherein the type of the partial-response waveform equalization which is represented by the PR mode signal is expressed as PR (a, b, b, a), and the successive samples of the 0-point information are three successive samples, and wherein the temporary decision device comprises means for calculating a value P on the basis of the successive samples of the 0-point information, the value P being equal to (b−a)*·G when each of the successive samples of the 0-point information except a central sample corresponds to a zero-cross point and a minimum transition interval represented by the RLL mode signal is equal to "2", the value P being equal to b*·G when each of the successive samples of the 0-point information except a central sample corresponds to a zero-cross point and the minimum transition interval represented by the RLL mode signal is not equal to "2", the value P being equal to b*·G when only one of the successive samples of the 0-point information except a central sample corresponds to a zero-cross point, means for calculating the temporary decision value on the basis of the calculated value P, means for setting the temporary decision value equal to "0" when none of the successive samples of the 0-point information corresponds to a zero-cross point, and means for setting the temporary decision value equal to "0" when the central sample among the successive samples of the 0-point information corresponds to a zero-cross point, where "*" denotes related values resulting from offset to equalize a central value (a+b) to "0", and G denotes a gain factor.

A twelfth aspect of this invention is based on the first aspect thereof, and provides a reproducing apparatus wherein the type of the partial-response waveform equalization which is represented by the PR mode signal is expressed as PR (a, b, b, a), and the successive samples of the 0-point information are five successive samples, and wherein the temporary decision device comprises means for calculating a value P on the basis of the successive samples of the 0-point information, the value P being equal to (b−a)*·G when only second and fourth samples among the successive samples of the 0-point information correspond to zero-cross points and a minimum transition interval represented by the RLL mode signal is equal to "2", the value P being equal to b*·G when only second and fourth samples among the successive samples of the 0-point information correspond to zero-cross points and the minimum transition interval represented by the RLL mode signal is not equal to "2", the value P being equal to b*·G when only one of second and fourth samples among the successive samples of the 0-point information corresponds to a zero-cross point, the value P being equal to b*·G when only first and fourth samples among the successive samples of the 0-point information corresponds to a zero-cross point, the value P being equal to b*·G when only second and fifth samples among the successive samples of the 0-point information corresponds to a zero-cross point, means for calculating the temporary decision value on the basis of the calculated value P, means for setting the temporary decision value equal to "0" when none of second, third, and fourth samples among the successive samples of the 0-point information corresponds to a zero-cross point, and means for setting the temporary decision value equal to "0" when a central sample among the successive samples of the 0-point information corresponds to a zero-cross point, where "*" denotes related values resulting from offset to equalize a central value (a+b) to "0", and G denotes a gain factor.

A thirteenth aspect of this invention is based on the first aspect thereof, and provides a reproducing apparatus further comprising a first memory into which the signal reproduced by the first means is written in response to a bit clock signal, and from which the reproduced signal is read out in response to a new clock signal before being fed to the transversal filter, and a second memory into which the 0-point information generated by the second means is written in response to the bit clock signal, and from which the 0-point information is read out in response to a new clock signal before being fed to the delay circuit.

A fourteenth aspect of this invention is based on the fourth aspect thereof, and provides a reproducing apparatus further comprising a memory into which the signal reproduced by the first means is written in response to a bit clock signal, and from which the reproduced signal is read out in response to a new clock signal before being fed to the transversal filter.

A fifteenth aspect of this invention provides a reproducing apparatus comprising first means for reproducing a signal of a run-length-limited code from a recording medium; a subtracter for subtracting a DC offset signal from the signal reproduced by the first means to generate a subtraction-resultant signal; second means for subjecting the subtraction-resultant signal generated by the subtracter to a re-sampling process to generate a re-sampling resultant signal; third means for detecting whether or not the re-sampling resultant signal generated by the second means corresponds to a zero-cross point, and generating 0-point information in response to a result of said detecting; and an error calculator for selecting some signals from the re-sampling resultant signal in response to the 0-point information generated by the third means, and extracting 0-corresponding components and generating the DC offset signal in response to the selected 0-corresponding components and outputting the DC offset signal to the subtracter.

A sixteenth aspect of this invention provides a reproducing apparatus comprising first means for reproducing a signal of a run-length-limited code from a recording medium; second means for subjecting the signal reproduced by the first means to a re-sampling process to generate a re-sampling resultant signal; a subtracter for subtracting a DC offset signal from the re-sampling resultant signal generated by the second means to generate a subtraction-resultant signal; a transversal filter subjecting the subtraction-result signal generated by the subtracter to a partial-response waveform equalization to generate an equalization-resultant signal; third means for detecting whether or not the re-sampling resultant signal generated by the second means corresponds to a zero-cross point, and generating 0-point information in response to a result of said detecting; and an error calculator for selecting 0-corresponding components from the re-sampling resultant signal in response to the 0-point information generated by the third means, and generating the DC offset signal in response to the selected 0-corresponding components and outputting the DC offset signal to the subtracter.

A seventeenth aspect of this invention provides a reproducing apparatus comprising first means for reproducing a signal of a run-length-limited code from a recording medium; a subtracter for subtracting a DC offset signal from the signal reproduced by the first means to generate a subtraction-resultant signal; second means for subjecting the subtraction-resultant signal generated by the subtracter to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the error signal in response to one of the successive samples of the 0-point information, and generating the DC offset signal in response to the selected 0-corresponding components and outputting the DC offset signal to the subtracter.

An eighteenth aspect of this invention provides a reproducing apparatus comprising first means for reproducing a signal of a run-length-limited code from a recording medium; second means for subjecting the signal reproduced by the first means to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; a subtracter for subtracting a DC offset signal from the equalization-resultant signal generated by the transversal filter to generate a subtraction-resultant signal; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the error signal in response to one of the successive samples of the 0-point information, and generating the DC offset signal in response to the selected 0-corresponding components and outputting the DC offset signal to the subtracter.

A nineteenth aspect of this invention provides a reproducing apparatus comprising first means for reproducing a signal of a run-length-limited code from a recording medium; a subtracter for subtracting a DC offset signal from the signal reproduced by the first means to generate a subtraction-resultant signal; second means for subjecting the subtraction-resultant signal generated by the subtracter to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the error signal in response to the temporary decision value, and generating the DC offset signal in response to the selected 0-corresponding components and outputting the DC offset signal to the subtracter.

A twentieth aspect of this invention provides a reproducing a apparatus comprising first means for reproducing a signal of a run-length-limited code from a recording medium; second means for subjecting the signal reproduced by the first means to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; a subtracter for subtracting a DC offset signal from the equalization-resultant signal generated by the transversal filter to generate a subtraction-resultant signal; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the error signal in response to the temporary decision value, and generating the DC offset signal in response to the selected 0-corresponding components and outputting the DC offset signal to the subtracter.

A twenty-first aspect of this invention provides a reproducing apparatus comprising first means for reproducing a signal of a run-length-limited code from a recording medium; a subtracter for subtracting a DC offset signal from the signal reproduced by the first means to generate a subtraction-resultant signal; second means for subjecting the subtraction-resultant signal generated by the subtracter to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the equalization-resultant signal in response to at least one of the successive samples of the 0-point information, and generating the DC offset signal in response to the selected 0-corresponding components and outputting the DC offset signal to the subtracter.

A twenty-second aspect of this invention provides a reproducing apparatus comprising first means for reproducing a signal of a run-length-limited code from a recording medium; second means for subjecting the signal reproduced by the first means to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; a subtracter for subtracting a DC offset signal from the equalization-resultant signal generated by the transversal filter to generate a subtraction-resultant signal; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the equalization-resultant signal in response to one of the successive samples of the 0-point information, and generating the DC offset signal in response to the selected 0-corresponding components and outputting the DC offset signal to the subtracter.

A twenty-third aspect of this invention provides a reproducing apparatus comprising first means for reproducing a signal of a run-length-limited code from a recording medium; a subtracter for subtracting a DC offset signal from the signal reproduced by the first means to generate a subtraction-resultant signal; second means for subjecting the subtraction-resultant signal generated by the subtracter to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the equalization-resultant signal in response to the temporary decision value, and generating the DC offset signal in response to the selected 0-corresponding components and outputting the DC offset signal to the subtracter.

A twenty-fourth aspect of this invention provides a reproducing apparatus comprising first means for reproducing a signal of a run-length-limited code from a recording medium; second means for subjecting the signal reproduced by the first means to a re-sampling process to generate a re-sampling resultant signal; a transversal filter subjecting the re-sampling resultant signal generated by the second means to a partial-response waveform equalization to generate an equalization-resultant signal, the partial-response waveform equalization depending on tap coefficients; a subtracter for subtracting a DC offset signal from the equalization-resultant signal generated by the transversal filter to generate a subtraction-resultant signal; third means for detecting whether or not the re-sampling resultant signal corresponds to a zero-cross point, and generating 0-point information in response to a result of said detecting; a delay circuit responsive to the 0-point information generated by the third means for outputting at least three successive samples of the 0-point information; a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code; fourth means for calculating a difference between the temporary decision value of the equalization-resultant signal and the actual value thereof, and generating an error signal in response to the calculated difference; fifth means for controlling the tap coefficients of the transversal filter in response to the error signal generated by the fourth means; and an error calculator for selecting 0-corresponding components from the equalization-resultant signal in response to the temporary decision value, and generating the DC offset signal in response to the selected 0-corresponding components and outputting the DC offset signal to the subtracter.

BRIEF DESCRIPTION OF THE DRAWINGS

FIG. 9 is a diagram of the relation among PR (a, b, b, a) characteristics, RLL modes, and temporary decision result values.

DESCRIPTION OF THE PREFERRED EMBODIMENTS

A prior-art apparatus will be explained below for a better understanding of this invention.

Figure 1:
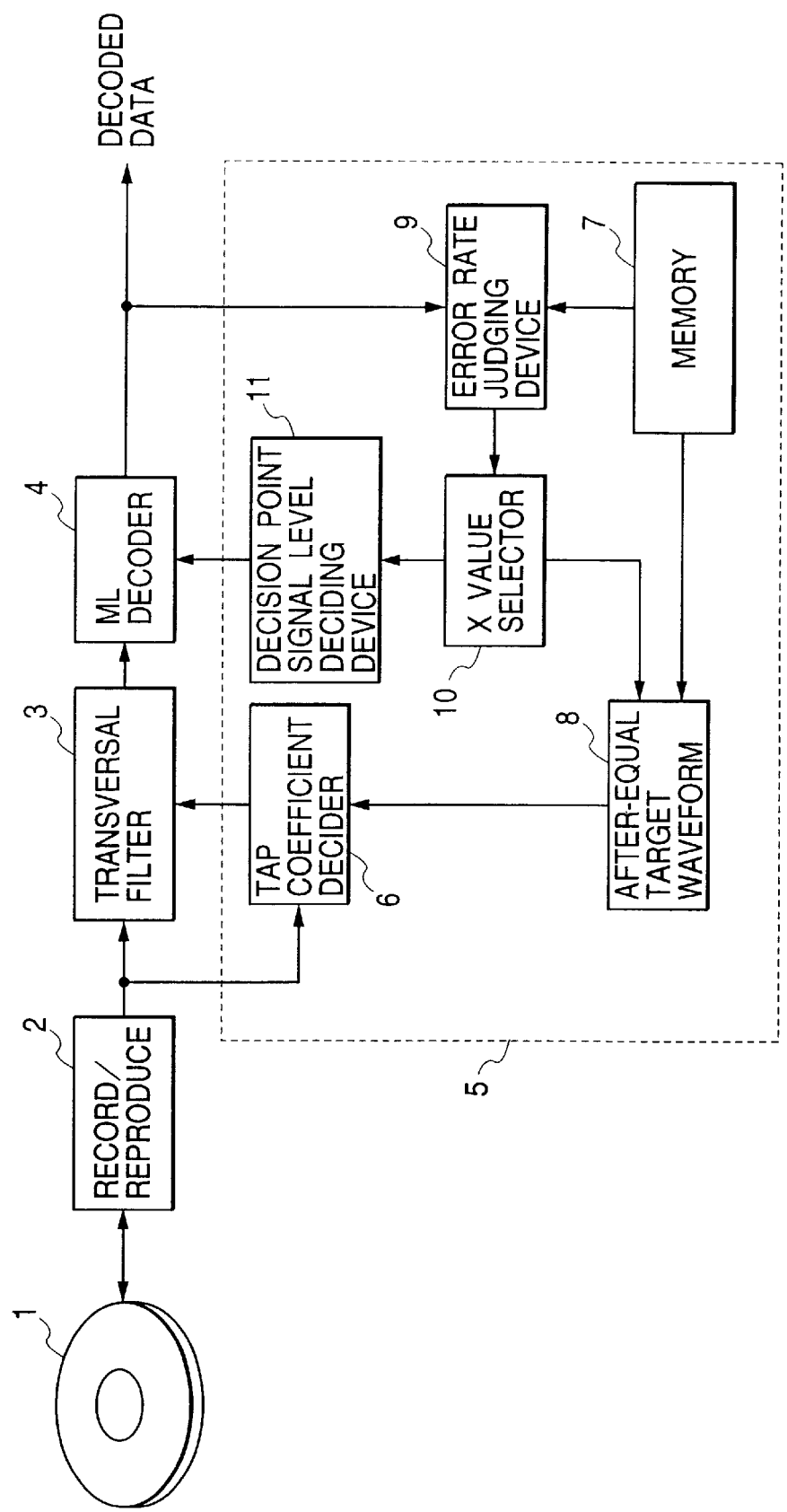
FIG. 1 is a block diagram of a prior-art reproducing apparatus.

FIG. 1 shows a prior-art reproducing apparatus disclosed in Japanese published unexamined patent application 10-106161. The prior-art apparatus in FIG. 1 includes a recording/reproducing section 2 which reproduces a signal of a run-length-limited code from an optical disc 1. The reproduced signal is fed to a transversal filter 3. The transversal filter 3 subjects the reproduced signal to partial-response (1, X, X, 1) waveform equalization on the basis of tap coefficients inputted from a tap coefficient deciding device 6 within a parameter setting device 5. The partial-response (1, X, X, 1) waveform equalization is shorted to the PR (1, X, X, 1) equalization.

In the prior-art apparatus of FIG. 1, the parameter setting device 5 includes an X-value selector 10 for selecting a value X, which is an intersymbol interference value in the PR (1, X, X, 1) equalization, on the basis of the characteristics of the reproduced waveform. Specifically, the X-value selector 10 sequentially determines values Xi (X1, X2, ...) in response to the result of judgment by an error rate judging device 9, and selects a value X from among them which causes the error rate to be within an allowable range. In the parameter setting device 5, a target after-equalization waveform generator 8 produces a target after-equalization waveform in response to parameter-setting binary data from a memory 7 and the X value selected by the X-value selector 10. The target after-equalization waveform generator 8 informs the tap coefficient setting device 6 of the target after-equalization waveform. The optical disc 1 has predetermined pits (reference pits) representing data corresponding to the parameter-setting binary data in the memory 7. The tap coefficient setting device 6 receives the output signal of the recording/reproducing section 2 which has a reproduced waveform originating from the predetermined pits. The tap coefficient setting device 6 calculates tap coefficients on the basis of the reproduced waveform and the target after-equalization waveform. The calculated tap coefficients are designed so that an actual after-equalization waveform corresponding to the reproduced waveform will agree with the target after-equalization waveform. The tap coefficient setting device 6 feeds the calculated tap coefficients to the transversal filter 3.

In the prior-art apparatus of FIG. 1, the parameter setting device 5 includes a decision point signal level deciding device 11 which is informed of the X value selected by the X-value selector 10. The device 11 calculates a decision point signal level on the basis of the selected X value. The device 11 feeds the calculated decision point signal level to a maximum-likelihood (ML) decoder 4.

The transversal filter 3 outputs a signal of an after-equalization reproduced waveform to the ML decoder 4. The device 4 decodes the after-equalization reproduced waveform into recovered binary data. The ML decoder 4 outputs the recovered binary data to an external device (not shown) and the error rate deciding device 9. The error rate deciding device 9 receives the parameter-setting binary data from the memory 7. The error rate deciding device 9 compares the recovered binary data with the parameter-setting binary data, thereby calculating an error rate. The device 9 decides whether or not the calculated error rate is within a predetermined allowable range. The error rate deciding device 9 informs the X-value selector 10 of the decision result. When the device 9 decides that the calculated error rate is within the predetermined allowable range, the present tap coefficients and the present decision point signal level are latched. In a later stage, the latched tap coefficients and decision point signal level will be used in the PR equalization and the ML decoding process according to a PR (1, X, X, 1) ML system.

The prior-art apparatus of FIG. 1 premises that the optical disc 1 has predetermined pits (reference pits) representing data corresponding to the parameter-setting binary data in the memory 7. Accordingly, the prior-art apparatus of FIG. 1 fails to implement suitable waveform equalization for an optical disc which lacks such predetermined pits.

First Embodiment

Figure 2:
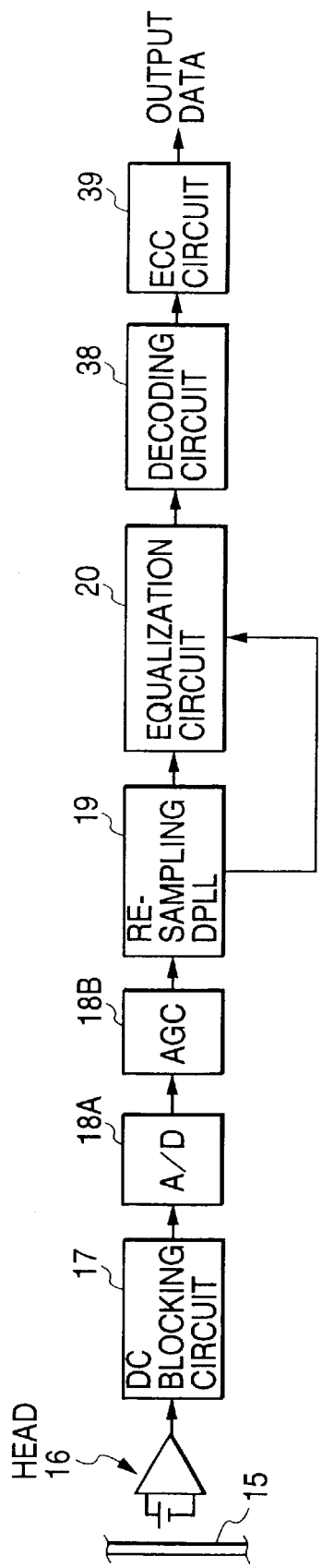
FIG. 2 is a block diagram of a reproducing apparatus according to a first embodiment of this invention.

FIG. 2 shows a reproducing apparatus according to a first embodiment of this invention. With reference to FIG. 2, an optical disc 15 stores a signal of a run-length-limited code at a predetermined high recording density. An optical head 16 reads out the signal of the run-length-limited code from the optical disc 15. The optical head 16 outputs the read-out signal to a direct-current blocking circuit (a DC blocking circuit) 17. The optical head 16 includes a photodetector, and an amplifier following the photodetector.

The circuit 17 blocks a direct-current component (a DC component) of the read-out signal, and passes only alternating-current components (AC components) thereof. The output signal of the DC blocking circuit 17 is applied to an A/D (analog-to-digital) converter 18A. The A/D converter 18A changes the output signal of the DC blocking circuit 17 into a corresponding digital signal. Specifically, the A/D converter 18A periodically samples the output signal of the DC blocking circuit 17 in response to a fixed-frequency system clock signal, and converts every resultant sample into a digital sample. The A/D converter 18A outputs the digital signal to a digital AGC (automatic gain control) circuit 18B. The AGC circuit 18B subjects the output signal of the A/D converter 18A to automatic gain control for providing a constant signal amplitude on a digital basis. The AGC circuit 18B outputs the resultant digital signal to a re-sampling DPLL section 19. The output signal of the AGC circuit 18B is referred to as a first digital signal. The position of the A/D converter 18A may be between the AGC circuit 18B and the re-sampling DPLL section 19, or between the optical head 16 and the DC blocking circuit 17.

The re-sampling DPLL section 19 converts the output signal (the first digital signal) of the AGC circuit 18B into a second digital signal. A timing related to samples of the output signal (the first digital signal) of the AGC circuit 18B is determined by the system clock signal. A timing related to samples of the second digital signal is determined by a bit clock signal synchronized with the system clock signal. Most of the timings related to samples of the second digital signal differ from those related to samples of the first digital signal by a phase of, for example, 180°. In general, the bit clock signal is a punctured clock signal and has a frequency equal to that of the system clock signal. The frequency of the bit clock signal may be different from that of the system clock signal. The re-sampling DPLL section 19 generates samples of the second digital signal from samples of the first digital signal through at least one of interpolation and decimation.

The re-sampling DPLL section 19 includes a digital PLL (phase locked loop) circuit having a closed loop. The digital PLL circuit in the re-sampling DPLL section 19 generates a second digital signal on the basis of the output signal of the AGC circuit 18B. The second digital signal relates to a sampling frequency equal to a bit clock frequency. In general, the bit clock signal is a punctured clock signal whose frequency is equal to the system clock frequency. The bit clock frequency may be different from the system clock frequency. Specifically, samples of the second digital signal are generated from samples of the output signal of the AGC circuit 18B through a PLL re-sampling process based on at least one of interpolation and decimation. The re-sampling DPLL section 19 outputs the second digital signal to an adaptive equalization circuit 20. The second digital signal is also referred to as the main digital signal or the main output signal of the re-sampling DPLL section 19.

The re-sampling DPLL section 19 includes a zero-cross detector which senses every point (every zero-cross point) at which the first digital signal (or 0°-phase-point data samples mentioned later) crosses a zero level. The zero-cross detector generates 0-point information representative of every sensed point. Specifically, the zero-cross detector decides whether or not every sample of the first digital signal (or the re-sampling-resultant signal) corresponds to a zero-cross point. The zero-cross detector generates 0-point information in response to the result of the decision. In the re-sampling DPLL section 19, the timing of the re-sampling or the frequency and phase of the re-sampling are locked so that the levels represented by zero-cross-point-corresponding samples of the second digital signal will be equal to "0". The re-sampling DPLL section 19 outputs the 0-point information to the adaptive equalization circuit 20 as the sub output signal.

Figure 16:
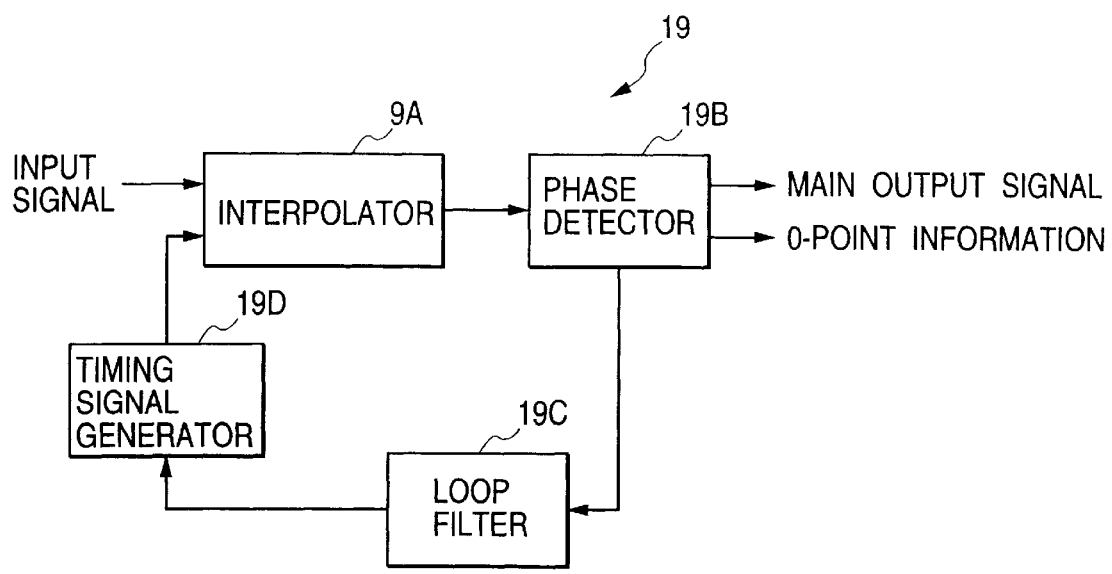
FIG. 16 is a block diagram of a re-sampling DPLL section in FIG. 2.

As shown in FIG. 16, the re-sampling DPLL section 19 includes an interpolator 19A, a phase detector 19B, a loop filter 19C, and a timing signal generator 19D which are connected in a closed loop in that order. The interpolator 19A receives the output signal of the AGC circuit 18B. The interpolator 19A receives data point phase information and the bit clock signal from the timing signal generator 19D. The interpolator 19A estimates 0°-phase-point data samples from samples of the output signal of the AGC circuit 18B through interpolation responsive to the data point phase information and the bit clock signal. Here, "phase" is defined relative to the bit clock signal. The interpolator 19A outputs the estimated 0°-phase-point data samples to the phase detector 19B.

In the re-sampling DPLL section 19, the phase detector 19B generates 180°-phase-point data samples from the 0°-phase-point data samples. Specifically, the phase detector 19B calculates a mean of a current 0°-phase-point data sample and an immediately preceding 0°-phase-point data sample, and uses the calculated mean as a current 180°-phase-point data sample. The phase detector 19B outputs the 180°-phase-point data samples to the adaptive equalization circuit 20 as the second digital signal (the main output signal). In addition, the phase detector 19B senses zero-cross points from the 0°-phase-point data samples. Furthermore, the phase detector 19B detects a phase error in response to each of the sensed zero-cross points. Specifically, the phase detector 19B senses a zero-cross point by referring to a current 0°-phase-point data sample and an immediately preceding 0°-phase-point data sample. When a zero-cross point is sensed, the phase detector 19B multiplies the polarity of the immediately preceding 0°-phase-point data sample by a mean of the current 0°-phase-point data sample and the immediately preceding 0°-phase-point data sample. The phase detector 19B uses the multiplication result as a phase error.

The phase detector 19B generates 0-point information representing the sensed zero-cross points. The phase detector 19B outputs the 0-point information (the sub output signal) to the adaptive equalization circuit 20. The phase detector 19B generates a signal representing the phase error. The phase detector 19B outputs the phase error signal to the loop filter 19C. The loop filter 19C integrates the phase error signal. The loop filter 19C outputs the integration-resultant signal to the timing signal generator 19D. The timing signal generator 19D produces the data point phase information and the bit clock signal in response to the output signal of the loop filter 19C.

The adaptive equalization circuit 20 subjects the main output signal of the re-sampling DPLL section 19 (that is, the second digital signal outputted from the re-sampling DPLL section 19) to automatic waveform equalization in response to the 0-point information fed from the re-sampling DPLL section 19. The automatic waveform equalization corresponds to a process of providing the signal in question with a partial-response (PR) characteristic. The adaptive equalization circuit 20 outputs the equalization-resultant signal to a decoding circuit 38. The decoding circuit 38 recovers original data from the output signal of the adaptive equalization circuit 20 through a viterbi decoding process. The decoding circuit 38 outputs the recovered data to an ECC (error checking and correcting) circuit 39.

The decoding circuit 38 includes a memory loaded with a plurality of candidate recovered data pieces. Also, the decoding circuit 38 includes a section for calculating branch metric values from samples of the output signal of the adaptive equalization circuit 20. Furthermore, the decoding circuit 38 includes a section for accumulating the branch metric values into path metric values respectively. The path metric values relate to the candidate recovered data pieces respectively. In addition, the decoding circuit 38 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 39 extracts an error correction code from the recovered data outputted by the decoding circuit 38. The ECC circuit 39 corrects errors in the recovered data in response to the error correction code. The ECC circuit 39 outputs the resultant recovered data.

Figure 3:
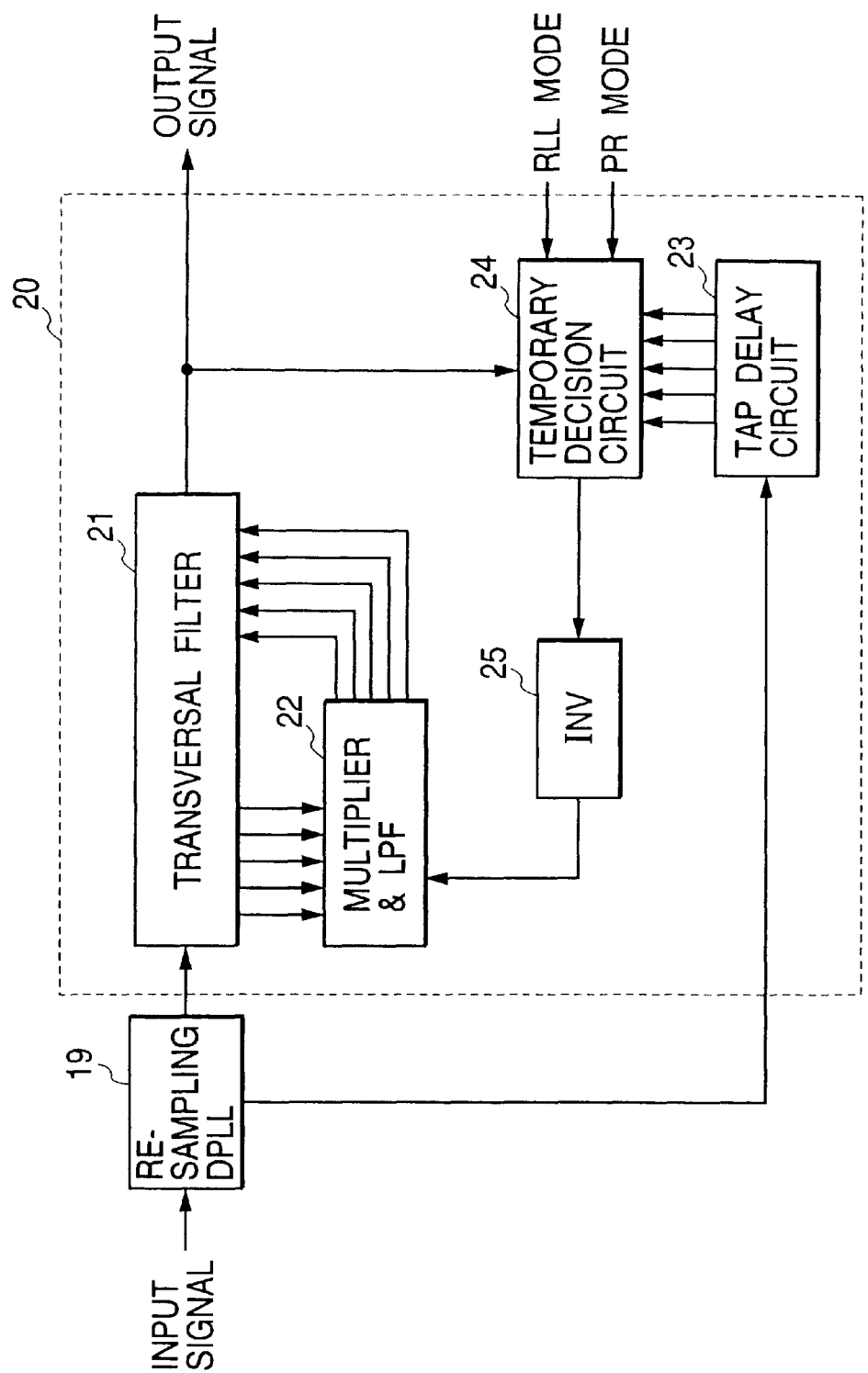
FIG. 3 is a block diagram of an adaptive equalization circuit in FIG. 2.

As shown in FIG. 3, the adaptive equalization circuit 20 includes a transversal filter 21, a multiplier and LPF (low pass filter) section 22, a tap delay circuit 23, a temporary decision circuit 24, and an inverter 25. The transversal filter 21 receives the main output signal (the second digital signal) from the re-sampling DPLL section 19. The transversal filter 21 is connected to the multiplier and LPF section 22, the temporary decision circuit 24, and the decoding circuit 38 (see FIG. 2). The tap delay circuit 23 receives the 0-point information from the re-sampling DPLL section 19. The tap delay circuit 23 is connected to the temporary decision circuit 24. The temporary decision circuit 24 is connected to the inverter 25. The inverter 25 is connected to the multiplier and LPF section 22.

The transversal filter 21 subjects the main output signal of the re-sampling DPLL section 19 (that is, the second digital signal) to PR waveform equalization responsive to tap coefficients. The multiplier and LPF section 22 varies the tap coefficients in response to an output signal of the inverter 25. The tap delay circuit 23 defers or delays the 0-point information by a plurality of different time intervals, and thereby converts the 0-point information into different tap delayed signals. The tap delay circuit 23 outputs the tap delayed signals to the temporary decision circuit 24. The temporary decision circuit 24 receives the output signal of the transversal filter 21. The temporary decision circuit 24 generates an error signal on the basis of the output signal of the transversal filter 21, the tap delayed signals from the tap delay circuit 23, an RLL (run-length-limited) mode signal, and a PR (partial-response) mode signal. The temporary decision circuit 24 outputs the error signal to the inverter 25. The device 25 inverts the error signal in polarity. The inverter 25 causes negative feedback. The inverter 25 outputs the inversion-resultant error signal to the multiplier and LPF section 22.

Figure 4:
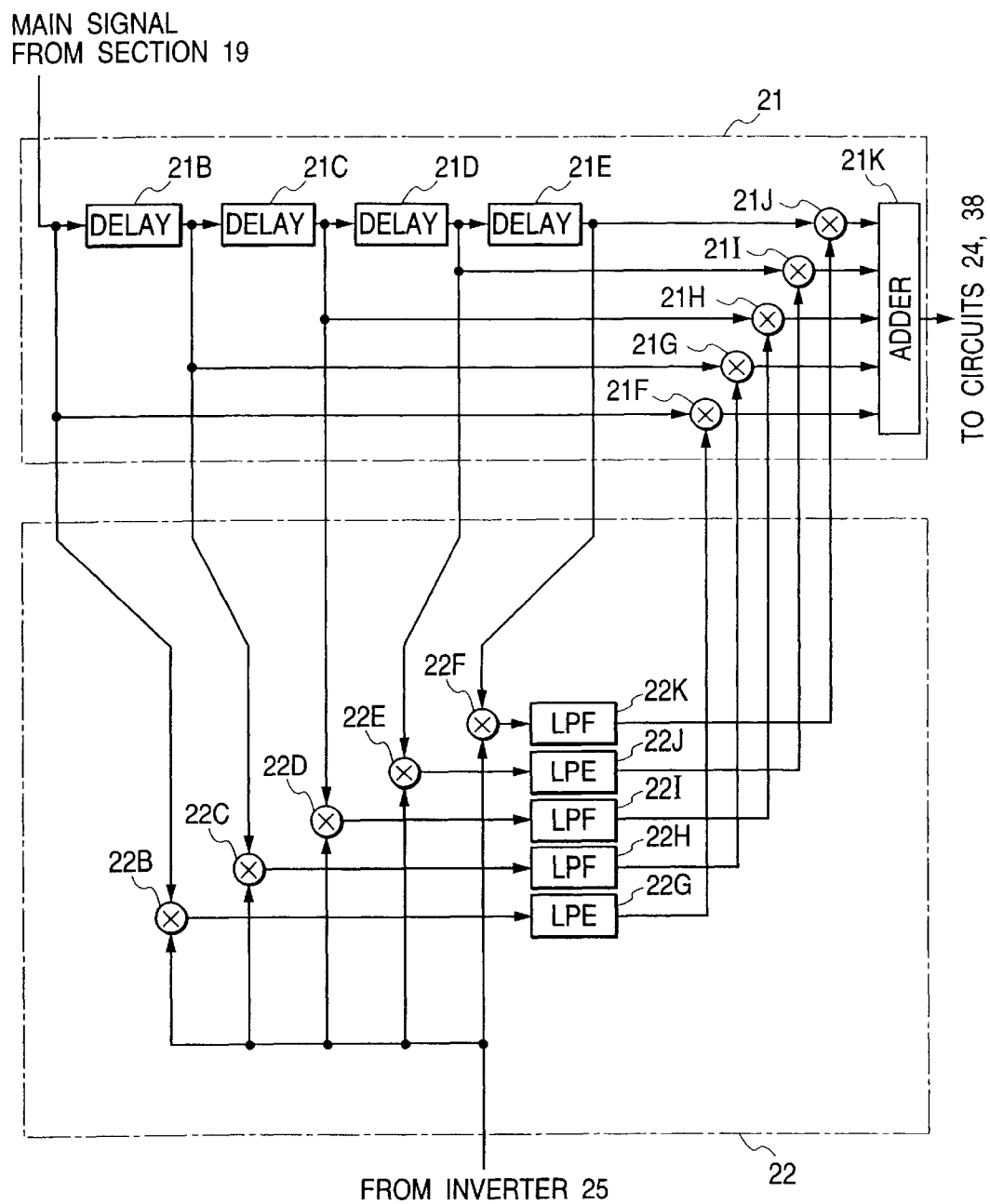
FIG. 4 is a block diagram of a portion of the adaptive equalization circuit in FIGS. 2 and 3.

As shown in FIG. 4, the transversal filter 21 includes delay circuits 21B, 21C, 21D, and 21E, multipliers 21F, 21G, 21H, 21I, and 21J, and an adder 21K.

The delay circuits 21B, 21C, 21D, and 21E are connected in cascade in that order. The input terminal of the delay circuit 21B is subjected to the main output signal of the re-sampling DPLL section 19 (that is, the second digital signal). Also, a first input terminal of the multiplier 21F is subjected to the main output signal of the re-sampling DPLL section 19. The input terminal of the delay circuit 21B is connected to the multiplier and LPF section 22 as a first tap in the transversal filter 21. The output terminals of the delay circuits 21B, 21C, 21D, and 21E form second, third, fourth, and fifth taps in the transversal filter 21, respectively. The output terminals of the delay circuits 21B, 21C, 21D, and 21E are connected to the multiplier and LPF section 22. Also, the output terminals of the delay circuits 21B, 21C, 21D, and 21E are connected to first input terminals of the multipliers 21G, 21H, 21I, and 21J, respectively. Second input terminals of the multipliers 21F, 21G, 21H, 21I, and 21J are connected to the multiplier and LPF section 22. The output terminals of the multipliers 21F, 21G, 21H, 21I, and 21J are connected to input terminals of the adder 21K. The output terminal of the adder 21K is connected to the decoding circuit 38 and the temporary decision circuit 24.

As shown in FIG. 4, the multiplier and LPF section 22 includes multipliers 22B, 22C, 22D, 22E, and 22F, and low pass filters 22G, 22H, 22I, 22J, and 22K.

A first input terminal of the multiplier 22B is connected to the input terminal of the delay circuit 21B within the transversal filter 21, that is, the first tap within the transversal filter 21. Thus, the first input terminal of the multiplier 22B is subjected to the main output signal of the re-sampling DPLL section 19 (that is, the second digital signal). First input terminals of the multipliers 22C, 22D, 22E, and 22F are connected to the output terminals of the delay circuits 21B, 21C, 21D, and 21E within the transversal filter 21, respectively. In other words, the first input terminals of the multipliers 22C, 22D, 22E, and 22F are connected to the second, third, fourth, and fifth taps within the transversal filter 21, respectively. Second input terminals of the multipliers 22B, 22C, 22D, 22E, and 22F are connected to the output terminal of the inverter 25. The output terminals of the multipliers 22B, 22C, 22D, 22E, and 22F are connected to the input terminals of the low pass filters 22G, 22H, 22I, 22J, and 22K, respectively. The output terminals of the low pass filters 22G, 22H, 22I, 22J, and 22K are connected to the second input terminals of the multipliers 21F, 21G, 21H, 21I, and 21J within the transversal filter 21, respectively.

In the transversal filter 21, the main output signal (the second digital signal) from the re-sampling DPLL section 19 successively passes through the delay circuits 21B, 21C, 21D, and 21E while being deferred or delayed thereby. Each of the delay circuits 21B, 21C, 21D, and 21E provides a predetermined delay corresponding to a 1-sample interval (a 1-bit-corresponding interval). The main output signal (the second digital signal) from the re-sampling DPLL section 19 is also applied to the multiplier 21F. The output signals of the delay circuits 21B, 21C, 21D, and 21E are applied to the multipliers 21G, 21H, 21I, and 21J, respectively. The multipliers 21F, 21G, 21H, 21I, and 21J receive output signals of the multiplier and LPF section 22 which represent tap coefficients respectively. The tap coefficients correspond to waveform equalization coefficients. The device 21F multiplies the main output signal (the second digital signal) from the re-sampling DPLL section 19 and the related tap coefficient, and outputs the multiplication-resultant signal to the adder 21K. The device 21G multiplies the output signal of the delay circuit 21B and the related tap coefficient, and outputs the multiplication-resultant signal to the adder 21K. The device 21 H multiplies the output signal of the delay circuit 21 C and the related tap coefficient, and outputs the multiplication-resultant signal to the adder 21K. The device 21I multiplies the output signal of the delay circuit 21D and the related tap coefficient, and outputs the multiplication-resultant signal to the adder 21K. The device 21J multiplies the output signal of the delay circuit 21E and the related tap coefficient, and outputs the multiplication-resultant signal to the adder 21K. The device 21K adds up the output signals of the multipliers 21F, 21G, 21H, 21I, and 21J into the equalization-resultant signal.

As previously mentioned, the multipliers 22B, 22C, 22D, 22E, and 22F in the multiplier and LPF section 22 receive the output signal of the inverter 25. As will be made clear later, the output signal of the inverter 25 indicates an amplitude error related to the output signal of the transversal filter 21. The input signal to the device 21B and the output signals from the devices 21B, 21C, 21D, and 21E within the transversal filter 21 are applied to the multipliers 22B, 22C, 22D, 22E, and 22F within the multiplier and LPF section 22 as tap output signals, respectively. The devices 22B, 22C, 22D, 22E, and 22F multiply the respective tap output signals of the transversal filter 21 by the amplitude error signal fed from the inverter 25. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thereby process the output signals of the multipliers 22B, 22C, 22D, 22E, and 22F into signals representing the tap coefficients, respectively. The low pass filters 22G, 22H, 22I, 22J, and 22K output the tap coefficient signals to the multipliers 21F, 21G, 21H, 21I, and 21J within the transversal filter 21, respectively.

Figure 5:
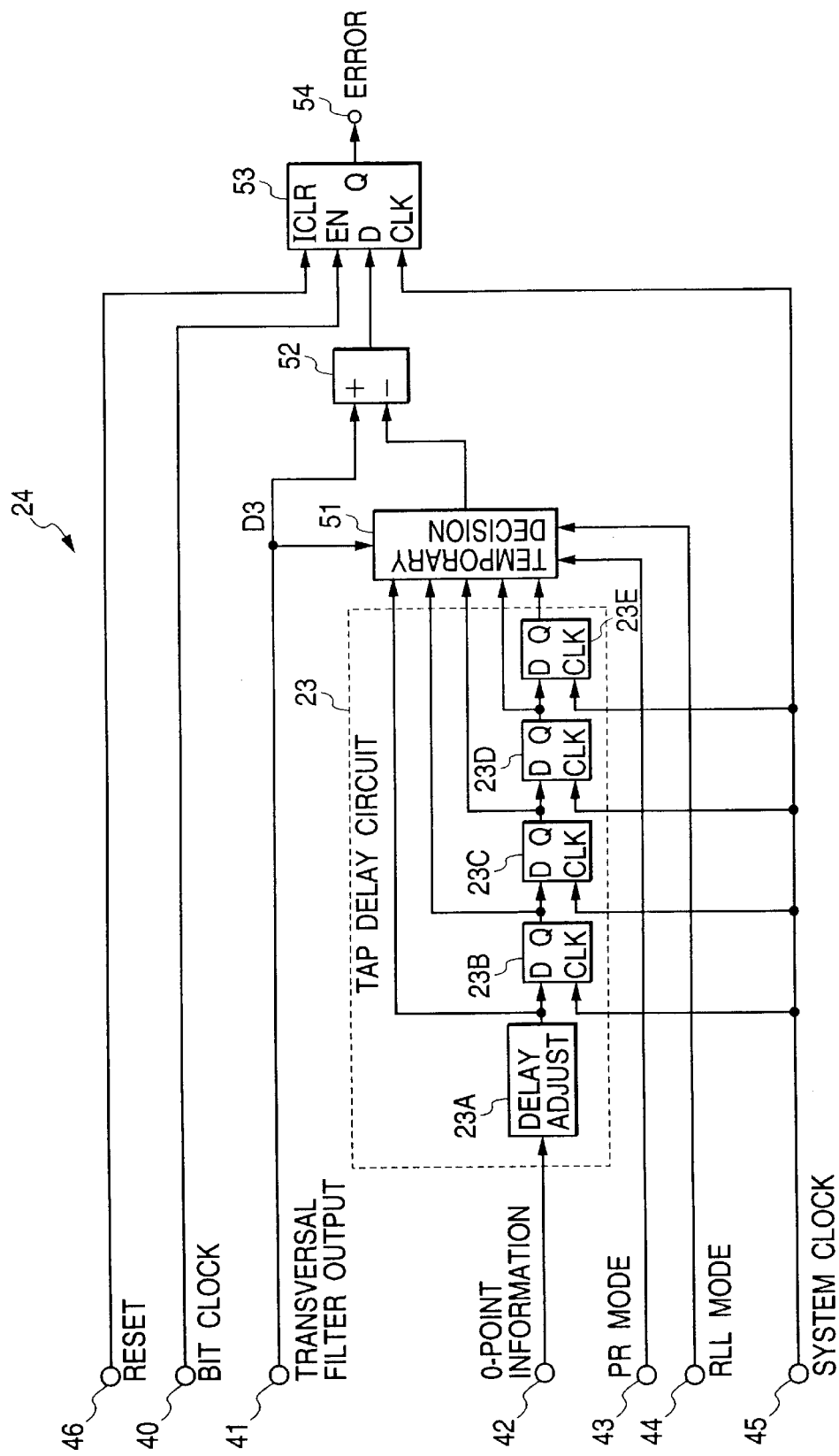
FIG. 5 is a block diagram of a temporary decision circuit and a tap delay circuit in FIG. 3.

As shown in FIG. 5, the temporary decision circuit 24 includes a temporary decision device 51, a subtracter 52, and a D flip-flop 53. The temporary decision device 51 is connected to the tap delay circuit 23. The temporary decision device 51 is connected to the output terminal of the transversal filter 21 via a terminal 41. A first input terminal of the subtracter 52 is connected to the output terminal of the transversal filter 21 via the terminal 41. A second input terminal of the subtracter 52 is connected to an output terminal of the temporary decision device 51. The output terminal of the subtracter 52 is connected to the D input terminal of the D flip-flop 53. The Q output terminal of the D flip-flop 53 is connected to the input terminal of the inverter 25 via a terminal 54.

The temporary decision device 51 receives the equalization-resultant signal from the transversal filter 21 via the terminal 41. The temporary decision device 51 receives the output signals of the tap delay circuit 23. The temporary decision device 51 receives the PR mode signal via a terminal 43. The PR mode signal will be mentioned in detail later. The temporary decision device 51 receives the RLL mode signal via a terminal 44. The RLL mode signal will be mentioned in detail later. The temporary decision device 51 includes a logic circuit which is designed to implement a temporary decision in response to the received signals according to a predetermined algorithm. The temporary decision device 51 may include a programmable signal processor. In this case, the predetermined algorithm is given as a program for controlling the signal processor. The temporary decision device 51 generates a signal representing the result of the temporary decision. The temporary decision device 51 outputs the temporary decision result signal to the subtracter 52. The subtracter 52 receives the equalization-resultant signal from the transversal filter 21 via the terminal 41. The device 52 subtracts the temporary decision result signal from the equalization-resultant signal, thereby generating an error signal (an amplitude error signal) corresponding to the difference therebetween. The subtracter 52 outputs the error signal to the D flip-flop 53. The system clock signal is applied to the clock terminal of the D flip-flop 53 via a terminal 45. The bit clock signal is applied to the enable terminal of the D flip-flop 53 via a terminal 40. Provided that the bit clock signal is in a high-level state, the D flip-flop 53 latches the error signal in synchronism with the system clock signal. Accordingly, the D flip-flop 53 latches the error signal for every period of the bit clock signal. The D flip-flop 53 outputs the latched error signal to the inverter 25 via the terminal 54. A reset signal is applied to the clear terminal of the D flip-flop 53 via a terminal 46.

As shown in FIG. 5, the tap delay circuit 23 includes a delay adjuster 23A, and D flip-flops 23B, 23C, 23D, and 23E. The delay adjuster 23A receives the 0-point information from the re-sampling DPLL section 19 via a terminal 42. The output terminal of the delay adjuster 23A is connected to the D input terminal of the D flip-flop 23B and the temporary decision device 51. The D flip-flops 23B, 23C, 23D, and 23E are connected in cascade in that order. The Q output terminals of the D flip-flops 23B, 23C, 23D, and 23E are connected to the temporary decision device 51. The system clock signal is applied to the clock terminals of the D flip-flops 23B, 23C, 23D, and 23E via the terminal 45. The bit clock signal is applied to the enable terminals of the D flip-flops 23B, 23C, 23D, and 23E via the terminal 40. The reset signal is applied to the clear terminals of the D flip-flops 23B, 23C, 23D, and 23E via the terminal 46.

In the tap delay circuit 23, the delay adjuster 23A operates to adjust delay time of the 0-point information. Specifically, the delay adjuster 23A defers or delays the 0-point information by a fixed time interval or an adjustable time interval. The delay adjuster 23A outputs the resultant signal to the temporary decision device 51 and the D flip-flop 23B as a first tap delayed signal. The D flip-flop 23B delays the output signal of the delay adjuster 23A by a time interval equal to one period of the bit clock signal. The D flip-flop 23B outputs the resultant signal to the temporary decision device 51 and the D flip-flop 23C as a second tap delayed signal. The D flip-flop 23C delays the output signal of the D flip-flop 23B by a time interval equal to one period of the bit clock signal. The D flip-flop 23C outputs the resultant signal to the temporary decision device 51 and the D flip-flop 23D as a third tap delayed signal. The D flip-flop 23D delays the output signal of the D flip-flop 23C by a time interval equal to one period of the bit clock signal. The D flip-flop 23D outputs the resultant signal to the temporary decision device 51 and the D flip-flop 23E as a fourth tap delayed signal. The D flip-flop 23E delays the output signal of the D flip-flop 23D by a time interval equal to one period of the bit clock signal. The D flip-flop 23E outputs the resultant signal to the temporary decision device 51 as a fifth tap delayed signal. Accordingly, the tap delay circuit 23 outputs the first, second, third, fourth, and fifth tap delayed signals to the temporary decision device 51. The first, second, third, fourth, and fifth tap delayed signals are five successive 1-bit-corresponding segments or five successive samples of the 0-point information.

Figure 6:
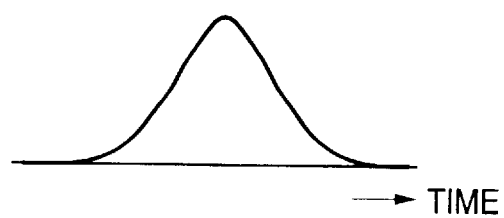
FIG. 6 is a time-domain diagram of an example of an isolated waveform.
Figure 7:
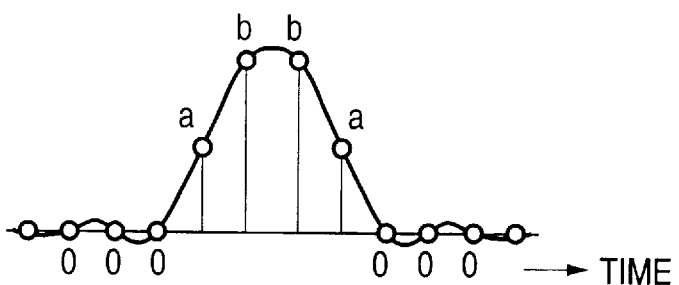
FIG. 7 is a time-domain diagram of a waveform (an equalization-resultant waveform) which results from equalization of the isolated waveform in FIG. 6.
Figure 8:
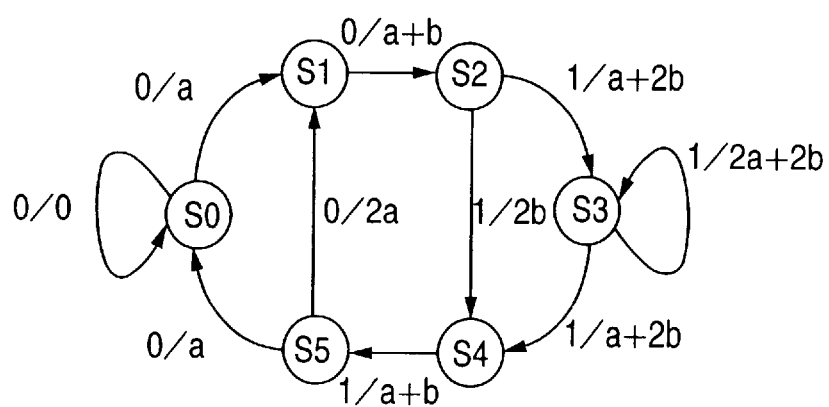
FIG. 8 is a diagram of signal state transitions regarding a partial-response (PR) characteristic and a run-length-limited (RLL) code.

Partial-response (PR) characteristics will be explained below. When an isolated waveform in FIG. 6 is subjected to equalization accorded with the characteristic of PR (a, b, b, a), the equalization-resultant waveform in FIG. 7 is provided. A waveform resulting from the PR (a, b, b, a) equalization of a continuous waveform takes one of seven different values, that is, "0", "a", "a+b", "2a", "2b", "a+2b", and "2a+2b". It is assumed that the 7-value signal of the (1, 7) run-length-limited code is inputted into a viterbi decoder. The state of a current sample of an original signal (an input value) and the state of a current sample of a reproduced signal (an output value) resulting from PR equalization are restricted by the states of previous samples. In the input signal, two successive samples of "1" will not occur. FIG. 8 shows signal state transitions available in this case.

In FIG. 8, S0, S1, S2, S3, S4, and S5 denote signal states determined by immediately-preceding output values. Transitions from the state S2 will be taken as an example. When the input value is "a+2b", the output value becomes "1" and a transition to the state S3 from the state S2 occurs. When the input value is "2b", the output value becomes "1" and a transition to the state S4 from the state S2 occurs. Under normal conditions, regarding the state S2, the input value different from "a+2b" and "2b" does not occur. Thus, the input value different from "a+2b" and "2b" is an error.

FIG. 9 shows the relation among the PR mode, the RLL mode (the run-length-limited mode), and the decision result value outputted from the temporary decision device 51. The PR mode is represented by the PR mode signal inputted into the temporary decision device 51 via the terminal 43. The RLL mode is represented by the RLL mode signal inputted into the temporary decision device 51 via the terminal 44. The PR mode indicates the type of the PR waveform equalization implemented by the adaptive equalization circuit 20. The RLL mode indicates the type of the run-length-limited code used by the digital signal recorded on the optical disc 15.

With reference to FIG. 9, the PR mode can be changed among identification numbers "1", "2", "3", "4", "5", and "6" assigned to PR (1, 1), PR (1, 1, 1), PR (1, 2, 2, 1), PR (1, 3, 3, 1), PR (2, 3, 3, 2), and PR (3, 4, 4, 3) respectively. The RLL mode can be changed between RLL (1, X) and RLL (2, X). Here, RLL (1, x) means run-length limiting rules such that the minimum transition interval is equal to "2", and the maximum transition interval is equal to a given value X depending on the modulation format. On the other hand, RLL (2, X) means run-length limiting rules such that the minimum transition interval is equal to "3", and the maximum transition interval is equal to a given value X depending on the modulation format.

In the case of RLL (1, X), the waveform resulting from the PR (a, b, b, a) equalization takes one of seven different values "0", "a", "a+b", "2a", "2b", "a+2b", and "2a+2b". In FIG. 9, the decision result values outputted from the temporary decision device 51 in correspondence with these values "0", "a", "a+b", "2a", "2b", "a+2b", and "2a+2b" are listed for PR (1, 2, 2, 1), PR (1, 3, 3, 1), PR (2, 3, 3, 2), and PR (3, 4, 4, 3). Each of the related cells indicates two decision result values, that is, a left-hand value and a right-hand value. The left-hand value is a non-offset decision result value while the right-hand value is a decision result value provided by an offset for equalizing the central value "a+b" to "0". The decision result values for RLL (2, X) are similar to those for RLL (1, X) except for the following point. In the case of RLL (2, X), the equalization-resultant waveform takes neither the value "2a" nor the value "2b".

Accordingly, the decision result values corresponding to the values "2a" and "2b" are absent from the case of RLL (2, X).

In FIG. 9, PR (1, 1) means PR (a, b, b, a) in which a=0 and b=1.

The gain or gain factor G is a multiplication coefficient A/(a+b)* for normalizing the maximum (a+b)* of the absolute after-offset decision result value, where "A" denotes an arbitrary level.

With reference back to FIG. 5, the equalization-resultant signal inputted from the transversal filter 21 via the terminal 41 is handled as a signal D3 occurring at the present moment. The present-moment signal D3 is applied to the temporary decision device 51 and the subtracter 52. The 0-point information is fed from the re-sampling DPLL section 19 to the tap delay circuit 23 via the terminal 42. The tap delay circuit 23 defers or delays the 0-point information by a plurality of different time intervals, and thereby converts the 0-point information into different tap delayed signals. The tap delay circuit 23 outputs the tap delayed signals to the temporary decision device 51. The temporary decision device 51 implements a temporary decision according to a predetermined algorithm. The temporary decision device 51 generates a signal representing the result of the temporary decision. The temporary decision device 51 outputs the temporary decision result signal to the subtracter 52. The subtracter 52 receives the present-moment signal D3. The device 52 subtracts the temporary decision result signal from the present-moment signal D3, thereby generating an error signal corresponding to the difference therebetween. The subtracter 52 outputs the error signal to the D flip-flop 53. The D flip-flop 53 latches the error signal. The D flip-flop 53 outputs the latched error signal to the inverter 25 via the terminal 54.

With reference to FIGS. 3 and 4, the device 25 inverts the error signal in polarity. The inverter 25 outputs the inversion-resultant error signal to the multipliers 22B, 22C, 22D, 22E, and 22F in the multiplier and LPF section 22. The tap output signals of the transversal filter 21 are applied to the multipliers 22B, 22C, 22D, 22E, and 22F in the multiplier and LPF section 22, respectively. The devices 22B, 22C, 22D, 22E, and 22F multiply the respective tap output signals by the inversion-resultant error signal. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thus process the output signals of the multipliers 22B, 22C, 22D, 22E, and 22F into signals representing tap coefficients, respectively. The low pass filters 22G, 22H, 22I, 22J, and 22K output the tap coefficient signals to the multipliers 21F, 21G, 21H, 21I, and 21J within the transversal filter 21, respectively. The tap coefficients represented by the output signals of the low pass filters 22G, 22H, 22I, 22J, and 22K cause the equalization by the transversal filter 21 to nullify the error signal generated by the subtracter 52 within the temporary decision circuit 24. In this way, the tap coefficients used by the transversal filter 21 are controlled to nullify the error signal generated by the subtracter 52.

The 0-point information whose value Z is "1" indicates a zero-cross point. The 0-point information value Z being "1" corresponds to the value "a+b" in FIG. 8, and occurs in the transition from the state S1 to the state S2 and the transition from the state S4 to the state S5. In FIG. 8, transitions from the right-hand states S2, S3, and S4 pass through positive values ("a+2b", "2a+2b", and "2b" when normalization is done so that a+b=0), while transitions from the left-hand states S0, S1, and S5 pass through negative values ("0", "a", and "2a" when normalization is done so that a+b=O). Therefore, a decision as to whether the zero-cross point is in a positive-going path or a negative-going path can be implemented by referring to a value temporally preceding or following the zero-cross point.

In the case where the interval from one zero-cross point to the next zero-cross point is known, or in the case where the number of transitions occurring for the interval from the state S2 to the state S5 or the interval from the state S5 to the state S2 is known, the path is settled and hence values to be taken at respective sample points are definite.

In FIG. 8, the values different from "a+b" do not correspond to the zero-cross point. For the values different from "a+b", the 0-point information value Z is equal to "0". Two or more zero-cross points (Z=1) will not occur in succession. In the case of RLL (1, X), at least one "0" point (Z=0 point) exists between two adjacent zero-cross points (Z=1). For example, the 0-point information value Z changes as 1→0→1 (the state changes as S2→S4→S5 or S5→S1→S2). In the case of RLL (2, X), at least two "0" points (Z=0 points) exist between two adjacent zero-cross points (Z=1) since the values "2a" and "2b" are absent.

Figure 10:
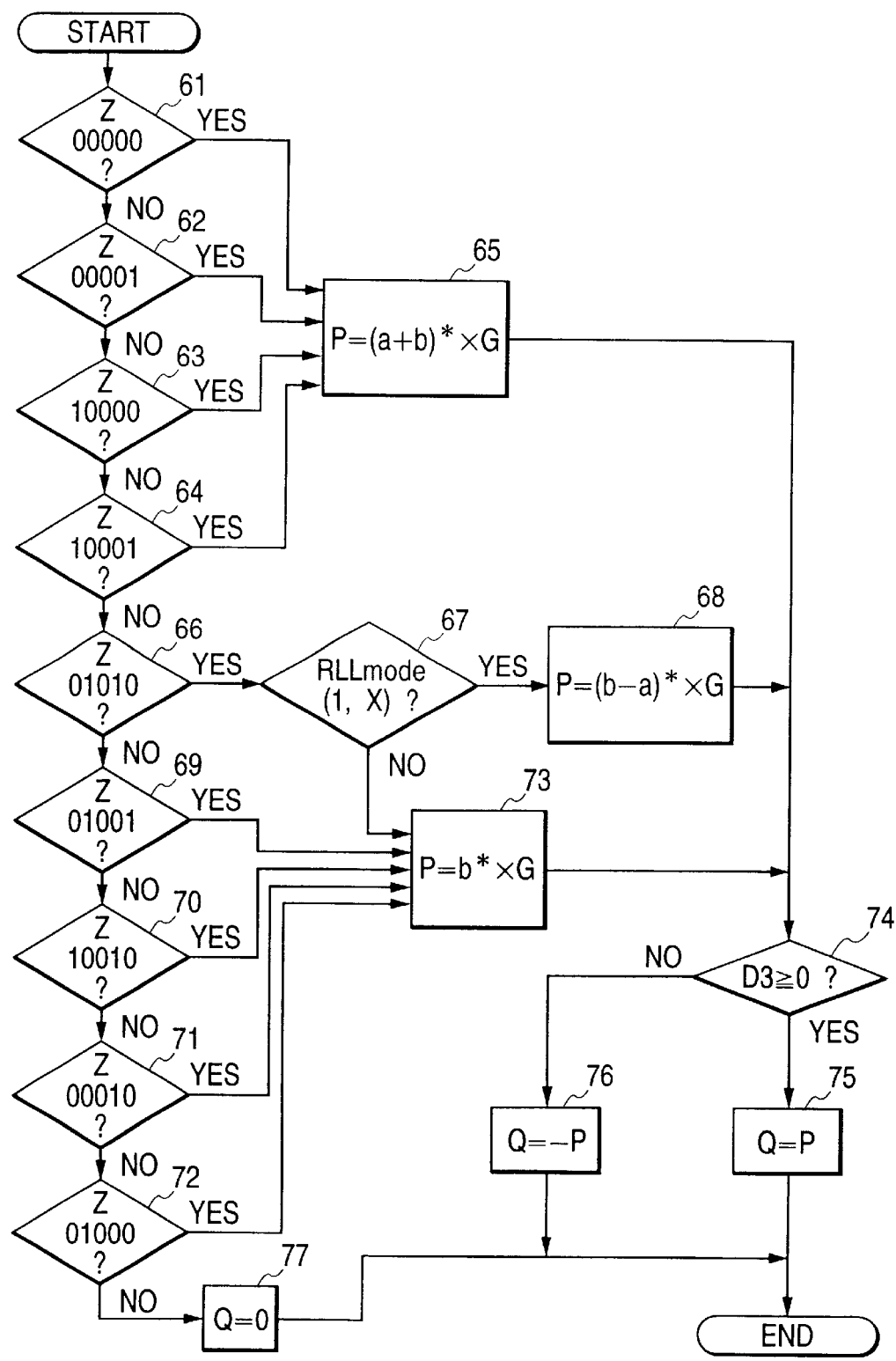
FIG. 10 is a flowchart of an algorithm of temporary decision by a temporary decision device in FIG. 5.

FIG. 10 is a flowchart of the algorithm of the temporary decision by the temporary decision device 51. The temporary decision is executed for every period of the bit clock signal.

As shown in FIG. 10, a first step 61 of the algorithm decides whether or not five successive 0-point information values Z represented by the output signals of the tap delay circuit 23 are "00000". When the five successive 0-point information values Z are "00000", the algorithm advances from the step 61 to a step 65. Otherwise, the algorithm advances from the step 61 to a step 62.

The step 62 decides whether or not the five successive 0-point information values Z are "00001". When the five successive 0-point information values Z are "00001", the algorithm advances from the step 62 to the step 65. Otherwise, the algorithm advances from the step 62 to a step 63.

The step 63 decides whether or not the five successive 0-point information values Z are "10000". When the five successive 0-point information values Z are "10000", the algorithm advances from the step 63 to the step 65. Otherwise, the algorithm advances from the step 63 to a step 64.

The step 64 decides whether or not the five successive 0-point information values Z are "10001". When the five successive 0-point information values Z are "10001", the algorithm advances from the step 64 to the step 65. Otherwise, the algorithm advances from the step 64 to a step 66.

In the case where the five successive 0-point information values Z are "00000", "00001", "10000", or "10001", the before-equalization signal waveform is fixed in a positive side or a negative side for a long time interval. Thus, in this case, the step 65 calculates a relatively large value P according to the following equation.

$$P=(a+b)^* \cdot G \qquad (1)$$

where G denotes the gain (the gain factor) shown in FIG. 9, and a* and b* denote values derived from the values "a" and "b" by an offset for equalizing the central value "a+b" to "0". The values G, a*, and b* are known values designated by the PR mode signal and the RLL mode signal. After the step 65, the algorithm advances to a step 74.

The step 66 decides whether or not the five successive 0-point information values Z are "01010". When the five successive 0-point information values Z are "01010", the algorithm advances from the step 66 to a step 67. Otherwise, the algorithm advances from the step 66 to a step 69.

The step 67 decides whether or not the RLL mode signal represents RLL (1, X). When the RLL mode signal represents RLL (1, X), the algorithm advances from the step 67 to a step 68. Otherwise, the program advances from the step 67 to a step 73.

Five successive 0-point information values Z being "01010" can occur only in the case of RLL (1, X). According to the before-equalization signal waveform which corresponds to five successive 0-point information values Z being "01010", the signal polarity changes at an early stage, specifically at a second bit clock pulse.

Thus, in this case, the step 68 calculates a relatively small value P according to the following equation.

$$P=(b-a)^* \cdot G \qquad (2)$$

After the step 68, the algorithm advances to the step 74.

The step 69 decides whether or not the five successive 0-point information values Z are "01001". When the five successive 0-point information values Z are "01001", the algorithm advances from the step 69 to the step 73. Otherwise, the algorithm advances from the step 69 to a step 70.

The step 70 decides whether or not the five successive 0-point information values Z are "10010". When the five successive 0-point information values Z are "10010", the algorithm advances from the step 70 to the step 73. Otherwise, the algorithm advances from the step 70 to a step 71.

The step 71 decides whether or not the five successive 0-point information values Z are "00010". When the five successive 0-point information values Z are "00010", the algorithm advances from the step 71 to the step 73. Otherwise, the algorithm advances from the step 71 to a step 72.

The step 72 decides whether or not the five successive 0-point information values Z are "01000". When the five successive 0-point information values Z are "01000", the algorithm advances from the step 72 to the step 73. Otherwise, the algorithm advances from the step 72 to a step 77.

In the case where the five successive 0-point information values Z are "01010" and the RLL mode signal does not represent RLL (1, X), and in the case where the five successive 0-point information values Z are "01001", "10010", "00010", or "01000", the before-equalization signal level remains in the same for a short time interval. Thus, in this case, the step 73 calculates an intermediate value P according to the following equation.

$$P=b^* \cdot G \qquad (3)$$

After the step 73, the algorithm advances to the step 74.

The step 74 detects the polarity of the present-moment signal D3. Specifically, the step 74 decides whether or not the present-moment signal D3 is smaller than "0". When the present-moment signal D3 is equal to or greater than "0", the algorithm advances from the step 74 to a step 75. When the present-moment signal D3 is smaller than "0", the algorithm advances from the step 74 to a step 76.

The step 75 sets a temporary decision level (a temporary decision value or a temporary decision result value) Q equal to the value P. On the other hand, the step 76 sets the temporary decision level Q equal to the value −P (the value P multiplied by −1). After the steps 75 and 76, the current execution cycle of the temporary decision ends.

The step 77 sets the temporary decision level Q equal to "0". The algorithm advances to the step 77 in cases including the case where the central one among the the five successive 0-point information values Z is "1". After the step 77, the current execution cycle of the temporary decision ends.

The temporary decision device 51 outputs a signal representative of the temporary decision level (the temporary decision value) Q to the subtracter 52 as a temporary decision result signal. The temporary decision value Q is determined on the basis of one of the previously-indicated equations (1), (2), and (3). Accordingly, the equalization by the transversal filter 21 is based on one of the equations (1), (2), and (3). The equalization based on one of the equations (1), (2), and (3) is periodically executed in response to the polarity of the present-moment signal D3 at a timing of the central one (the third one) among five successive 0-point information values Z.

Figure 11:
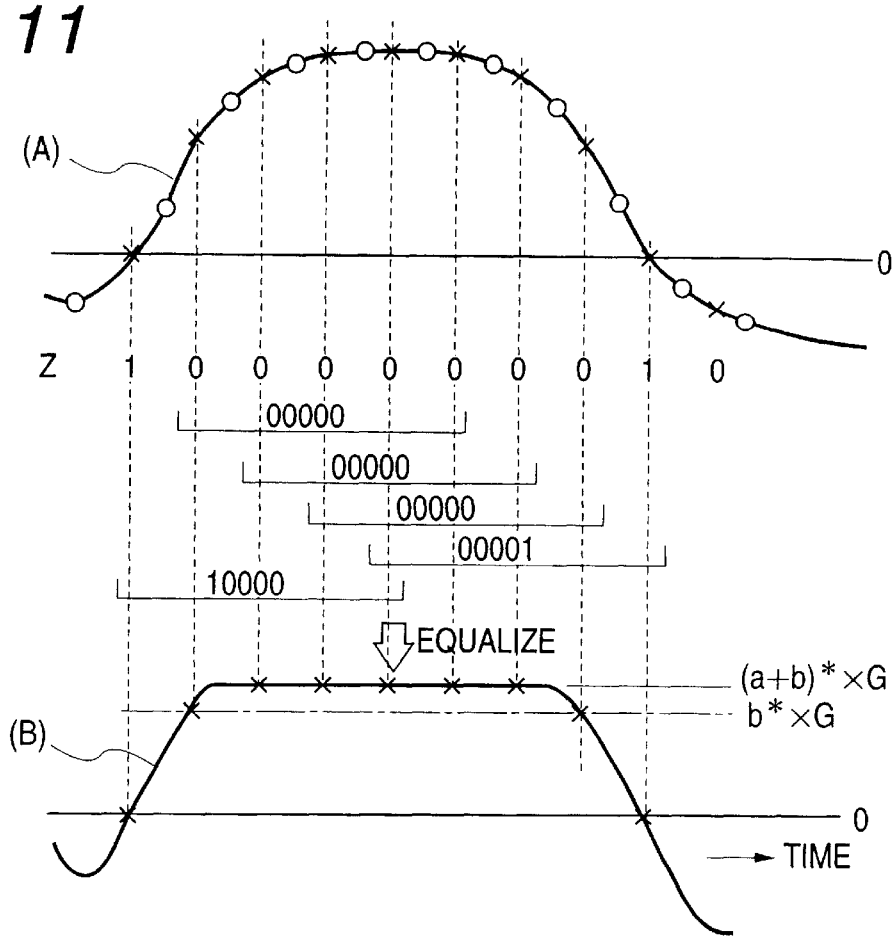
FIG. 11 is a time-domain diagram of a first example of an original waveform and an equalization-resultant waveform.

FIG. 11 shows an example of a waveform (A) of original data points "○" which are represented by respective data segments recorded on the optical disc 15. Sample points "×" on the waveform (A) which are given for the PR equalization are temporally distant from the original data points "○" by angular or phase intervals of 180° with respect to the bit clock signal. Values Z of the 0-point information are generated coincidently with sample points "×", respectively. According to the waveform (A), five successive 0-point information values Z change as "10000"→"00000"→"00000"→"00000"→"00001". FIG. 11 also shows an example of an equalization-resultant waveform (B) of sample points "×" which originates from the waveform (A). In the case where the five successive 0-point information values Z are "00000", "10000", or "00001", the waveform equalization is executed on the basis of the previously-indicated equation (1) and the polarity of the present-moment signal D3 at a timing of the central one among the five successive 0-point information values Z. In FIG. 11, since the polarity of the present-moment signal D3 at a timing of the central one among the five successive 0-point information values Z ("00000", "10000", or "00001") is positive, the waveform equalization reflects the positive value P equal to (a+b)*·G.

Specifically, the waveform equalization reflects the temporary decision value Q. The equalization-resultant waveform (B) is basically similar to the original waveform (A).

Figure 12:
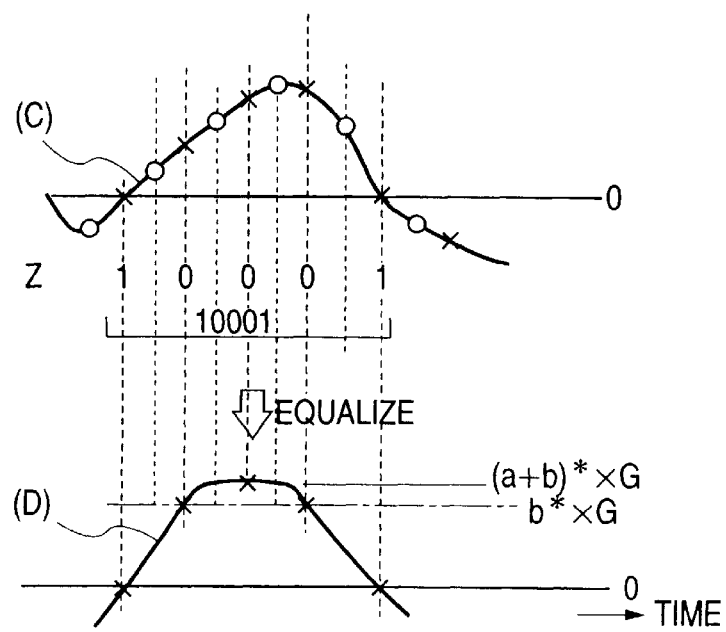
FIG. 12 is a time-domain diagram of a second example of an original waveform and an equalization-resultant waveform.

FIG. 12 shows an example of a waveform (C) of original data points "○" which are represented by respective data segments recorded on the optical disc 15. Sample points "×" on the waveform (C) are given for the PR equalization. Values Z of the 0-point information are generated coincidently with sample points "×", respectively. According to the waveform (C), five successive 0-point information values Z are "10001". FIG. 12 also shows an example of an equalization-resultant waveform (D) of sample points "×" which originates from the waveform (C). In the case where the five successive 0-point information values Z are "10001", the waveform equalization is executed on the basis of the previously-indicated equation (1) and the polarity of the present-moment signal D3 at a timing of the central one among the five successive 0-point information values Z. In FIG. 12, since the polarity of the present-moment signal D3 at a timing of the central one among the five successive 0-point information values Z ("10001") is positive, the waveform equalization reflects the positive value P equal to (a+b)*·G. Specifically, the waveform equalization reflects the temporary decision value Q. The equalization-resultant waveform (D) is basically similar to the original waveform (C).

Figure 13:
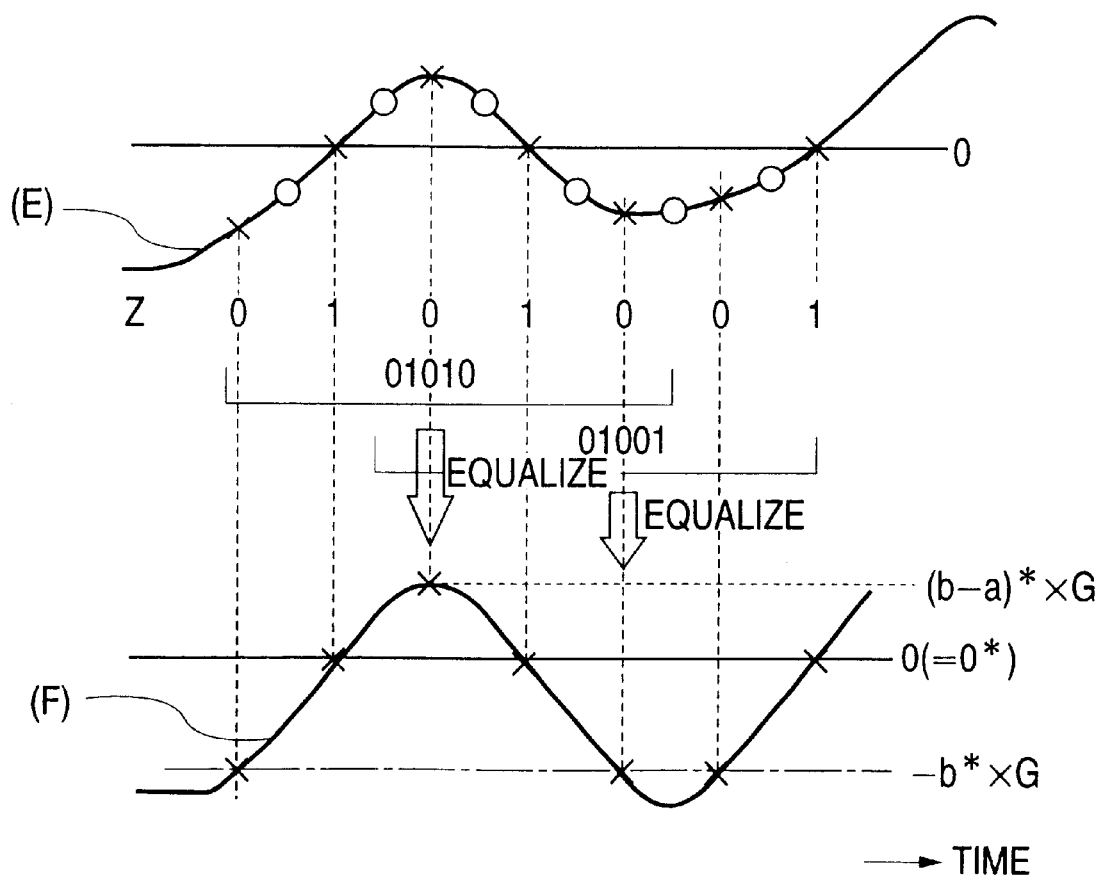
FIG. 13 is a time-domain diagram of a third example of an original waveform and an equalization-resultant waveform.

FIG. 13 shows an example of a waveform (E) of original data points "○" which are represented by respective RLL (1, X) data segments recorded on the optical disc 15. Sample points "×" on the waveform (E) are given for the PR equalization. Values Z of the 0-point information are generated coincidently with sample points "×", respectively. According to the waveform (E), five successive 0-point information values Z change as "01010"→"10100"→"01001".

FIG. 13 also shows an example of an equalization-resultant waveform (F) of sample points "×" which originates from the waveform (E). In the case where the five successive 0-point information values Z are "01010", the waveform equalization is executed on the basis of the previously-indicated equation (2) and the polarity of the present-moment signal D3 at a timing of the central one among the five successive 0-point information values Z. In FIG. 13, since the polarity of the present-moment signal D3 at a timing of the central one among the five successive 0-point information values Z ("01010") is positive, the waveform equalization reflects the positive value P equal to (b−a)*·G. Specifically, the waveform equalization reflects the temporary decision value Q. In the case where the five successive 0-point information values Z are "01001", the waveform equalization is executed on the basis of the previously-indicated equation (3) and the polarity of the present-moment signal D3 at a timing of the central one among the five successive 0-point information values Z. In FIG. 13, since the polarity of the present-moment signal D3 at a timing of the central one among the five successive 0-point information values Z ("01001") is negative, the waveform equalization reflects the negative value −P equal to −b*·G.

Specifically, the waveform equalization reflects the temporary decision value Q. The equalization-resultant waveform (E) is basically similar to the original waveform (F).

Figure 14:
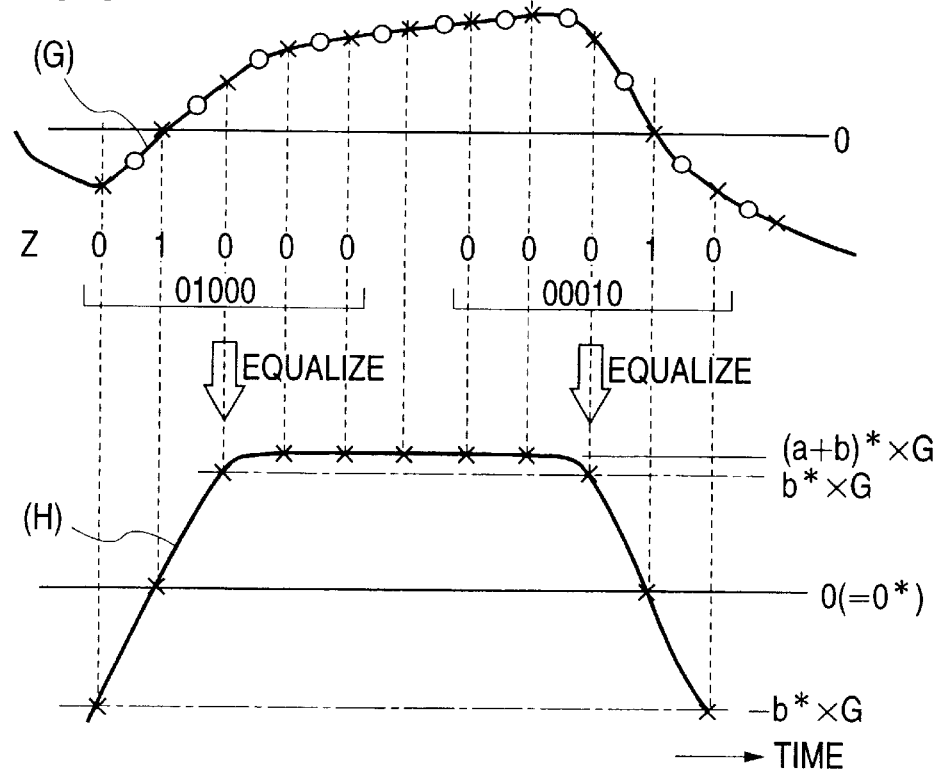
FIG. 14 is a time-domain diagram of a fourth example of an original waveform and an equalization-resultant waveform.

FIG. 14 shows an example of a waveform (G) of original data points "○" which are represented by data segments recorded on the optical disc 15. Sample points "×" on the waveform (G) are given for the PR equalization. Values Z of the 0-point information are generated coincidently with sample points "×", respectively.

According to the waveform (G), five successive 0-point information values Z change as "01000"→"10000"→"00000"→"00000"→"00000"→"00001"→"00010". FIG. 14 also shows an example of an equalization-resultant waveform (H) of sample points "×" which originates from the waveform (G). In the case where the five successive 0-point information values Z are "01000" or "00010", the waveform equalization is executed on the basis of the previously-indicated equation (3) and the polarity of the present-moment signal D3 at a timing of the central one among the five successive 0-point information values Z. In FIG. 14, since the polarity of the present-moment signal D3 at a timing of the central one among the five successive 0-point information values Z ("01000" or "00010") is positive, the waveform equalization reflects the positive value P equal to b*·G. Specifically, the waveform equalization reflects the temporary decision value Q. The equalization-resultant waveform (H) is basically similar to the original waveform (G).

Figure 15:
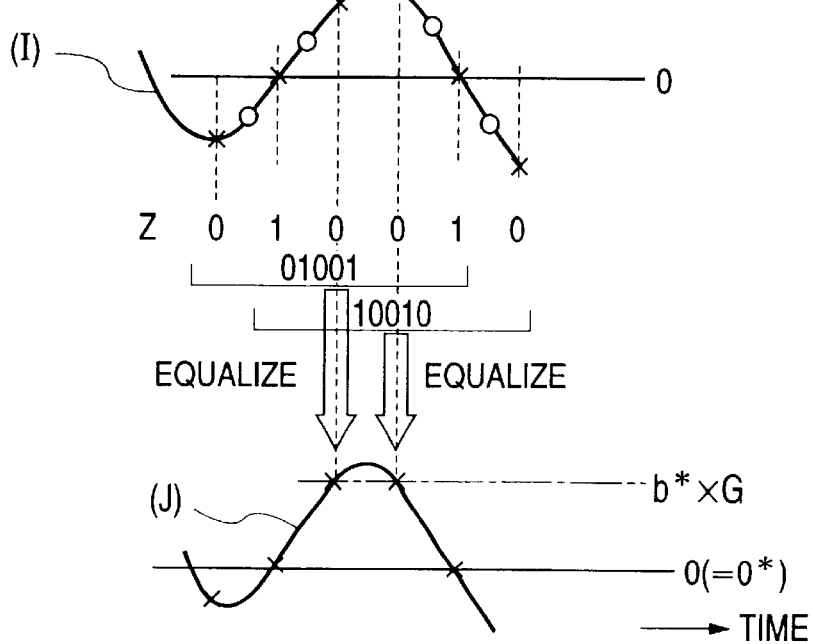
FIG. 15 is a time-domain diagram of a fifth example of an original waveform and an equalization-resultant waveform.

FIG. 15 shows an example of a waveform (I) of original data points "○" which are represented by data segments recorded on the optical disc 15. Sample points "×" on the waveform (I) are given for the PR equalization. Values Z of the 0-point information are generated coincidently with sample points "×", respectively. According to the waveform (I), five successive 0-point information values Z change as "01001"→"10010". FIG. 15 also shows an example of an equalization-resultant waveform (J) of sample points "×" which originates from the waveform (I). In the case where the five successive 0-point information values Z are "01001" or "10010", the waveform equalization is executed on the basis of the previously-indicated equation (3) and the polarity of the present-moment signal D3 at a timing of the central one among the five successive 0-point information values Z. In FIG. 15, since the polarity of the present-moment signal D3 at a timing of the central one among the five successive 0-point information values Z ("01001" or "10010") is positive, the waveform equalization reflects the positive value P equal to b*·G. Specifically, the waveform equalization reflects the temporary decision value Q. The equalization-resultant waveform (J) is basically similar to the original waveform (I).

The waveform equalization is executed in response to five successive 0-point information values and also the state transition diagram of FIG. 8. Therefore, the executed waveform equalization is less adversely affected by the level represented by a current signal sample. Thus, the executed waveform equalization is reliable.

Furthermore, the executed waveform equalization can be changed among different PR equalizations in response to the PR mode signal and the RLL mode signal.

It should be noted that the present embodiment of this invention can be applied to RLL (2, X).

Figure 17:
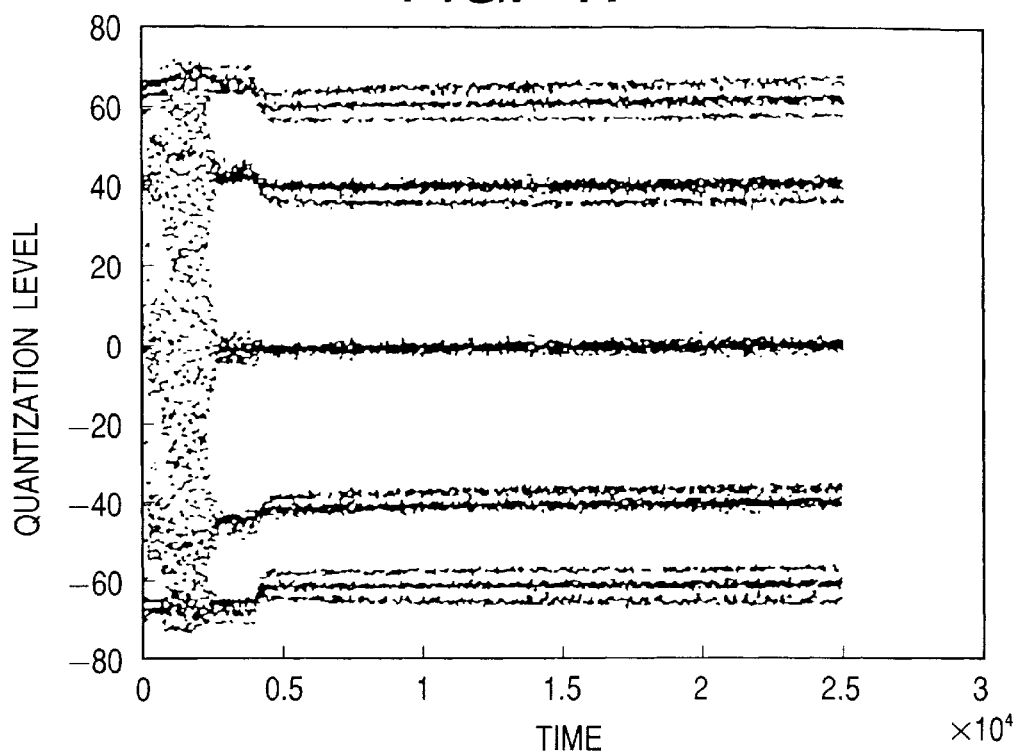
FIG. 17 is a time-domain diagram of samples of an equalization-resultant signal regarding RLL (2, X) and PR (3, 4, 4, 3).

Experiments were carried out. During the experiments, a test signal of RLL (2, X) was inputted into the reproducing apparatus of FIG. 2 for PR (3, 4, 4, 3). The test signal was processed by the reproducing apparatus of FIG. 2 into an equalization-resultant signal which appeared at the output terminal of the adaptive equalization circuit 20. FIG. 17 shows time-domain conditions of the equalization-resultant signal. In FIG. 17, the abscissa denotes time elapsed, and the ordinate denotes the quantization levels of signal samples. As shown in FIG. 17, samples of the equalization-resultant signal quickly converged on five different levels corresponding to "2a+2b", "a+2b", "a+b", "a", and "0".

Figure 18:
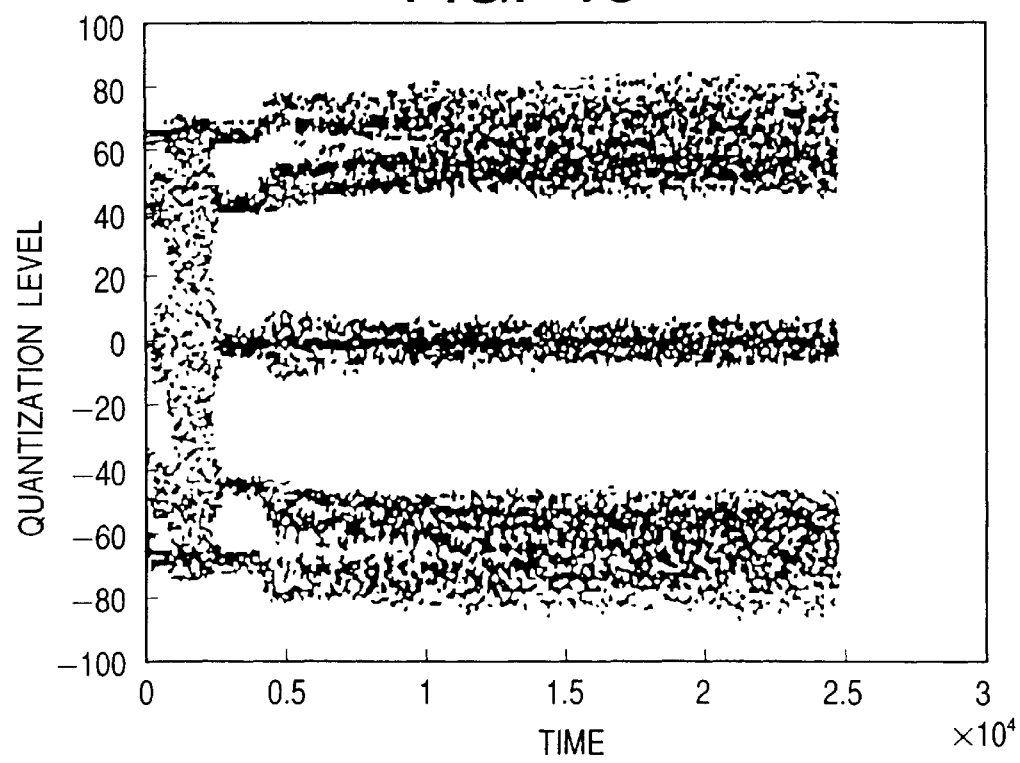
FIG. 18 is a time-domain diagram of samples of an equalization-resultant signal regarding RLL (2, X) and PR (1, 1).

Also, during the experiments, a test signal of RLL (2, X) was inputted into the reproducing apparatus of FIG. 2 for PR (1,1). The test signal was processed by the reproducing apparatus of FIG. 2 into an equalization-resultant signal which appeared at the output terminal of the adaptive equalization circuit 20. FIG. 18 shows time-domain conditions of the equalization-resultant signal. In FIG. 18, the abscissa denotes time elapsed, and the ordinate denotes the quantization levels of signal samples. As shown in FIG. 18, samples of the equalization-resultant signal quickly converged on three different levels corresponding to "a+2b", "a+b", and "a".

Second Embodiment

Figure 19:
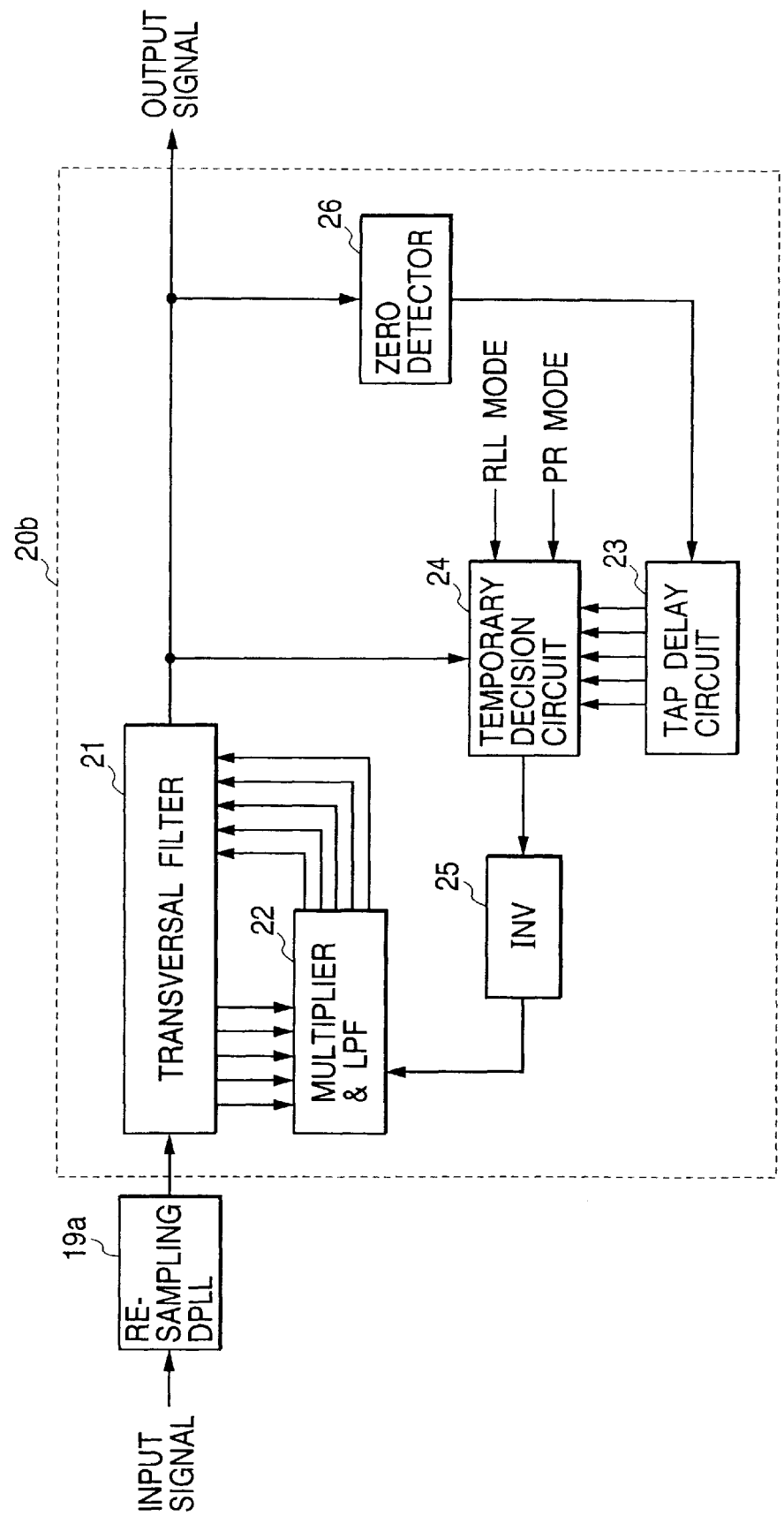
FIG. 19 is a block diagram of a portion of a reproducing apparatus according to a second embodiment of this invention.

FIG. 19 shows a portion of a reproducing apparatus according to a second embodiment of this invention. The reproducing apparatus in FIG. 19 is similar to the reproducing apparatus in FIG. 3 except that a re-sampling DPLL section 19a and an adaptive equalization circuit 20b replace the re-sampling DPLL section 19 and the adaptive equalization circuit 20 (see FIG. 3) respectively.

With reference to FIG. 19, the re-sampling DPLL section 19a does not generate 0-point information. The re-sampling DPLL section 19a feeds a main digital signal (a second digital signal) to a transversal filter 21 within the adaptive equalization circuit 20b as the re-sampling DPLL section 19 (see FIG. 3) does.

The adaptive equalization circuit 20b is similar to the adaptive equalization circuit 20 (see FIGS. 2 and 3) except for the following point. The adaptive equalization circuit 20b includes a zero detector 26. The input terminal of the zero detector 26 is connected to the output terminal of the transversal filter 21. The output terminal of the zero detector 26 is connected to the input terminal of a tap delay circuit 23.

The zero detector 26 senses every inversion of the polarity of the output signal of the transversal filter 21 by referring to two successive samples thereof. For every sensed polarity inversion, the zero detector 26 selects one from among two related signal samples which is closer to "0", and outputs 0-point information to the tap delay circuit 23 in response to the selected signal sample.

Third Embodiment

Figure 20:
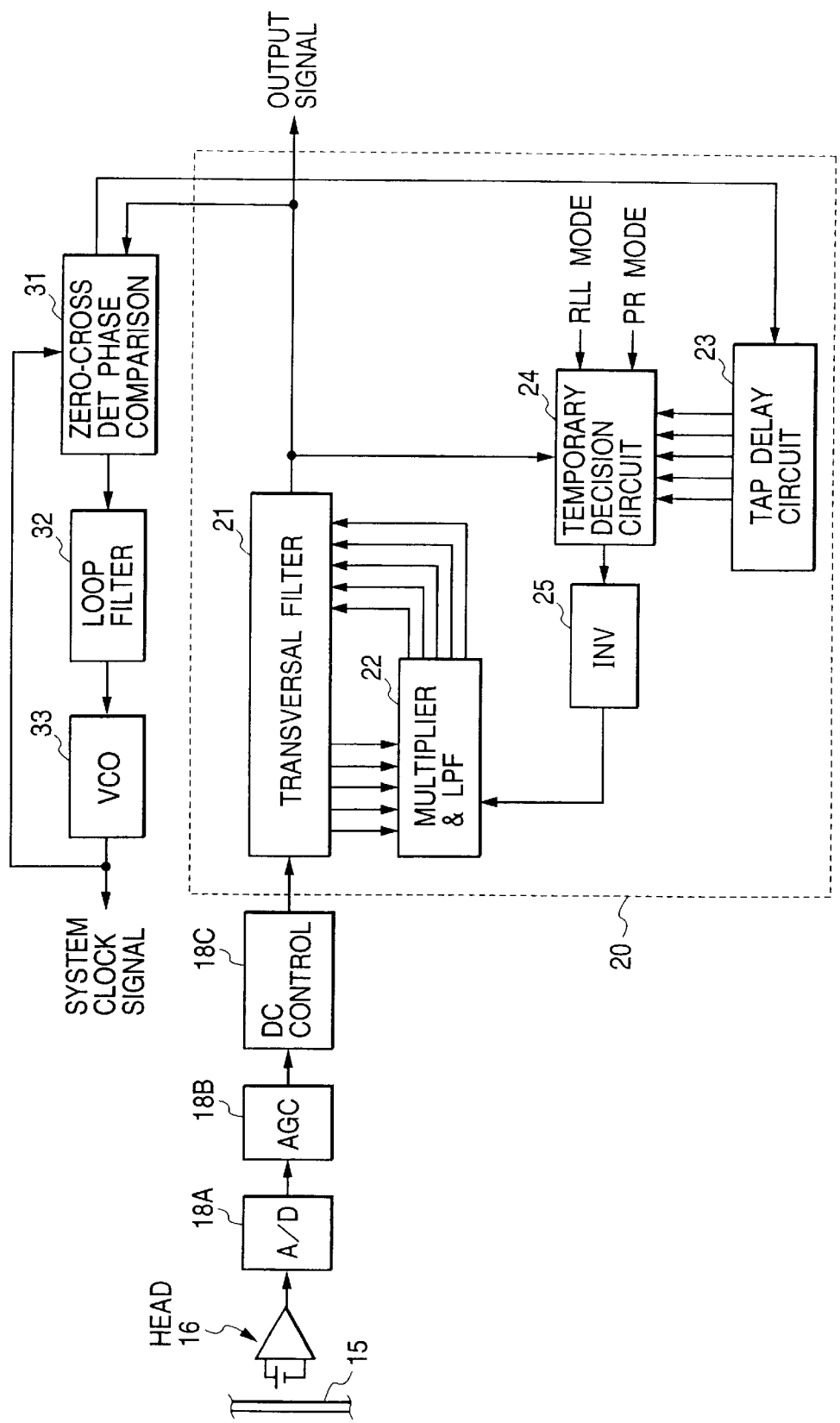
FIG. 20 is a block diagram of a portion of a reproducing apparatus according to a third embodiment of this invention.

FIG. 20 shows a portion of a reproducing apparatus according to a third embodiment of this invention. The reproducing apparatus in FIG. 20 is similar to the reproducing apparatus in FIG. 2 except for design changes mentioned hereinafter. The reproducing apparatus in FIG. 20 includes an A/D converter 18A, an AGC circuit 18B, and a DC controller 18C which successively follow an optical head 16 in that order. The output terminal of the DC controller 18C is connected to the input terminal of a transversal filter 21 within an adaptive equalization circuit 20.

The A/D converter 18A receives the output signal of the optical head 16. The A/D converter 18A changes the output signal of the optical head 16 into a corresponding digital signal (a first digital signal). Specifically, the A/D converter 18A periodically samples the output signal of the optical head 16 in response to a system clock signal, and converts every resultant sample into a digital sample. The A/D converter 18A outputs the digital signal to the AGC circuit 18B. The AGC circuit 18B subjects the output signal of the A/D converter 18A to automatic gain control for providing a constant signal amplitude on a digital basis. The AGC circuit 18B outputs the resultant digital signal to the DC controller 18C. The DC controller 18C subjects the output signal of the AGC circuit 18B to ATC (automatic threshold control). The DC controller 18C outputs the control-resultant signal to the transversal filter 21 within the adaptive equalization circuit 20.

The reproducing apparatus in FIG. 20 includes a zero-cross detection and phase comparison circuit 31, a loop filter 32, and a voltage-controlled oscillator (VCO) 33 which are connected in a closed loop in that order. The circuit 31 detects every zero-cross point of the output signal of the transversal filter 21. The circuit 31 compares the phase of the detected zero-cross point and the phase of a system clock signal fed from the VCO 33, and generates a phase error signal in response to the result of the phase comparison. The circuit 31 outputs the phase error signal to the loop filter 32. The loop filter 32 converts the phase error signal into a control voltage.

The loop filter 32 outputs the control voltage to the VCO 33. The VCO 33 oscillates at a frequency determined by the control voltage, and thereby generates the system clock signal. The VCO 33 outputs the system clock signal to the A/D converter 18A and other devices and circuits within the reproducing apparatus. The system clock signal may include a bit clock signal.

In addition, the circuit 31 generates 0-point information in response to the detected zero-cross point. The circuit 31 outputs the 0-point information to a tap delay circuit 23 within the adaptive equalization circuit 20.

Fourth Embodiment

Figure 21:
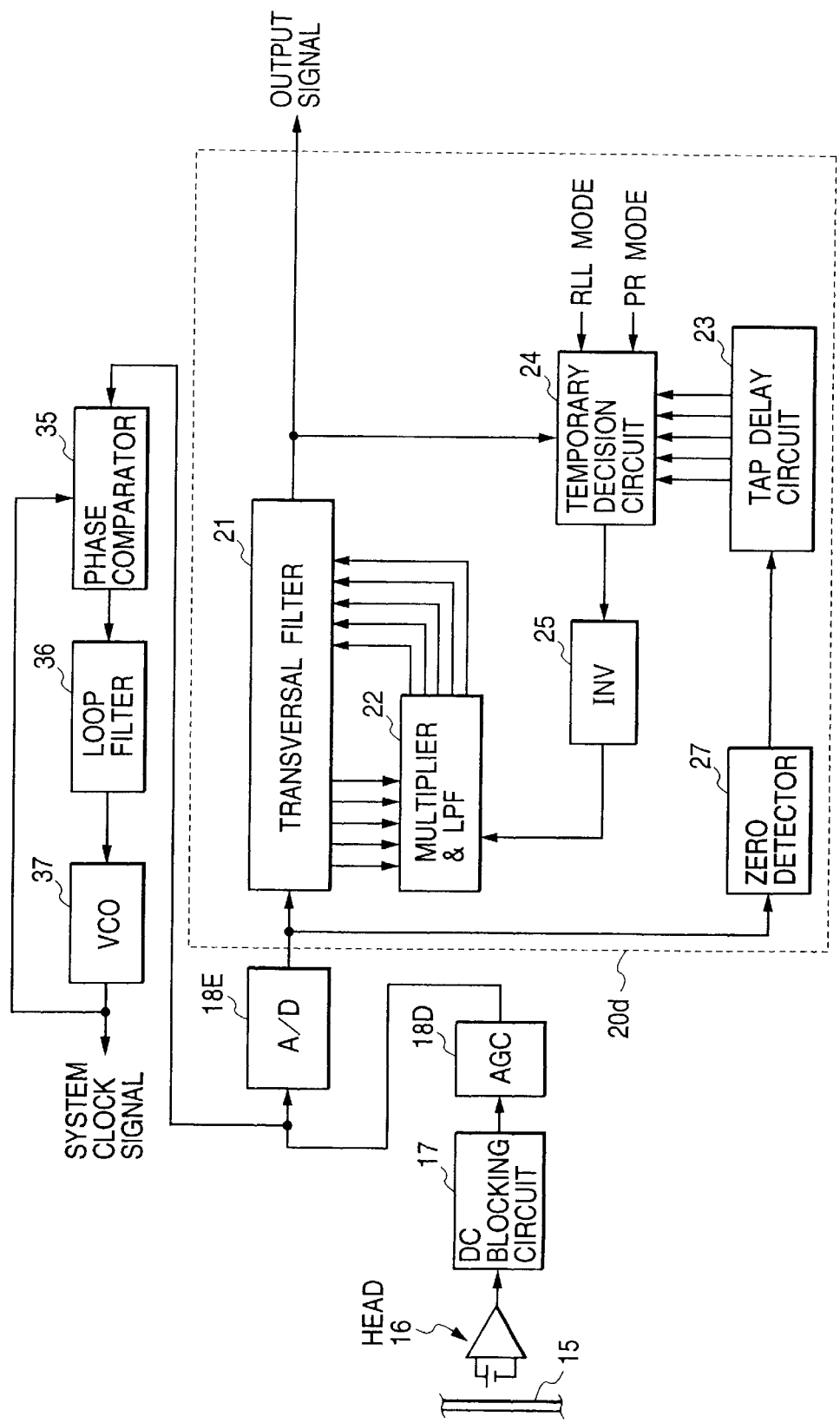
FIG. 21 is a block diagram of a portion of a reproducing apparatus according to a fourth embodiment of this invention.

FIG. 21 shows a portion of a reproducing apparatus according to a fourth embodiment of this invention. The reproducing apparatus in FIG. 21 is similar to the reproducing apparatus in FIG. 2 except for design changes mentioned hereinafter. The reproducing apparatus in FIG. 21 includes an AGC circuit 18D and an A/D converter 18E which successively follow a DC blocking circuit 17 in that order.

The reproducing apparatus in FIG. 21 includes an adaptive equalization circuit 20d instead of the adaptive equalization circuit (see FIGS. 2 and 3). The adaptive equalization circuit 20d is similar to the adaptive equalization circuit 20 except that a zero detector 27 is provided therein. The input terminal of the zero detector 27 is connected to output terminal of the A/D converter 18E. The output terminal of the zero detector 27 is connected to the input terminal of a tap delay circuit 23. The input terminal of a transversal filter 21 is connected to the output terminal of the A/D converter 18E.

The AGC circuit 18D receives the output signal of the DC blocking circuit 17. The AGC circuit 18D subjects the output signal of the DC blocking circuit 17 to automatic gain control for providing a constant signal amplitude on an analog basis. The AGC circuit 18D outputs the resultant signal to the A/D converter 18E. The A/D converter 18E changes the output signal of the AGC circuit 18D into a corresponding digital signal. Specifically, the A/D converter 18E periodically samples the output signal of the AGC circuit 18D in response to a system clock signal, and converts every resultant sample into a digital sample. The A/D converter 18E outputs the digital signal to the transversal filter 21 and the zero detector 27 within the adaptive equalization circuit 20d.

The zero detector 27 senses every inversion of the polarity of the output signal of the A/D converter 18E by referring to two successive samples thereof. For every sensed polarity inversion, the zero detector 27 selects one from among two related signal samples which is closer to "0", and outputs the selected signal sample to the tap delay circuit 23 as 0-point information.

The reproducing apparatus in FIG. 21 includes a phase comparator 35, a loop filter 36, and a voltage-controlled oscillator (VCO) 37 which are connected in a closed loop in that order. The phase comparator 35 receives the output signal of the AGC circuit 18D. The device 35 compares the phase of the output signal of the AGC circuit 18D and the phase of a system clock signal fed from the VCO 33, and generates a phase error signal in response to the result of the phase comparison. The phase comparator 35 outputs the phase error signal to the loop filter 36. The loop filter 36 converts the phase error signal into a control voltage. The loop filter 36 outputs the control voltage to the VCO 37. The VCO 37 oscillates at a frequency determined by the control voltage, and thereby generates the system clock signal. The VCO 37 outputs the system clock signal to the A/D converter 18E and other devices and circuits within the reproducing apparatus. The system clock signal may include a bit clock signal.

Fifth Embodiment

A fifth embodiment of this invention is similar to one of the first, second, third, and fourth embodiments thereof except for design changes mentioned below. In the fifth embodiment of this invention, a temporary decision device 51 (see FIG. 5) refers to only three successive 0-point information values Z.

Figure 22:
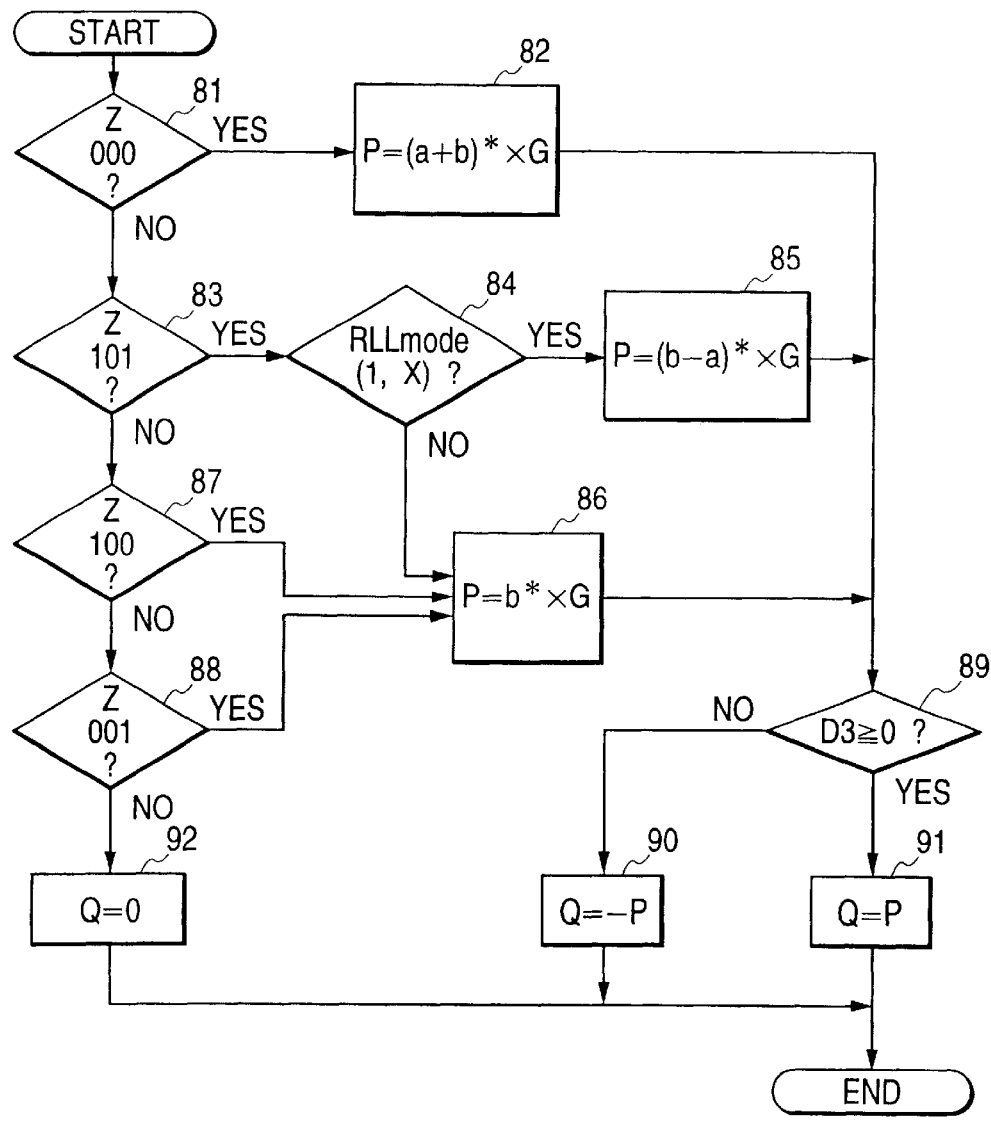
FIG. 22 is a flowchart of an algorithm of temporary decision by a temporary decision device in a fifth embodiment of this invention.

FIG. 22 is a flowchart of an algorithm of a temporary decision by the temporary decision device 51 in the fifth embodiment of this invention. The temporary decision is executed for every period of a bit clock signal.

As shown in FIG. 22, a first step 81 of the algorithm decides whether or not three successive 0-point information values Z represented by output signals of a tap delay circuit 23 (see FIG. 5) are "000". When the three successive 0-point information values Z are "000", the algorithm advances from the step 81 to a step 82.

Otherwise, the algorithm advances from the step 81 to a step 83.

In the case where the three successive 0-point information values Z are "000", the before-equalization signal waveform is fixed in a positive side or a negative side for a long time interval. Thus, in this case, the step 82 calculates a relatively large value P according to the previously-indicated equation (1). After the step 82, the algorithm advances to a step 89.

The step 83 decides whether or not the three successive 0-point information values Z are "101". When the three successive 0-point information values Z are "101", the algorithm advances from the step 83 to a step 84. Otherwise, the algorithm advances from the step 83 to a step 87.

The step 84 decides whether or not the RLL mode signal represents RLL (1, X). When the RLL mode signal represents RLL (1, X), the algorithm advances from the step 84 to a step 85.

Otherwise, the program advances from the step 84 to a step 86.

Three successive 0-point information values Z being "101" can occur only in the case of RLL (1, X). According to the before-equalization signal waveform which corresponds to three successive 0-point information values Z being "101", the signal polarity changes at an early stage. Thus, in this case, the step 85 calculates a relatively small value P according to the previously-indicated equation (2). After the step 85, the algorithm advances to the step 89.

The step 87 decides whether or not the three successive 0-point information values Z are "100". When the three successive 0-point information values Z are "100", the algorithm advances from the step 87 to the step 86. Otherwise, the algorithm advances from the step 87 to a step 88.

The step 88 decides whether or not the three successive 0-point information values Z are "001". When the three successive 0-point information values Z are "001", the algorithm advances from the step 88 to the step 86. Otherwise, the algorithm advances from the step 88 to a step 92.

In the case where the three successive 0-point information values Z are "101" and the RLL mode signal does not represent RLL (1, X), and in the case where the three successive 0-point information values Z are "100" or "001", the before-equalization signal level remains in the same for a short time interval. Thus, in this case, the step 86 calculates an intermediate value P according to the previously-indicated equation (3). After the step 86, the algorithm advances to the step 89.

The step 89 detects the polarity of the present-moment signal D3. Specifically, the step 89 decides whether or not the present-moment signal D3 is smaller than "0". When the present-moment signal D3 is equal to or greater than "0", the algorithm advances from the step 89 to a step 91. When the present-moment signal D3 is smaller than "0", the algorithm advances from the step 89 to a step 90.

The step 91 sets a temporary decision level (a temporary decision value or a temporary decision result value) Q equal to the value P. On the other hand, the step 90 sets the temporary decision level Q equal to the value −P (the value P multiplied by −1). After the steps 90 and 91, the current execution cycle of the temporary decision ends.

The step 92 sets the temporary decision level Q equal to "0". The algorithm advances to the step 92 in cases including the case where the central one among the the three successive 0-point information values Z is "1". After the step 92, the current execution cycle of the temporary decision ends.

The temporary decision device 51 outputs a signal representative of the temporary decision level (the temporary decision value) Q to the subtracter 52 as a temporary decision result signal. The temporary decision value Q is determined on the basis of one of the previously-indicated equations (1), (2), and (3). Accordingly, the equalization by the transversal filter 21 is based on one of the equations (1), (2), and (3). The equalization based on one of the equations (1), (2), and (3) is periodically executed in response to the polarity of the present-moment signal D3 at a timing of the central one (the second one) among three successive 0-point information values Z.

Sixth Embodiment

Figure 23:
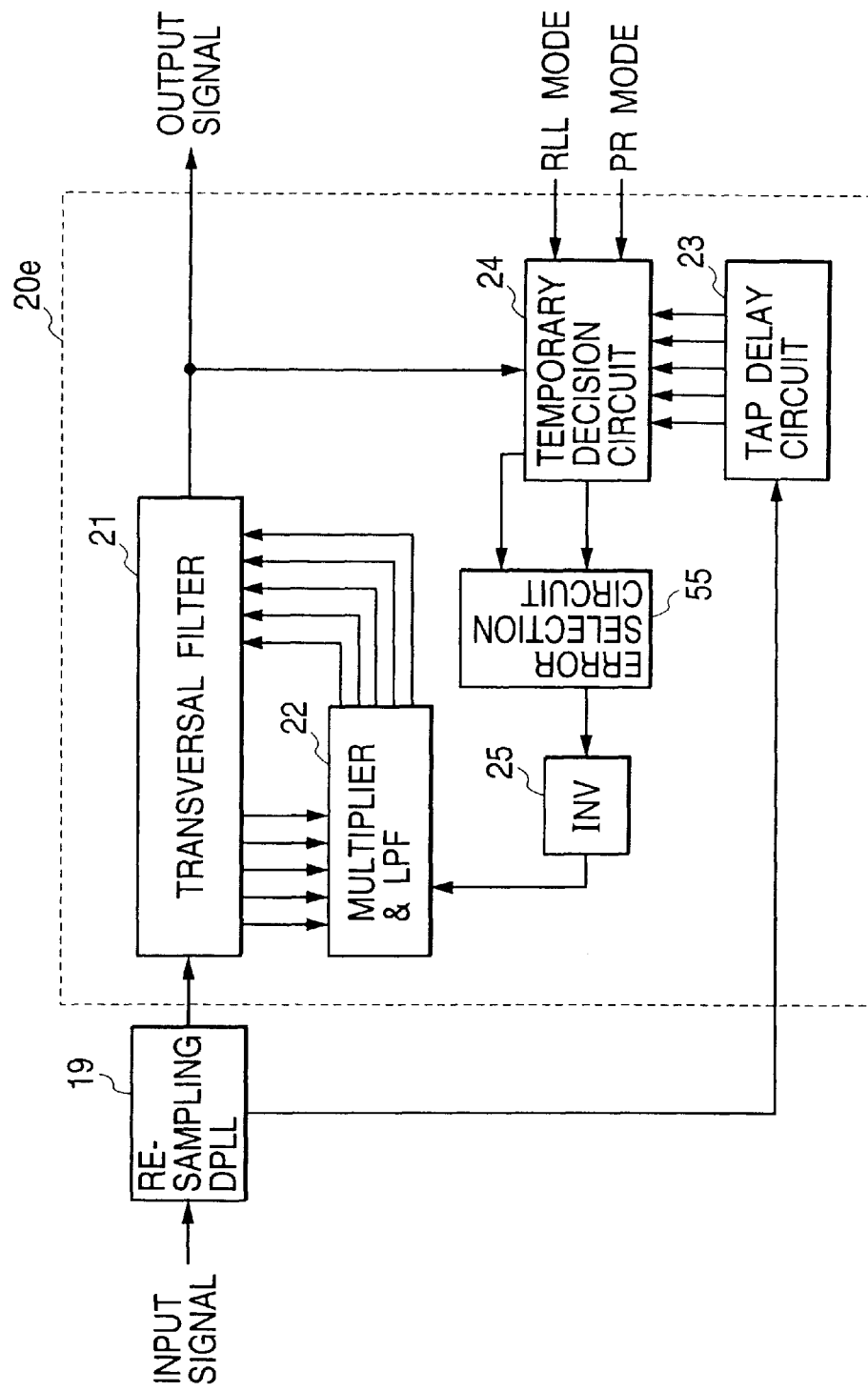
FIG. 23 is a block diagram of a portion of a reproducing apparatus according to a sixth embodiment of this invention.

FIG. 23 shows a portion of a reproducing apparatus according to a sixth embodiment of this invention. The reproducing apparatus in FIG. 23 is similar to the reproducing apparatus in FIG. 3 except that an adaptive equalization circuit 20e replaces the adaptive equalization circuit 20 (see FIGS. 2 and 3). The adaptive equalization circuit 20e includes an error selection circuit 55 connected between a temporary decision circuit 24 and an inverter 25. Regarding other points, the adaptive equalization circuit 20e is similar to the adaptive equalization circuit 20 (see FIGS. 2 and 3).

Figure 24:
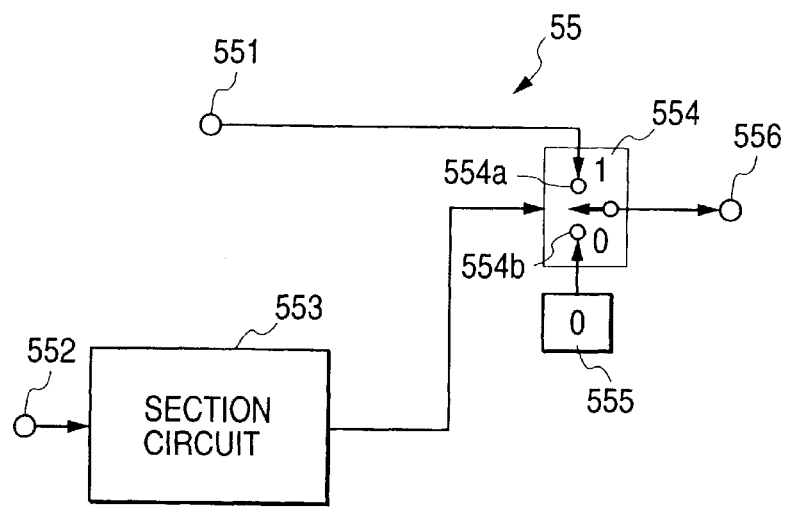
FIG. 24 is a block diagram of an error selection circuit in FIG. 23.

As shown in FIG. 24, the error selection circuit 55 includes a selection circuit 553, a switch 554, and a "0" generator 555. The selection circuit 553 receives the temporary decision result signal from the temporary decision device 51 (see FIG. 5) within the temporary decision circuit 24 via a terminal 552.

The selection circuit 553 operates as follows. In the case of RLL (2, x), when the temporary decision result signal corresponds to the value "0" (the value 0*), the value +b*, or the value −b*, the selection circuit 553 decides that the present value occurs at a zero-cross point or immediately before or after a zero-cross point. Thus, in this case, the selection circuit 553 outputs a "1" signal to a control terminal of the switch 554. When the temporary decision result signal corresponds to a value equal to none of the value "0" (the value 0*), the value +b*, and the value −b*, the selection circuit 553 outputs a "0" signal to the control terminal of the switch 554. In the case of RLL (1, X), when the temporary decision result signal corresponds to the value "0" (the value 0*), the value +(b−a)*, or the value −(b−a)*, the selection circuit 553 decides that the present value occurs at a zero-cross point or immediately before or after a zero-cross point. Thus, in this case, the selection circuit 553 outputs a "1" signal to the control terminal of the switch 554.

When the temporary decision result signal corresponds to a value equal to none of the value "0" (the value 0*), the value +(b−a)*, and the value −(b−a)*, the selection circuit 553 decides that the present value occurs at a moment remote from zero-cross points. Thus, in this case, the selection circuit 553 outputs a "0" signal to the control terminal of the switch 554.

A first input side 554a of the switch 554 receives the error signal from the D flip-flop 53 (see FIG. 5) within the temporary decision circuit 24 via a terminal 551. The "0" generator 555 continuously outputs a "0" signal to a second input side 554b of the switch 554. The switch 554 selects one of the error signal and the "0" signal in response to the output signal of the selection circuit 553, and outputs the selected signal to the inverter 25 via a terminal 556 as a final error signal. Specifically, the switch 554 selects the error signal when the output signal of the selection circuit 553 is "1". The switch 554 selects the "0" signal from the "0" generator 555 when the output signal of the selection circuit 553 is "0".

Figure 25:
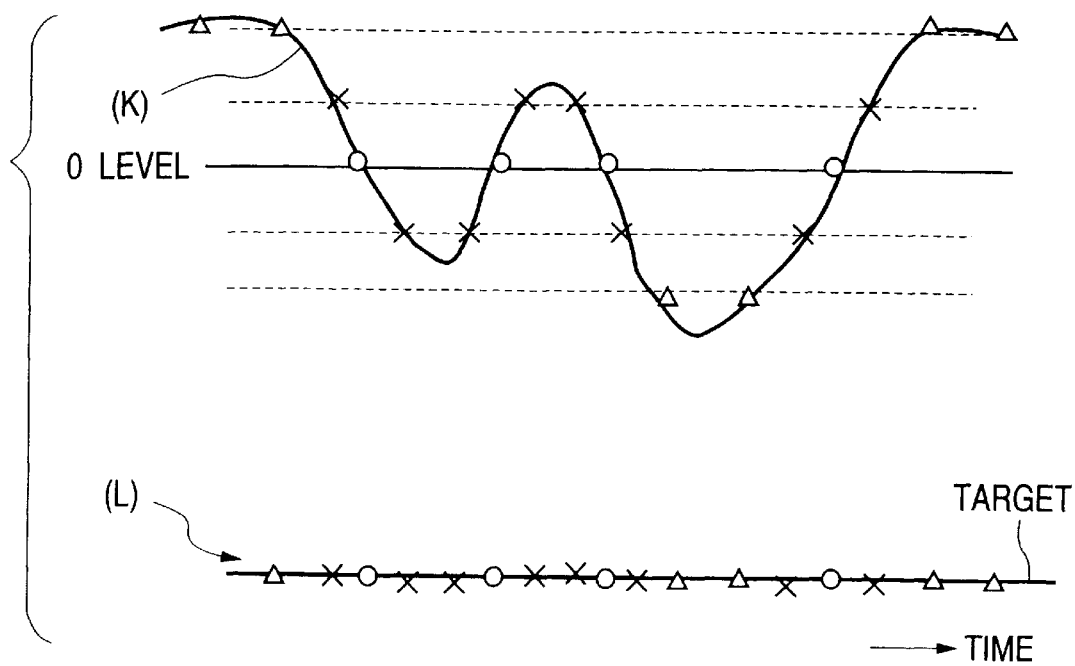
FIG. 25 is a time-domain diagram of a first example of an equalization-resultant waveform and an error signal.

FIG. 25 shows an example of a waveform (K) represented by RLL (2, X) signal samples resulting from correct PR equalization implemented by the adaptive equalization circuit 20 (see FIGS. 2 and 3) which does not have the error selection circuit 55. Regarding the equalization-resultant waveform (K), sample points corresponding to a target value equal to "0" are denoted by the circles. Sample points corresponding to target values equal to +b* and −b* are denoted by the crosses. Sample points corresponding to target values equal to +(a+b)* and −(a+b)* are denoted by the triangles. FIG. 25 also shows an error signal (L) generated in correspondence with the equalization-resultant waveform (K). The error signal (L) only slightly deviates from a target.

Figure 26:
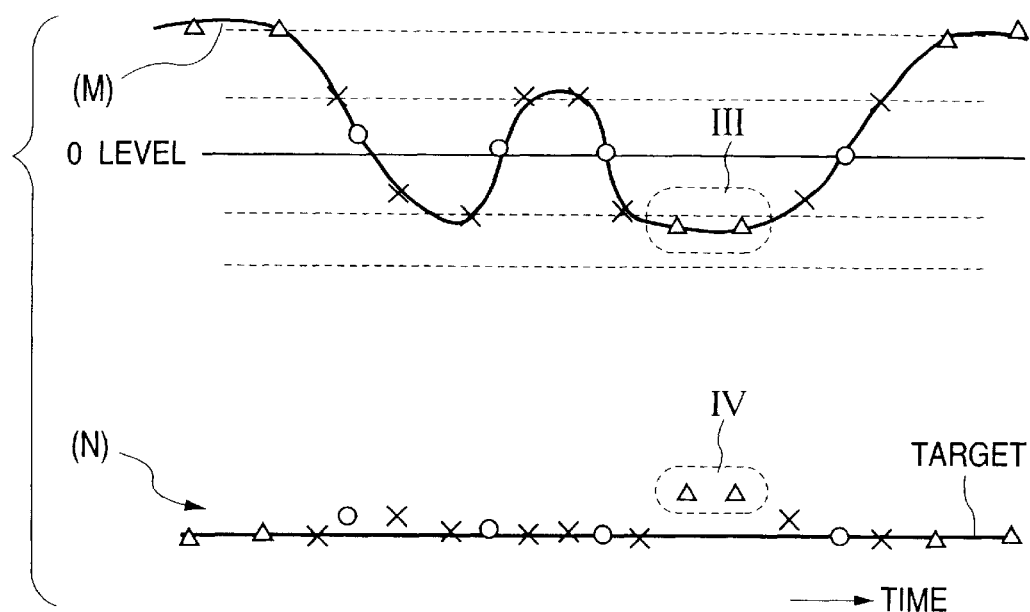
FIG. 26 is a time-domain diagram of a second example of an equalization-resultant waveform and an error signal.

FIG. 26 shows an example of a waveform (M) represented by RLL (2, X) signal samples resulting from PR equalization implemented by the adaptive equalization circuit 20 (see FIGS. 2 and 3) which does not have the error selection circuit 55. The equalization-resultant waveform (M) is similar to the equalization-resultant waveform (K) in FIG. 25 except a time range III which is relatively remote from zero-cross points. Regarding the equalization-resultant waveform (M), sample points corresponding to a target value equal to "0" are denoted by the circles. Sample points corresponding to target values equal to +b* and −b* are denoted by the crosses. Sample points corresponding to target values equal to +(a+b)* and −(a+b)* are denoted by the triangles. The equalization-resultant waveform (M) has a distortion in the time range III where sample points significantly deviate from a target value. FIG. 26 also shows an error signal (N) generated in correspondence with the equalization-resultant waveform (M). In a time range IV corresponding to the time range III, the error signal (N) significantly deviates from a target.

The error selection circuit 55 in FIGS. 23 and 24 corrects such an unreliable error signal into a reliable error signal (a final error signal). In the case of RLL (2, X), when the temporary decision result signal corresponds to the value +b* or the value −b*, the selection circuit 553 within the error selection circuit 55 decides that the present value occurs immediately before or after a zero-cross point. Thus, in this case, the selection circuit 553 outputs a "1" signal to the control terminal of the switch 554. The switch 554 selects the error signal from the temporary decision circuit 24 in response to the output signal of the selection circuit 553. Accordingly, the error signal from the temporary decision circuit 24 is used as the final error signal. On the other hand, when the temporary decision result signal corresponds to a value equal to neither the value +b* nor the value −b*, the selection circuit 553 decides that the present value occurs at a moment remote from zero-cross points. Thus, in this case, the selection circuit 553 outputs a "0" signal to the control terminal of the switch 554. The switch 554 selects the "0" signal from the "0" generator 555 in response to the output signal of the selection circuit 553. Accordingly, the error signal from the temporary decision circuit 24 is not used while the final error signal is fixed to "0".

Figure 27:
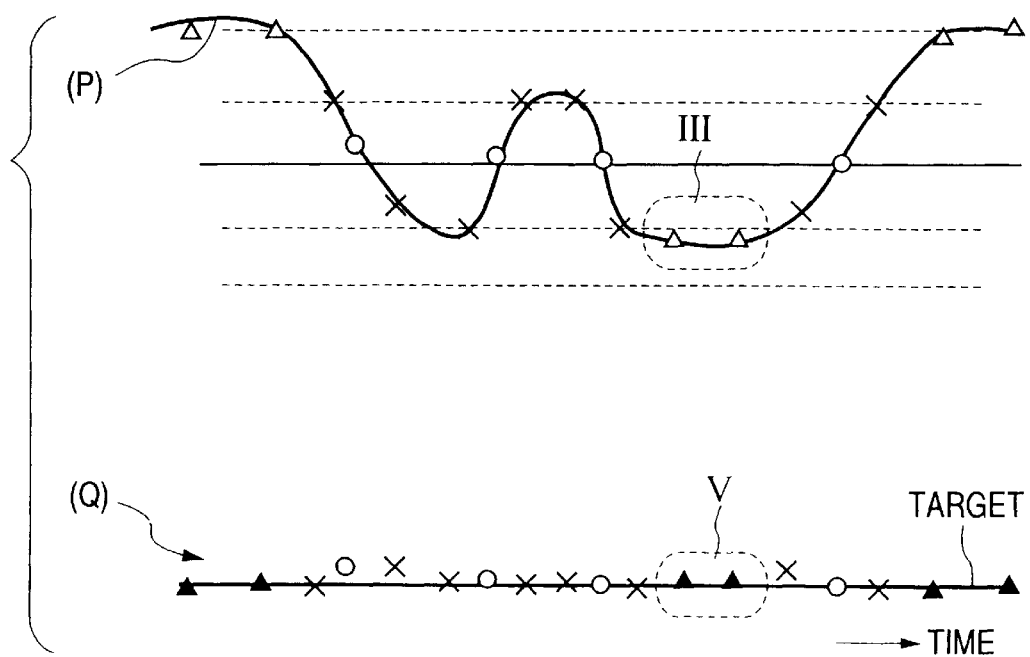
FIG. 27 is a time-domain diagram of a third example of an equalization-resultant waveform and an error signal.

FIG. 27 shows an example of a waveform (P) represented by RLL (2, X) signal samples resulting from PR equalization implemented by the adaptive equalization circuit 20e (see FIG. 23) which has the error selection circuit 55. The equalization-resultant waveform (P) is similar to the equalization-resultant waveform (K) in FIG. 25 except a time range III which is relatively remote from zero-cross points. Regarding the equalization-resultant waveform (P), sample points corresponding to a target value equal to "0" are denoted by the circles. Sample points corresponding to target values equal to +b* and −b* are denoted by the crosses. Sample points corresponding to target values equal to +(a+b)* and −(a+b)* are denoted by the triangles. The equalization-resultant waveform (P) has a distortion in the time range III where sample points significantly deviate from a target value. The error selection circuit 55 compensates for such a signal distortion which occurs in a time range remote from zero-cross points. FIG. 27 also shows a final error signal (Q) generated by the error selection circuit 55 in correspondence with the equalization-resultant waveform (P). In a time range V corresponding to the time range III, the error selection circuit 55 prevents significant deviation of the final error signal (Q) from a target.

Seventh Embodiment

Figure 28:
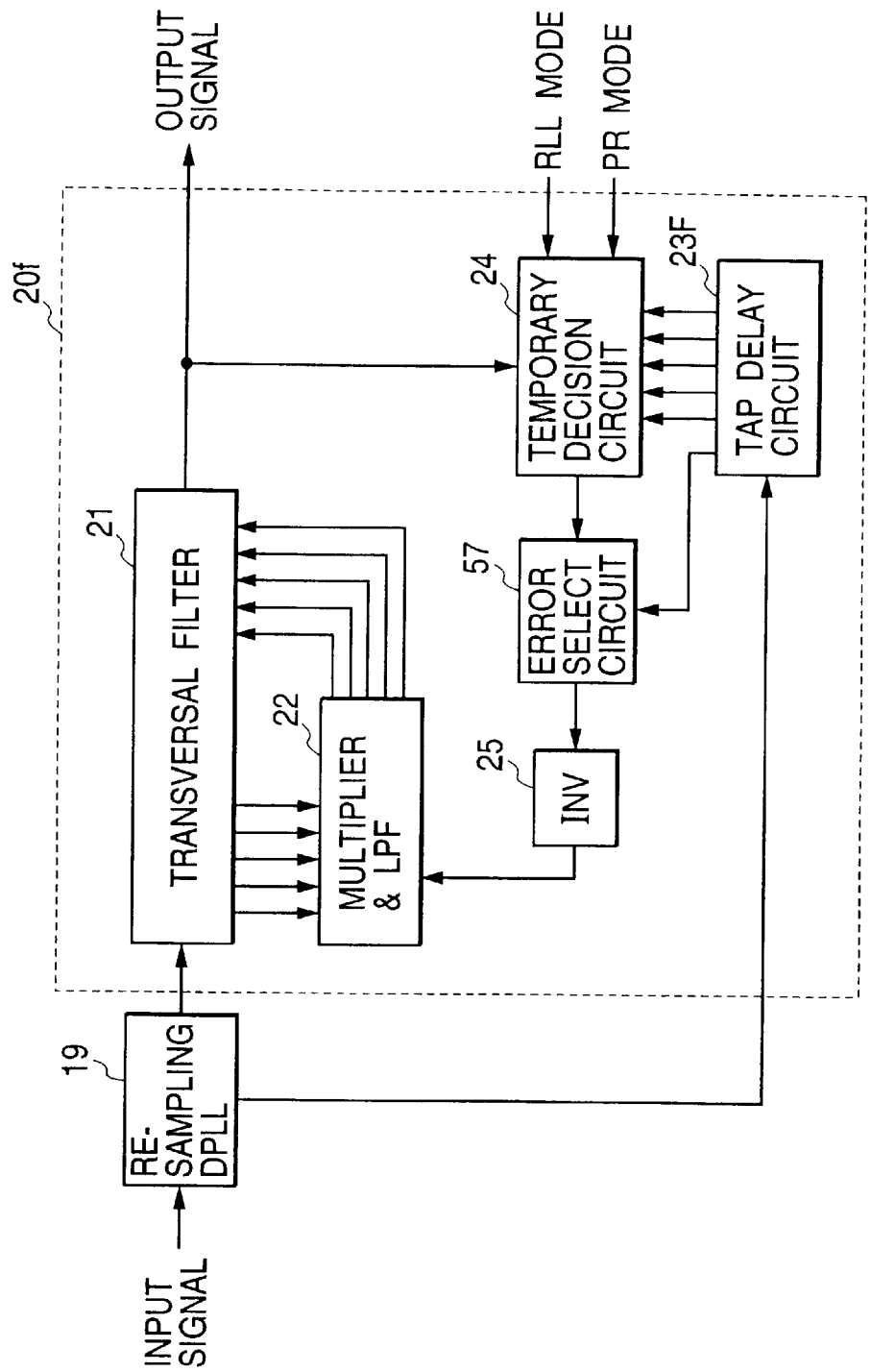
FIG. 28 is a block diagram of a portion of a reproducing apparatus according to a seventh embodiment of this invention.

FIG. 28 shows a portion of a reproducing apparatus according to a seventh embodiment of this invention. The reproducing apparatus in FIG. 28 is similar to the reproducing apparatus in FIG. 2 except that an adaptive equalization circuit 20f replaces the adaptive equalization circuit 20 (see FIGS. 2 and 3). The adaptive equalization circuit 20f includes a tap delay circuit 23F instead of the tap delay circuit 23 (see FIGS. 3 and 5). In addition, the adaptive equalization circuit 20f includes an error selection circuit 57 connected among the tap delay circuit 23F, a temporary decision circuit 24, and an inverter 25. Regarding other points, the adaptive equalization circuit 20f is similar to the adaptive equalization circuit 20 (see FIGS. 2 and 3).

Figure 29:
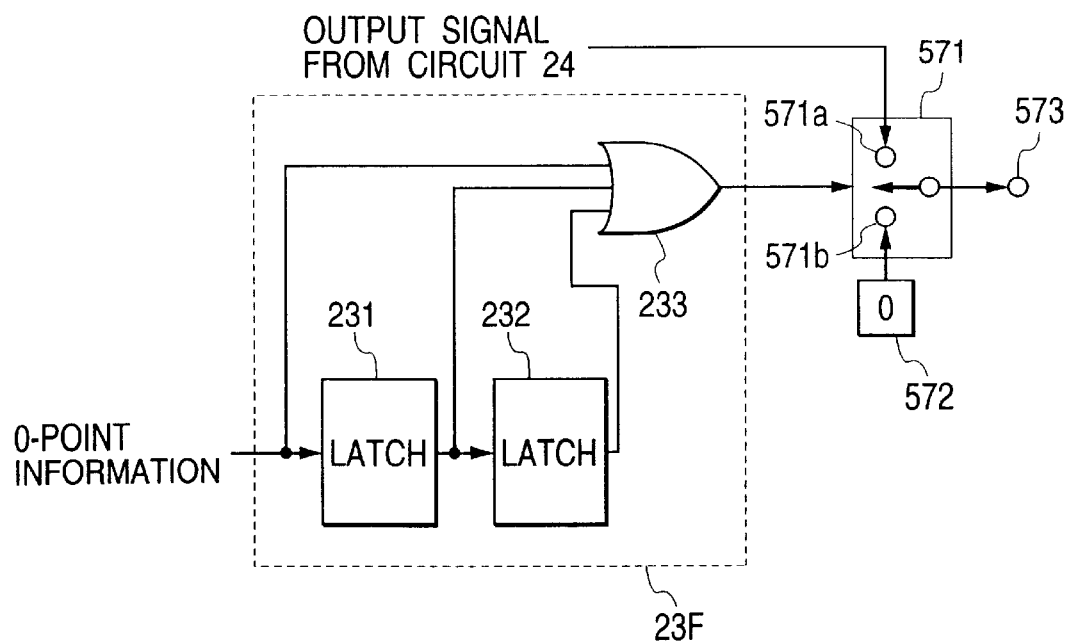
FIG. 29 is a block diagram of an error selection circuit and a portion of a tap delay circuit in FIG. 28.

The tap delay circuit 23F has an arrangement in addition to the design of the tap delay circuit 23 (see FIGS. 3 and 5). With reference to FIG. 29, the additional arrangement in the tap delay circuit 23F includes latch circuits 231 and 232, and an OR circuit 233. The latch circuit 231 receives 0-point information from a re-sampling DPLL section 19 (see FIG. 28). Also, a first input terminal of the OR circuit 233 is subjected to the 0-point information. The output terminal of the latch circuit 231 is connected to the input terminal of the latch circuit 232 and a second input terminal of the OR circuit 233. The output terminal of the latch circuit 232 is connected to a third input terminal of the OR circuit 233. The latch circuits 231 and 232 are subjected to a bit clock signal.

The latch circuit 231 delays the 0-point information by a time interval equal to one period of the bit clock signal. The latch circuit 231 outputs the resultant signal to the latch circuit 232 and the OR circuit 233. The latch circuit 232 delays the output signal of the latch circuit 231 by a time interval equal to one period of the bit clock signal. The latch circuit 232 outputs the resultant signal to the OR circuit 233. Accordingly, the OR circuit 233 receives the non-delayed 0-point information, the output signal of the latch circuit 231, and the output signal of the latch circuit 232 which are three successive 1-bit-corresponding segments or three successive samples of the 0-point information. When at least one of the three successive 1-bit-corresponding segments of the 0-point information is "1", the OR circuit 233 outputs a "1" signal. When all of the three successive 1-bit-corresponding segments of the 0-point information are "0", the OR circuit 233 outputs a "0" signal.

As shown in FIG. 29, the error selection circuit 57 includes a switch 571 and a "0" generator 572. The switch 571 has a control terminal subjected to the output signal of the OR circuit 233 within the tap delay circuit 23F. A first input side 571a of the switch 571 receives the error signal from the D flip-flop 53 (see FIG. 5) within the temporary decision circuit 24. The "0" generator 572 continuously outputs a "0" signal to a second input side 571b of the switch 571. The switch 571 selects one of the error signal and the "0" signal in response to the output signal of the OR circuit 233, and outputs the selected signal to the inverter 25 via a terminal 573 as a final error signal. Specifically, the switch 571 selects the error signal when the output signal of the OR circuit 233 is "1". The switch 571 selects the "0" signal from the "0" generator 572 when the output signal of the OR circuit 233 is "0".

In a time range at or near a zero-cross point, at least one of three successive 1-bit-corresponding segments of the 0-point information is "1" so that the OR circuit 233 outputs a "1" signal to the control terminal of the switch 571. The switch 571 selects the error signal from the temporary decision circuit 24 in response to the output signal of the OR circuit 233. Accordingly, the error signal from the temporary decision circuit 24 is used as the final error signal. On the other hand, in a time range remote from zero-cross points, all of three successive 1-bit-corresponding segments of the 0-point information are "0" so that the OR circuit 233 outputs a "0" signal to the control terminal of the switch 571. The switch 571 selects the "0" signal from the "0" generator 572 in response to the output signal of the OR circuit 233. Accordingly, the error signal from the temporary decision circuit 24 is not used while the final error signal is fixed to "0". Thus, the error selection circuit 57 compensates for a reduction in the reliability of the error signal which might occur in a time range remote from zero-cross points.

Eighth Embodiment

An eighth embodiment of this invention is similar to one of the first, second, third, fourth, fifth, sixth, and seventh embodiments thereof except for design changes mentioned below.

Figure 30:
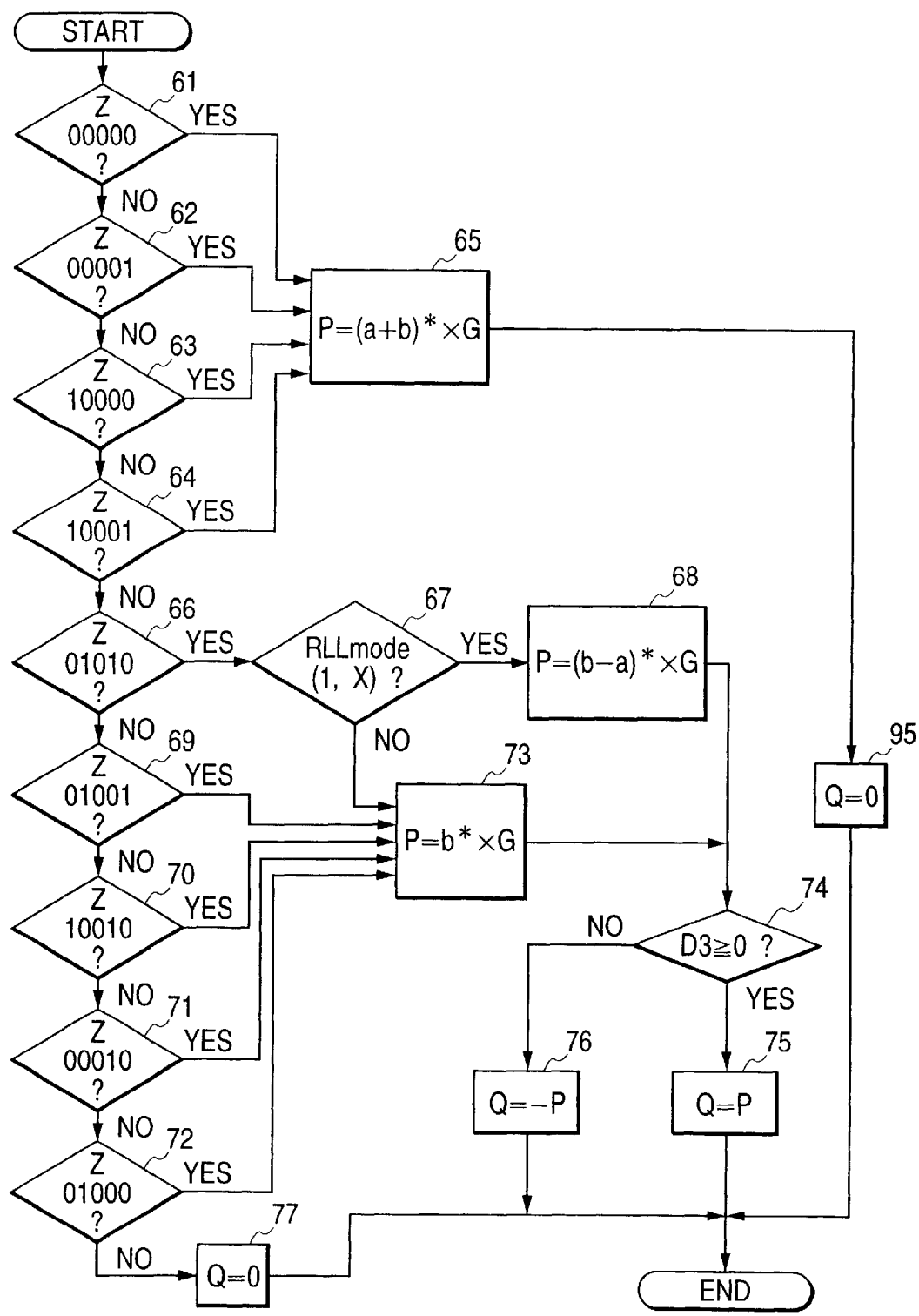
FIG. 30 is a flowchart of an algorithm of temporary decision by a temporary decision device in an eighth embodiment of this invention.

FIG. 30 is a flowchart of an algorithm of a temporary decision by a temporary decision device 51 (see FIG. 5) in the eighth embodiment of this invention. The algorithm in FIG. 30 is similar to the algorithm in FIG. 10 except for a design change mentioned below.

As shown in FIG. 30, after a step 65, the algorithm advances to a step 95. The step 95 sets a temporary decision level Q equal to "0". After the step 95, the current execution cycle of the temporary decision ends.

Five successive 0-point information values Z being "00000", "00001", "10000", or "10001" correspond to a time range remote from zero-cross points. Thus, the algorithm advances to the step 95 via the step 65 and the temporary decision level Q is set to "0" by the step 95 for a time range remote from zero-cross points. Thus, the step 95 compensates for a reduction in the reliability of an error signal which might occur in such a time range.

Ninth Embodiment

A ninth embodiment of this invention is similar to one of the first, second, third, fourth, fifth, sixth, seventh, and eighth embodiments thereof except for design changes mentioned below.

Figure 31:
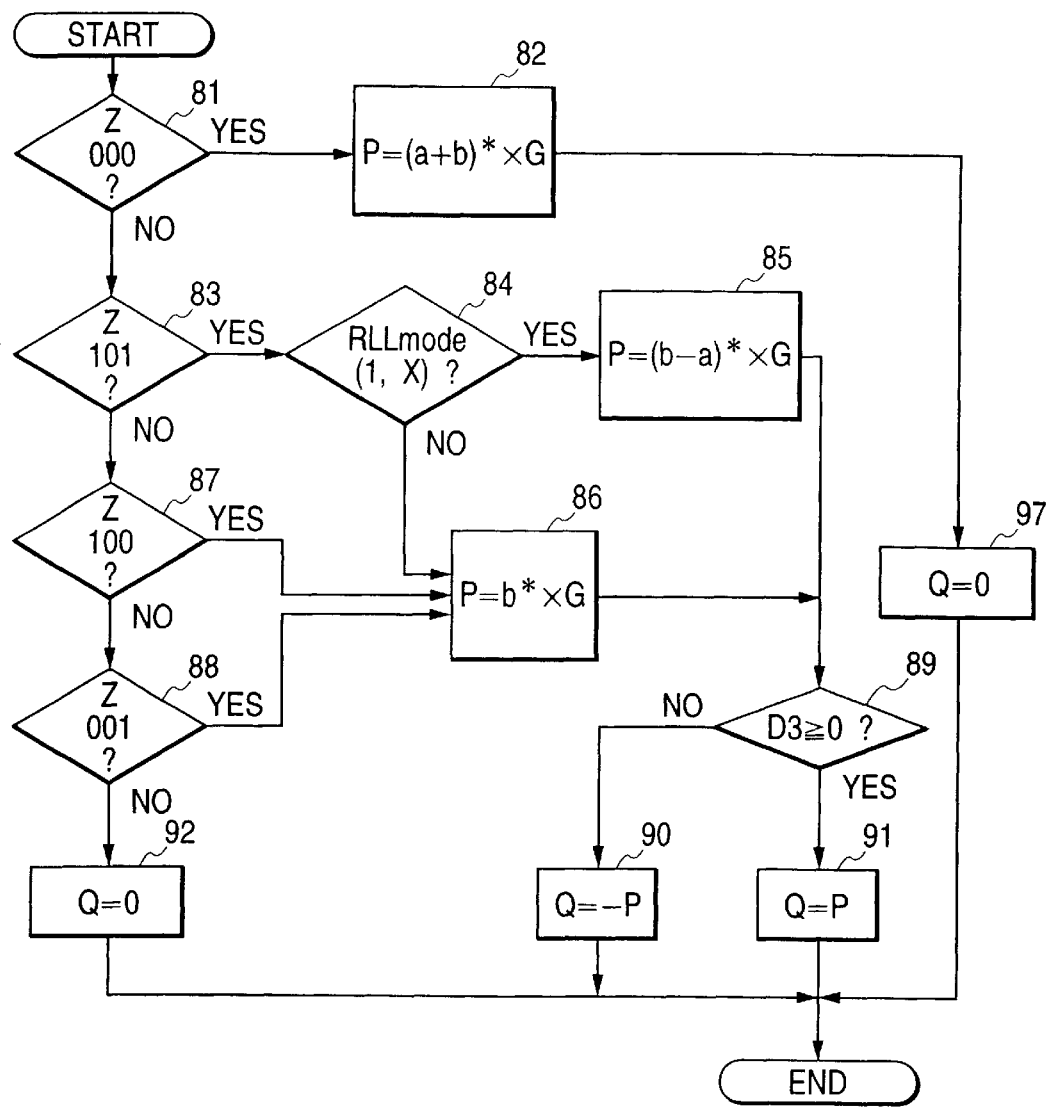
FIG. 31 is a flowchart of an algorithm of temporary decision by a temporary decision device in a ninth embodiment of this invention.

FIG. 31 is a flowchart of an algorithm of a temporary decision by a temporary decision device 51 (see FIG. 5) in the ninth embodiment of this invention. The algorithm in FIG. 31 is similar to the algorithm in FIG. 22 except for a design change mentioned below.

As shown in FIG. 31, after a step 82, the algorithm advances to a step 97. The step 97 sets a temporary decision level Q equal to "0". After the step 97, the current execution cycle of the temporary decision ends.

Three successive 0-point information values Z being "000" correspond to a time range remote from zero-cross points. Thus, the algorithm advances to the step 97 via the step 82 and the temporary decision level Q is set to "0" by the step 97 for a time range remote from zero-cross points. Thus, the step 97 compensates for a reduction in the reliability of an error signal which might occur in such a time range.

Tenth Embodiment

Figure 32:
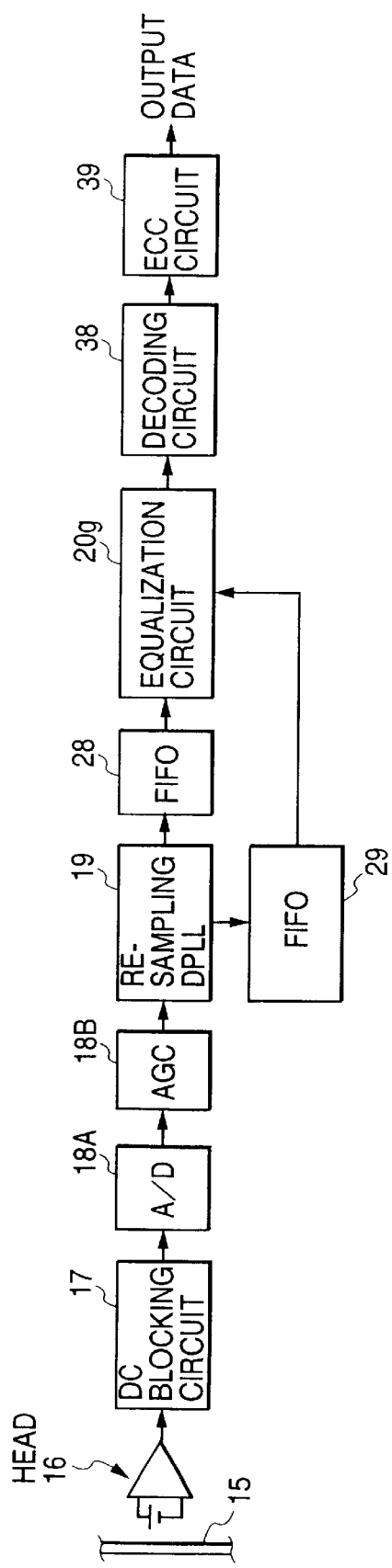
FIG. 32 is a block diagram of a reproducing apparatus according to a tenth embodiment of this invention.

FIG. 32 shows a reproducing apparatus according to a tenth embodiment of this invention. The reproducing apparatus in FIG. 32 is similar to the reproducing apparatus in FIG. 2 except that an adaptive equalization circuit 20g replaces the adaptive equalization circuit 20 (see FIG. 2), and that FIFO (fast-in fast-out) memories 28 and 29 are connected between a re-sampling DPLL section 19 and the adaptive equalization circuit 20g. The FIFO memories 28 and 29 are responsive to a bit clock signal synchronized with a system clock signal. The bit clock signal is used as a write clock signal for the FIFO memories 28 and 29.

The main output signal (the second digital signal) from the re-sampling DPLL section 19 is periodically written into the FIFO memory 28 at a timing determined by the bit clock signal. Also, the 0-point information outputted from the re-sampling DPLL section 19 is periodically written into the FIFO memory 29 at a timing determined by the bit block signal.

The FIFO memories 28 and 29 receive a new clock signal from an oscillator (not shown) as a read clock signal. The new clock signal has a frequency lower than the system clock frequency. The main digital signal (the second digital signal) is read out from the FIFO memory 28 in response to the new clock signal before being fed to the adaptive equalization circuit 20g. The 0-point information is read out from the FIFO memory 29 in response to the new clock signal before being fed to the adaptive equalization circuit 20g.

The adaptive equalization circuit 20g operates in response to the new clock signal. Accordingly, the operating frequency of the adaptive equalization circuit 20 is relatively low.

Figure 33:
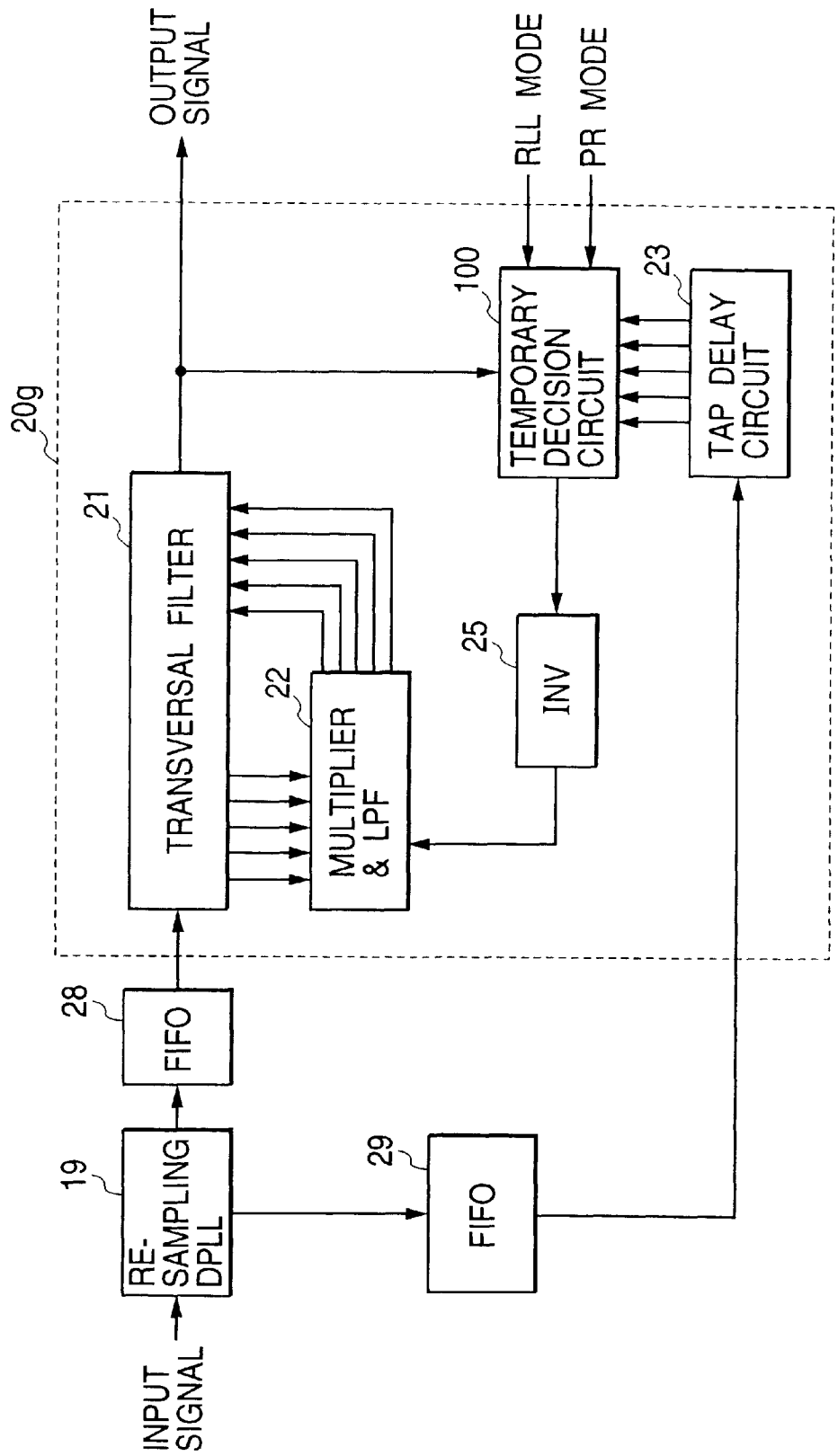
FIG. 33 is a block diagram of a portion of the reproducing apparatus in FIG. 32.

As shown in FIG. 33, the adaptive equalization circuit 20g includes a temporary decision circuit 100 instead of the temporary decision circuit 24 (see FIG. 3). A transversal filter 21 in the adaptive equalization circuit 20g receives the main digital signal (the second digital signal) from the FIFO memory 28. A tap delay circuit 23 in the adaptive equalization circuit 20g receives the 0-point information from the FIFO memory 29. Regarding other points, the adaptive equalization circuit 20g is similar to the adaptive equalization circuit 20 (see FIG. 3). The temporary decision circuit 100 is similar to the temporary decision circuit 24 (see FIG. 3) except for design changes mentioned below.

Figure 34:
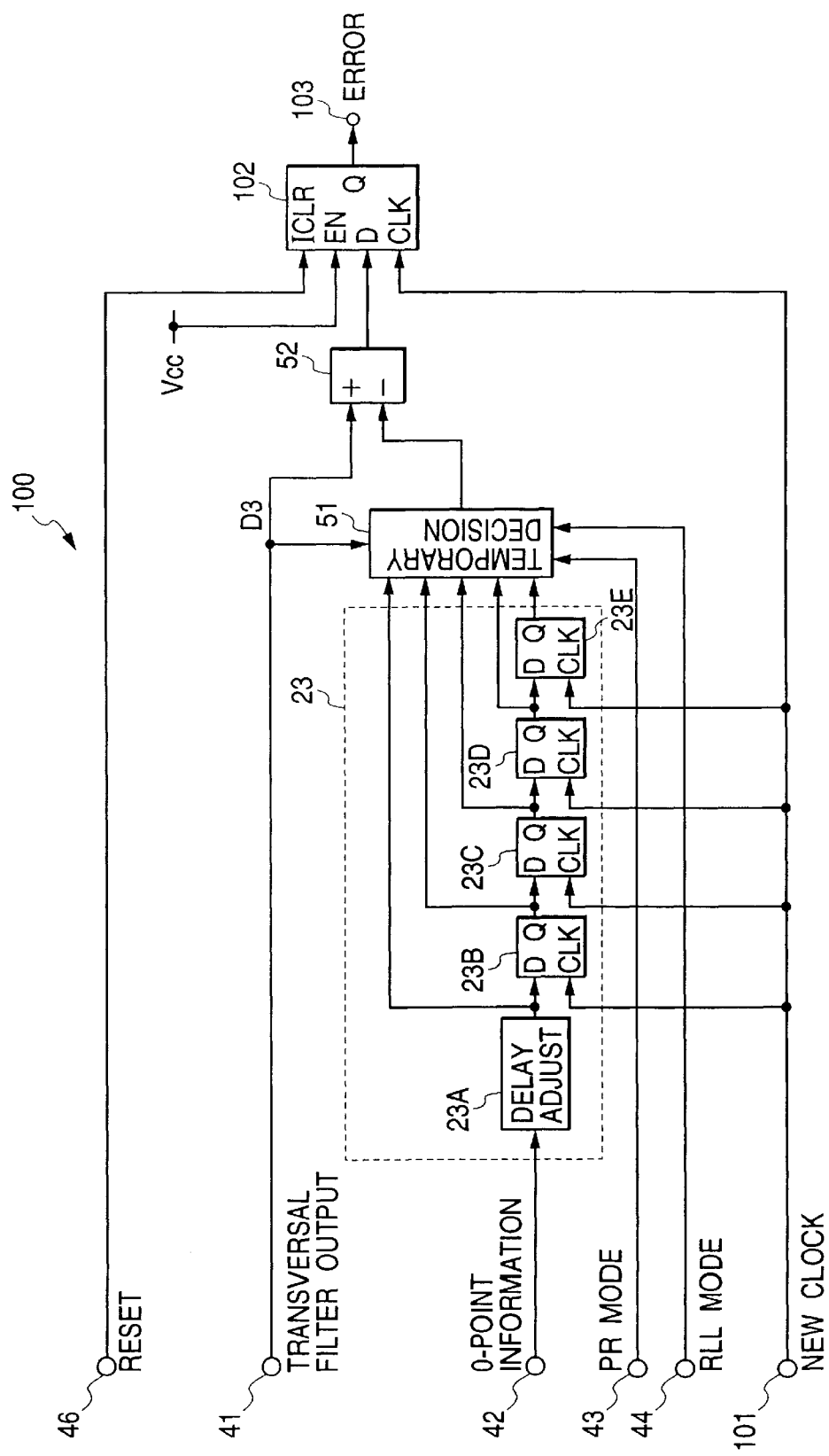
FIG. 34 is a block diagram of a temporary decision circuit and a tap delay circuit in FIG. 33.

As shown in FIG. 34, the temporary decision circuit 100 includes a D flip-flop 102 instead of the D flip-flop 53 (see FIG. 5). The enable terminal of the D flip-flop 102 is connected to a positive power supply line Vcc, and is thus continuously subjected to a high-level signal. The clock terminal of the D flip-flop 102 receives the new clock signal via a terminal 101. The D flip-flop 102 periodically latches the output signal (the error signal) of a subtracter 52 in response to the new clock signal. The D flip-flop 102 outputs the latched error signal to an inverter 25 (see FIG. 33) via a terminal 103.

A tap delay circuit 23 in the adaptive equalization circuit 20g includes D flip-flops 23B, 23C, 23D, and 23E whose clock terminals receive the new clock signal via the terminal 101. The enable terminals of the D flip-flops 23B, 23C, 23D, and 23E are continuously subjected to a high-level signal from the positive power supply line Vcc. Each of the flip-flops 23B, 23C, 23D, and 23E provides a signal delay responsive to the new clock signal.

Eleventh Embodiment

Figure 35:
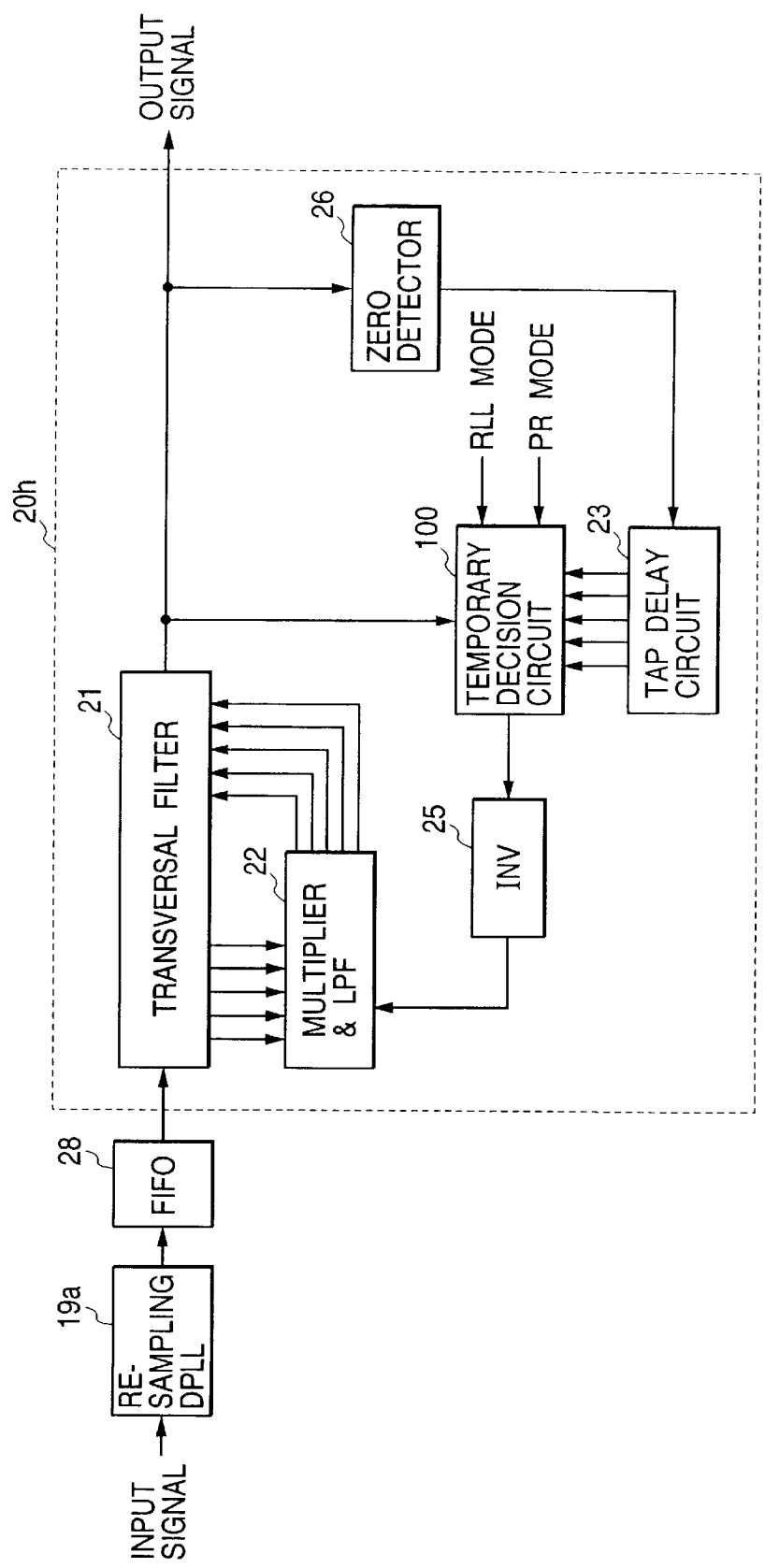
FIG. 35 is a block diagram of a portion of a reproducing apparatus according to an eleventh embodiment of this invention.

FIG. 35 shows a portion of a reproducing apparatus according to an eleventh embodiment of this invention. The reproducing apparatus in FIG. 35 is similar to the reproducing apparatus in FIG. 32 except that a re-sampling DPLL section 19a and an adaptive equalization circuit 20h replace the re-sampling DPLL section 19 and the adaptive equalization circuit 20g (see FIG. 32) respectively.

With reference to FIG. 35, the re-sampling DPLL section 19a does not generate 0-point information. The re-sampling DPLL section 19a feeds a main digital signal (a second digital signal) to a FIFO memory 28. The FIFO memory 28 temporarily stores the main digital signal. The FIFO memory 28 outputs the main digital signal (the second digital signal) to a transversal filter 21 within the adaptive equalization circuit 20h.

The adaptive equalization circuit 20h is similar to the adaptive equalization circuit 20g (see FIGS. 32 and 33) except for the following point. The adaptive equalization circuit 20g includes a zero detector 26. The input terminal of the zero detector 26 is connected to the output terminal of the transversal filter 21. The output terminal of the zero detector 26 is connected to the input terminal of a tap delay circuit 23.

The zero detector 26 senses every inversion of the polarity of the output signal of the transversal filter 21 by referring to two successive samples thereof. For every sensed polarity inversion, the zero detector 26 selects one from among two related signal samples which is closer to "0", and outputs 0-point information to the tap delay circuit 23 in response to the selected signal sample.

Twelfth Embodiment

Figure 36:
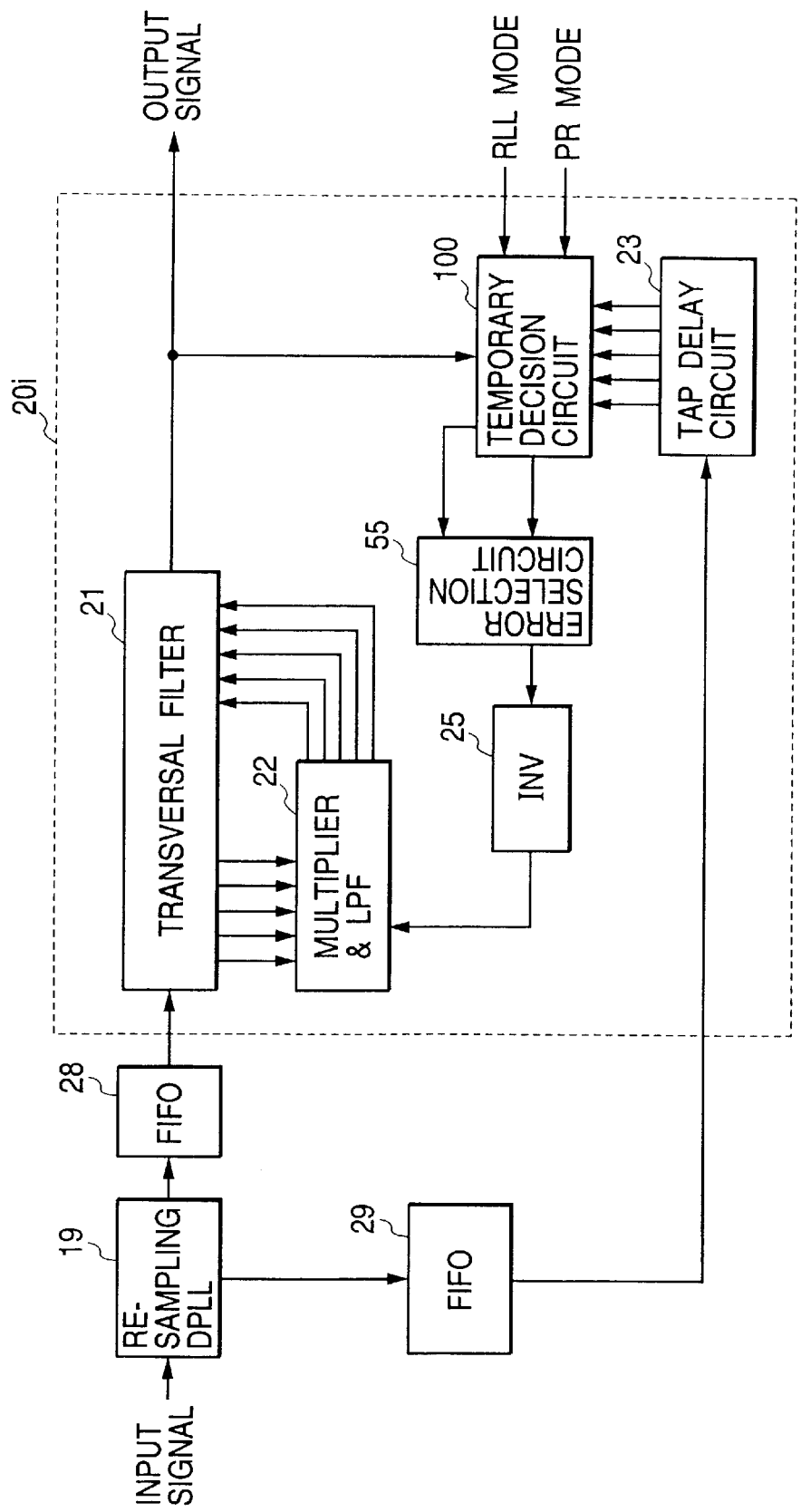
FIG. 36 is a block diagram of a portion of a reproducing apparatus according to a twelfth embodiment of this invention.

FIG. 36 shows a portion of a reproducing apparatus according to a twelfth embodiment of this invention. The reproducing apparatus in FIG. 36 is similar to the reproducing apparatus in FIG. 33 except that an adaptive equalization circuit 20i replaces the adaptive equalization circuit 20g (see FIGS. 32 and 33). The adaptive equalization circuit 20i includes an error selection circuit 55 connected between a temporary decision circuit 100 and an inverter 25. Regarding other points, the adaptive equalization circuit 20i is similar to the adaptive equalization circuit 20g (see FIGS. 32 and 33). The error selection circuit 55 in the adaptive equalization circuit 20i is similar to that in the adaptive equalization circuit 20e of FIG. 23.

Thirteenth Embodiment

Figure 37:
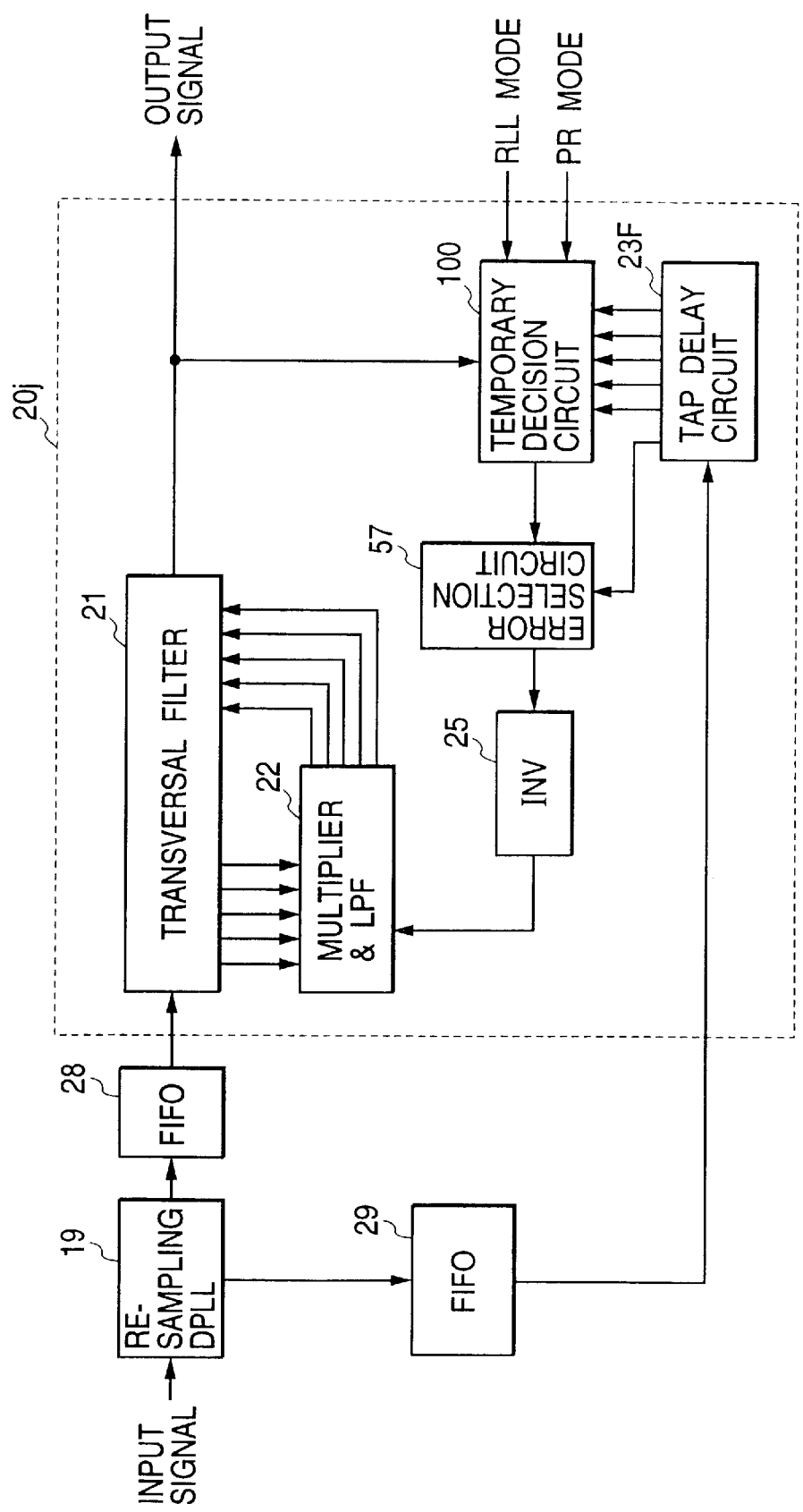
FIG. 37 is a block diagram of a portion of a reproducing apparatus according to a thirteenth embodiment of this invention.

FIG. 37 shows a portion of a reproducing apparatus according to a thirteenth embodiment of this invention. The reproducing apparatus in FIG. 37 is similar to the reproducing apparatus in FIG. 33 except that an adaptive equalization circuit 20j replaces the adaptive equalization circuit 20g (see FIGS. 32 and 33). The adaptive equalization circuit 20j includes a tap delay circuit 23F instead of the tap delay circuit 33 (see FIGS. 33 and 34). In addition, the adaptive equalization circuit 20j includes an error selection circuit 57 connected among the tap delay circuit 23F, a temporary decision circuit 100, and an inverter 25. Regarding other points, the adaptive equalization circuit 20j is similar to the adaptive equalization circuit 20g (see FIGS. 32 and 33). The tap delay circuit 23F in the adaptive equalization circuit 20j is similar to that in the adaptive equalization circuit 20f of FIG. 28. The error selection circuit 57 in the adaptive equalization circuit 20j is similar to that in the adaptive equalization circuit 20f of FIG. 28.

Fourteenth Embodiment

A fourteenth embodiment of this invention is similar to one of the first to thirteenth embodiments thereof except that at least one of the PR mode signal and the RLL mode signal is fixed.

Fifteenth Embodiment

A fifteenth embodiment of this invention is similar to one of the first to fourteenth embodiments thereof except that the inverter is replaced by an inverter array receiving the tap output signals from the transversal filter 21. The inverter array inverts the tap output signals, and outputs the inversion-resultant signals to the multiplier and LPF section 22.

Sixteenth Embodiment

A sixteenth embodiment of this invention is similar to one of the first to fourteenth embodiments thereof except that the inverter is replaced by an inverter array receiving the output signals of the multiplier and LPF section 22 which represent tap coefficients. The inverter array inverts the tap-coefficient signals, and outputs the inversion-resultant signals to the transversal filter 21.

Seventeenth Embodiment

A seventeenth embodiment of this invention is similar to one of the first to fourteenth embodiments thereof except that the inverter 25 is replaced by an arrangement which changes the polarity of a main digital signal (a second digital signal) within the transversal filter 21.

Eighteenth Embodiment

An eighteenth embodiment of this invention is similar to one of the first to fourteenth embodiments thereof except that the inverter 25 is replaced by an arrangement which implements signal-polarity inversion at a place in the loop of a signal propagation path.

Nineteenth Embodiment

Figure 38:
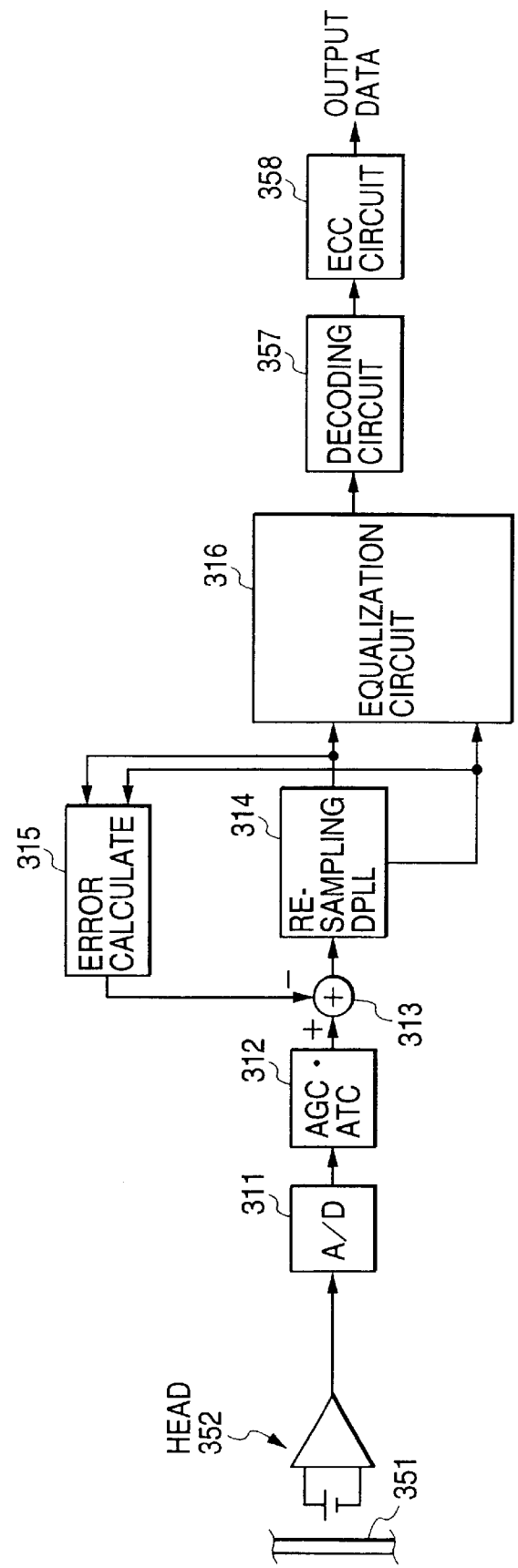
FIG. 38 is a block diagram of a reproducing apparatus according to a nineteenth embodiment of this invention.

FIG. 38 shows a reproducing apparatus according to a nineteenth embodiment of this invention. With reference to FIG. 38, an optical disc 351 stores a signal of a run-length-limited code at a predetermined high recording density. An optical head 352 reads out the signal of the run-length-limited code from the optical disc 351. The optical head 352 outputs the read-out signal to an A/D (analog-to-digital) converter 311. The A/D converter 311 changes the output signal of the optical head 352 into a corresponding digital signal. Specifically, the A/D converter 311 periodically samples the output signal of the optical head 352 in response to a fixed-frequency system clock signal, and converts every resultant sample into a digital sample. The A/D converter 311 outputs the digital signal to a digital AGC&ATC (automatic gain control and automatic threshold control) circuit 312.

The AGC&ATC circuit 312 subjects the output signal of the A/D converter 311 to automatic gain control for providing a constant signal amplitude on a digital basis. The AGC&ATC circuit 312 subjects the AGC-resultant signal to direct-current control on a digital basis which includes ATC (automatic threshold control). The AGC&ATC circuit 312 outputs the resultant digital signal to a subtracter 313. The subtracter 313 receives a signal of a direct-current offset (a DC offset) from an error calculator 315. The device 313 subtracts the DC offset signal from the output signal of the 5 AGC&ATC circuit 312. Thus, the subtracter 313 removes DC offset components from the output signal of the AGC&ATC circuit 312. The subtracter 313 outputs the subtraction-resultant digital signal to a re-sampling DPLL section 314. The output signal of the subtracter 313 is referred to as a first digital signal.

The re-sampling DPLL section 314 is similar to the re-sampling DPLL section 19 in FIGS. 2 and 16. The re-sampling DPLL section 314 converts the output signal (the first digital signal) of the subtracter 313 into a second digital signal. A timing related to samples of the output signal (the first digital signal) of the subtracter 313 is determined by the system clock signal. A timing related to samples of the second digital signal is determined by a bit clock signal synchronized with the system clock signal. Most of the timings related to samples of the second digital signal differ from those related to samples of the first digital signal by a phase of, for example, 180°. In general, the bit clock signal is a punctured clock signal and has a frequency equal to that of the system clock signal. The frequency of the bit clock signal may be different from that of the system clock signal. The re-sampling DPLL section 314 generates samples of the second digital signal from samples of the first digital signal through at least one of interpolation and decimation.

The re-sampling DPLL section 314 includes a digital PLL (phase locked loop) circuit having a closed loop. The digital PLL circuit in the re-sampling DPLL section 314 generates a second digital signal on the basis of the output signal of the subtracter 313. The second digital signal relates to a sampling frequency equal to a bit clock frequency. In general, the bit clock signal is a punctured clock signal whose frequency is equal to the system clock frequency. The bit clock frequency may be different from the system clock frequency. Specifically, samples of the second digital signal are generated from samples of the output signal of the subtracter 313 through a PLL re-sampling process based on at least one of interpolation and decimation. The re-sampling DPLL section 314 outputs the second digital signal to the error calculator 315 and an adaptive equalization circuit 316. The second digital signal is also referred to as the main digital signal or the main output signal of the re-sampling DPLL section 314.

The re-sampling DPLL section 314 includes a zero-cross detector which senses every point (every zero-cross point) at which the first digital signal (or 0°-phase-point data samples) crosses a zero level. The zero-cross detector generates 0-point information representative of every sensed point. In the re-sampling DPLL section 314, the timing of the re-sampling or the frequency and phase of the re-sampling are locked so that the levels represented by zero-cross-point-corresponding samples of the second digital signal will be equal to "0". The re-sampling DPLL section 314 outputs the 0-point information to the error calculator 315 and the adaptive equalization circuit 316 as the sub output signal.

The adaptive equalization circuit 316 is similar to the adaptive equalization circuit 20 in FIGS. 2 and 3. The adaptive equalization circuit 316 subjects the main output signal (the second digital signal) from the re-sampling DPLL section 314 to automatic waveform equalization in response to the 0-point information fed from the re-sampling DPLL section 314. The automatic waveform equalization corresponds to a process of providing the signal in question with a partial-response (PR) characteristic. The adaptive equalization circuit 316 outputs the equalization-resultant signal to a decoding circuit 357. The decoding circuit 357 recovers original data from the output signal of the adaptive equalization circuit 316 through a viterbi decoding process. The decoding circuit 357 outputs the recovered data to an ECC (error checking and correcting) circuit 358.

The decoding circuit 357 includes a memory loaded with a plurality of candidate recovered data pieces. Also, the decoding circuit 357 includes a section for calculating branch metric values from samples of the output signal of the adaptive equalization circuit 316. Furthermore, the decoding circuit 357 includes a section for accumulating the branch metric values into path metric values respectively. The path metric values relate to the candidate recovered data pieces respectively. In addition, the decoding circuit 357 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 358 extracts an error correction code from the recovered data outputted by the decoding circuit 357. The ECC circuit 358 corrects errors in the recovered data in response to the error correction code. The ECC circuit 358 outputs the resultant recovered data.

Figure 39:
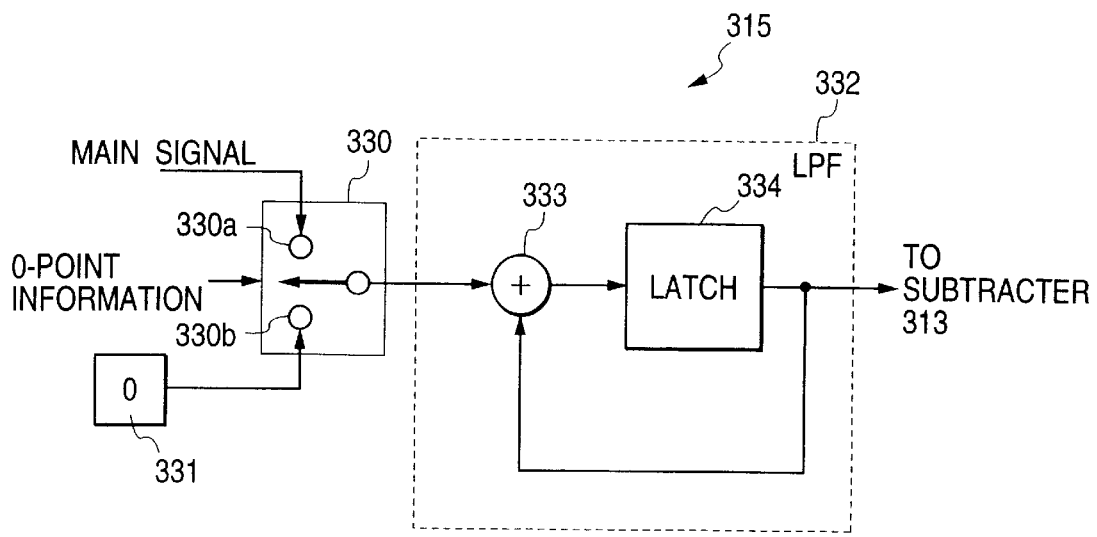
FIG. 39 is a block diagram of an error calculator in FIG. 38.

As shown in FIG. 39, the error calculator 315 includes a switch 330, a "0" generator 331, and a low pass filter 332. A first input side 330a of the switch 330 receives the main output signal (the second digital signal) from the re-sampling DPLL section 314. The "0" generator 331 continuously applies a "0" signal to a second input side 330b of the switch 330. The switch 330 has a control terminal receiving the 0-point information from the re-sampling DPLL section 314. The switch 330 selects one of the main output signal of the re-sampling DPLL section 314 and the "0" signal in response to the 0-point information, and outputs the selected signal to the low pass filter 332. Specifically, the switch 330 selects the main output signal of the re-sampling DPLL section 314 when the 0-point information is "1". The switch 330 selects the "0" signal from the "0" generator 331 when the 0-point information is "0".

The low pass filter 332 has an adder 333 and a latch circuit 334. A first input terminal of the adder 333 receives the output signal of the switch 330. A second input terminal of the adder 333 receives the output signal of the latch circuit 334. The device 333 adds the output signal of the switch 330 and the output signal of the latch circuit 334. The adder 333 outputs the addition-resultant signal to the latch circuit 334. The latch circuit 334 latches the output signal of the adder 333 in response to the bit clock signal. The latch circuit 334 outputs the latched signal to the subtracter 313 and the adder 333. The latch circuit 334 provides a 1-bit-corresponding signal delay (a 1-sample-corresponding signal delay). The low pass filter 332 integrates the output signal of the switch 330 into the DC offset signal. The low pass filter 332 outputs the DC offset signal to the subtracter 313.

Figure 40:
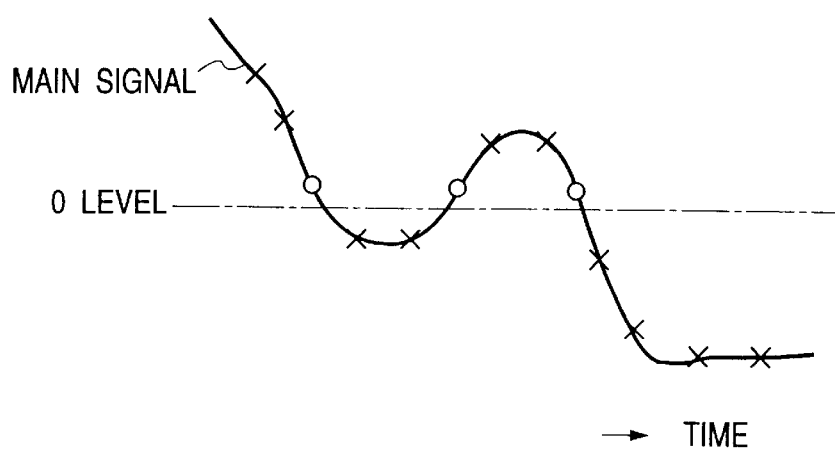
FIG. 40 is a time-domain diagram of an example of a waveform represented by a main output signal of a re-sampling DPLL section in FIG. 38.

FIG. 40 shows an example of the waveform represented by the main output signal (the second digital signal) from the re-sampling DPLL section 314. In FIG. 40, signal samples corresponding to zero-cross points are denoted by the circles while signal samples not corresponding thereto are denoted by the crosses. Only signal samples corresponding to zero-cross points are selected by the switch 330, and are used by the low pass filter 332 in generating the DC offset signal.

Twentieth Embodiment

A twentieth embodiment of this invention is similar to the nineteenth embodiment thereof except that an error calculator 315A replaces the error calculator 315 (see FIGS. 38 and 39).

Figure 41:
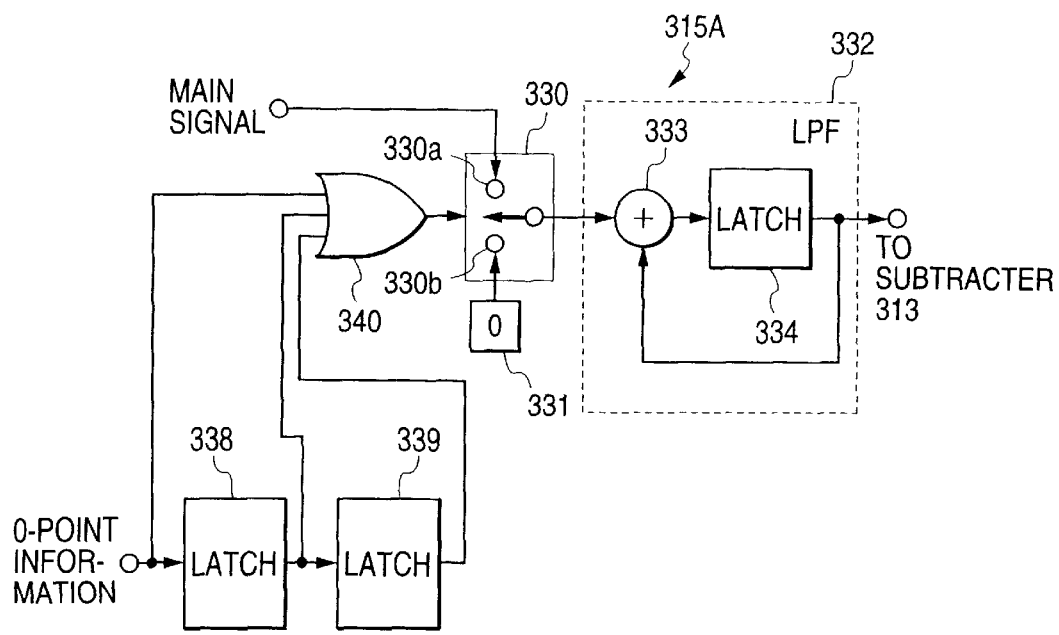
FIG. 41 is a block diagram of an error calculator in a twentieth embodiment of this invention.

As shown in FIG. 41, the error calculator 315A includes latch circuits 338 and 339, and an OR circuit 340. Regarding other points, the error calculator 315A is similar to the error calculator 315 (see FIGS. 38 and 39). The latch circuit 338 receives 0-point information from a re-sampling DPLL section 314 (see FIG. 38). Also, a first input terminal of the OR circuit 340 is subjected to the 0-point information. The output terminal of the latch circuit 338 is connected to the input terminal of the latch circuit 339 and a second input terminal of the OR circuit 340. The output terminal of the latch circuit 339 is connected to a third input terminal of the OR circuit 340. The output terminal of the OR circuit 340 is connected to a control terminal of a switch 330. The latch circuits 338 and 339 are subjected to a bit clock signal.

The latch circuit 338 delays the 0-point information by a time interval equal to one period of the bit clock signal. The latch circuit 338 outputs the resultant signal to the latch circuit 339 and the OR circuit 340. The latch circuit 339 delays the output signal of the latch circuit 338 by a time interval equal to one period of the bit clock signal. The latch circuit 339 outputs the resultant signal to the OR circuit 340. Accordingly, the OR circuit 340 receives the non-delayed 0-point information, the output signal of the latch circuit 338, and the output signal of the latch circuit 339 which are three successive 1-bit-corresponding segments or three successive samples of the 0-point information. When at least one of three successive 1-bit-corresponding segments of the 0-point information is "1", the OR circuit 340 outputs a "1" signal to the control terminal of the switch 330. When all of three successive 1-bit-corresponding segments of the 0-point information are "0", the OR circuit 340 outputs a "0" signal to the control terminal of the switch 330.

The switch 330 receives a main output signal (a second digital signal) from the re-sampling DPLL section 314 (see FIG. 38). A "0" generator 331 continuously applies a "0" signal to the switch 330. The switch 330 selects one of the main output signal of the re-sampling DPLL section 314 and the "○" signal in response to the output signal of the OR circuit 340, and outputs the selected signal to a low pass filter 332. Specifically, the switch 330 selects the main output signal of the re-sampling DPLL section 314 when the output signal of the OR circuit 340 is "1". The switch 330 selects the "0" signal from the "0" generator 331 when the output signal of the OR circuit 340 is "0".

Figure 42:
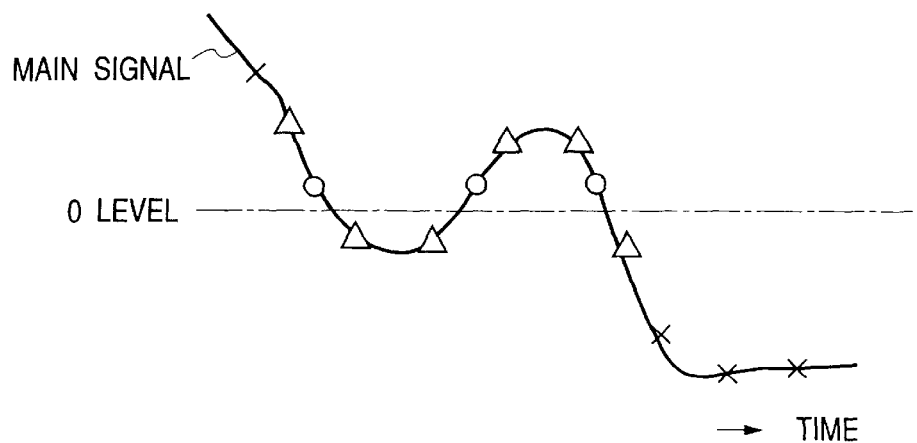
FIG. 42 is a time-domain diagram of an example of a waveform represented by a main output signal of a re-sampling DPLL section in the twentieth embodiment of this invention.

FIG. 42 shows an example of the waveform represented by the main output signal (the second digital signal) from the re-sampling DPLL section 314 (see FIG. 38). In FIG. 42, signal samples corresponding to zero-cross points are denoted by the circles while signal samples immediately preceding and immediately following the zero-cross-point signal samples are denoted by the triangles. In FIG. 42, other signal points are denoted by the crosses. Only signal samples corresponding to zero-cross points, and signal samples immediately preceding and immediately following the zero-cross-point signal samples are selected by the switch 330, and are used by the low pass filter 332 in generating a DC offset signal.

Twenty-First Embodiment

Figure 43:
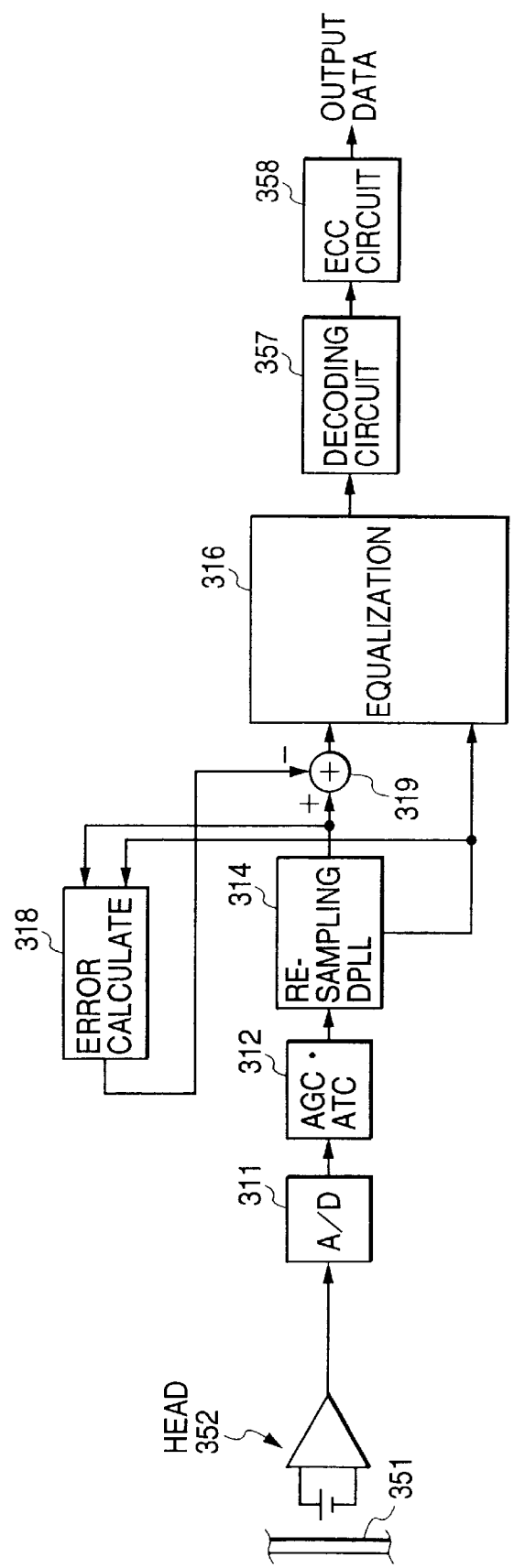
FIG. 43 is a block diagram of a reproducing apparatus according to a twenty-first embodiment of this invention.

FIG. 43 shows a reproducing apparatus according to a twenty-first embodiment of this invention. With reference to FIG. 43, an optical disc 351 stores a signal of a run-length-limited code at a predetermined high recording density. An optical head 352 reads out the signal of the run-length-limited code from the optical disc 351. The optical head 352 outputs the read-out signal to an A/D (analog-to-digital) converter 311. The A/D converter 311 changes the output signal of the optical head 352 into a corresponding digital signal. Specifically, the A/D converter 311 periodically samples the output signal of the optical head 352 in response to a fixed-frequency system clock signal, and converts every resultant sample into a digital sample. The A/D converter 311 outputs the digital signal to a digital AGC&ATC (automatic gain control and automatic threshold control) circuit 312.

The AGC&ATC circuit 312 subjects the output signal of the A/D converter 311 to automatic gain control for providing a constant signal amplitude on a digital basis. The AGC&ATC circuit 312 subjects the AGC-resultant signal to direct-current control on a digital basis which includes ATC (automatic threshold control). The AGC&ATC circuit 312 outputs the resultant digital signal to a re-sampling DPLL section 314. The output signal of the AGC&ATC circuit 312 is referred to as a first digital signal.

The re-sampling DPLL section 314 is similar to the re-sampling DPLL section 19 in FIGS. 2 and 16. The re-sampling DPLL section 314 converts the output signal (the first digital signal) of the AGC&ATC circuit 312 into a second digital signal. A timing related to samples of the output signal (the first digital signal) of the AGC&ATC circuit 312 is determined by the system clock signal. A timing related to samples of the second digital signal is determined by a bit clock signal synchronized with the system clock signal. Most of the timings related to samples of the second digital signal differ from those related to samples of the first digital signal by a phase of, for example, 180°. In general, the bit clock signal is a punctured clock signal and has a frequency equal to that of the system clock signal. The frequency of the bit clock signal may be different from that of the system clock signal. The re-sampling DPLL section 314 generates samples of the second digital signal from samples of the first digital signal through at least one of interpolation and decimation.

The re-sampling DPLL section 314 includes a digital PLL (phase locked loop) circuit having a closed loop. The digital PLL circuit in the re-sampling DPLL section 314 generates a second digital signal on the basis of the output signal of the AGC&ATC circuit 312. The second digital signal relates to a sampling frequency equal to a bit clock frequency. In general, the bit clock signal is a punctured clock signal whose frequency is equal to the system clock frequency. The bit clock frequency may be different from the system clock frequency. Specifically, samples of the second digital signal are generated from samples of the output signal of the AGC&ATC circuit 312 through a PLL re-sampling process based on at least one of interpolation and decimation. The re-sampling DPLL section 314 outputs the second digital signal to an error calculator 318 and a subtracter 319 as the main output signal.

The re-sampling DPLL section 314 includes a zero-cross detector which senses every point (every zero-cross point) at which the first digital signal (or 0°-phase-point data samples) crosses a zero level. The zero-cross detector generates 0-point information representative of every sensed point. In the re-sampling DPLL section 314, the timing of the re-sampling or the frequency and phase of the re-sampling are locked so that the levels represented by zero-cross-point-corresponding samples of the second digital signal will be equal to "0". The re-sampling DPLL section 314 outputs the 0-point information to an adaptive equalization circuit 316 and the error calculator 318 as the sub output signal.

The subtracter 319 receives a signal of a direct-current offset (a DC offset) from the error calculator 318. The device 319 subtracts the DC offset signal from the second digital signal, that is, the main output signal of the re-sampling DPLL section 314. Thus, the subtracter 319 removes DC offset components from the main output signal of the re-sampling DPLL section 314. The subtracter 319 outputs the subtraction-resultant digital signal to the adaptive equalization circuit 316.

The adaptive equalization circuit 316 is similar to the adaptive equalization circuit 20 in FIGS. 2 and 3. The adaptive equalization circuit 316 subjects the output signal of the subtracter 319 to automatic waveform equalization in response to the 0-point information fed from the re-sampling DPLL section 314. The automatic waveform equalization corresponds to a process of providing the signal in question with a partial-response (PR) characteristic. The adaptive equalization circuit 316 outputs the equalization-resultant signal to a decoding circuit 357. The decoding circuit 357 recovers original data from the output signal of the adaptive equalization circuit 316 through a viterbi decoding process. The decoding circuit 357 outputs the recovered data to an ECC (error checking and correcting) circuit 358.

The decoding circuit 357 includes a memory loaded with a plurality of candidate recovered data pieces. Also, the decoding circuit 357 includes a section for calculating branch metric values from samples of the output signal of the adaptive equalization circuit 316. Furthermore, the decoding circuit 357 includes a section for accumulating the branch metric values into path metric values respectively. The path metric values relate to the candidate recovered data pieces respectively. In addition, the decoding circuit 357 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 358 extracts an error correction code from the recovered data outputted by the decoding circuit 357. The ECC circuit 358 corrects errors in the recovered data in response to the error correction code. The ECC circuit 358 outputs the resultant recovered data.

The error calculator 318 is similar to the error calculator 315 (see FIGS. 38 and 39) or the error calculator 315A (see FIG. 41). The error calculator 318 generates the DC offset signal in response to the second digital signal and the 0-point information outputted from the re-sampling DPLL section 314. The error calculator 318 outputs the DC offset signal to the subtracter 319.

Twenty-Second Embodiment

Figure 44:
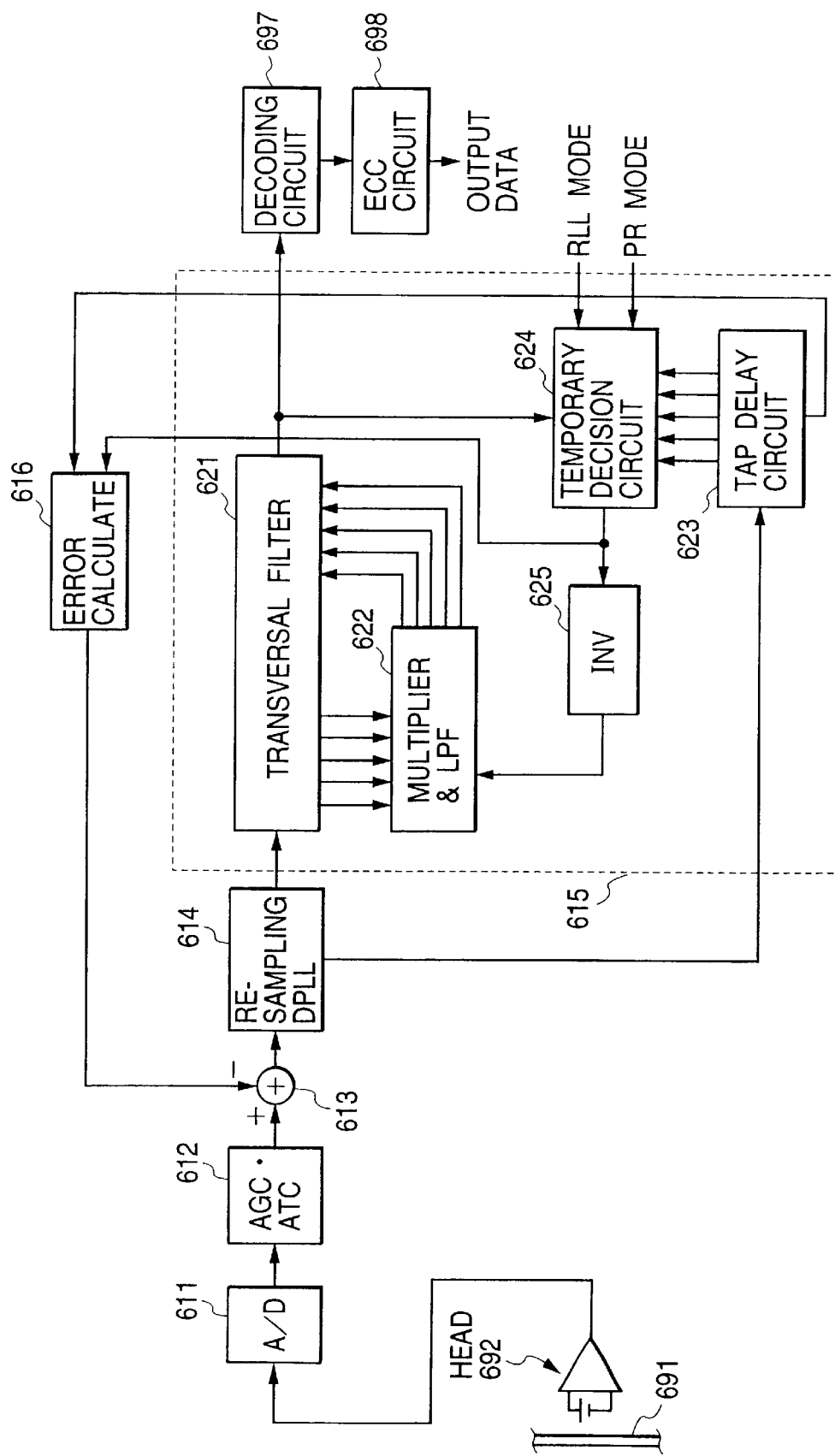
FIG. 44 is a block diagram of a reproducing apparatus according to a twenty-second embodiment of this invention.

FIG. 44 shows a reproducing apparatus according to a twenty-second embodiment of this invention. With reference to FIG. 44, an optical disc 691 stores a signal of a run-length-limited code at a predetermined high recording density. An optical head 692 reads out the signal of the run-length-limited code from the optical disc 691. The optical head 692 outputs the read-out signal to an A/D (analog-to-digital) converter 611. The A/D converter 611 changes the output signal of the optical head 692 into a corresponding digital signal. Specifically, the A/D converter 611 periodically samples the output signal of the optical head 692 in response to a fixed-frequency system clock signal, and converts every resultant sample into a digital sample. The A/D converter 611 outputs the digital signal to a digital AGC&ATC (automatic gain control and automatic threshold control) circuit 612.

The AGC&ATC circuit 612 subjects the output signal of the A/D converter 611 to automatic gain control for providing a constant signal amplitude on a digital basis. The AGC&ATC circuit 612 subjects the AGC-resultant signal to direct-current control on a digital basis which includes ATC (automatic threshold control). The AGC&ATC circuit 612 outputs the resultant digital signal to a subtracter 613. The subtracter 613 receives a signal of a direct-current offset (a DC offset) from an error calculator 616. The device 613 subtracts the DC offset signal from the output signal of the AGC&ATC circuit 612. Thus, the subtracter 613 removes DC offset components from the output signal of the AGC&ATC circuit 612. The subtracter 613 outputs the subtraction-resultant digital signal to a re-sampling DPLL section 614. The output signal of the subtracter 613 is also referred to as a first digital signal.

The re-sampling DPLL section 614 is similar to the re-sampling DPLL section 19 in FIGS. 2 and 16. The re-sampling DPLL section 614 converts the output signal (the first digital signal) of the subtracter 613 into a second digital signal. A timing related to samples of the output signal (the first digital signal) of the subtracter 613 is determined by the system clock signal. A timing related to samples of the second digital signal is determined by a bit clock signal synchronized with the system clock signal.

Most of the timings related to samples of the second digital signal differ from those related to samples of the first digital signal by a phase of, for example, 180°. In general, the bit clock signal is a punctured clock signal and has a frequency equal to that of the system clock signal. The frequency of the bit clock signal may be different from that of the system clock signal. The re-sampling DPLL section 614 generates samples of the second digital signal from samples of the first digital signal through at least one of interpolation and decimation.

The re-sampling DPLL section 614 includes a digital PLL (phase locked loop) circuit having a closed loop. The digital PLL circuit in the re-sampling DPLL section 614 generates a second digital signal on the basis of the output signal of the subtracter 613. The second digital signal relates to a sampling frequency equal to a bit clock frequency. In general, the bit clock signal is a punctured clock signal whose frequency is equal to the system clock frequency. The bit clock frequency may be different from the system clock frequency. Specifically, samples of the second digital signal are generated from samples of the output signal of the subtracter 613 through a PLL re-sampling process based on at least one of interpolation and decimation. The re-sampling DPLL section 614 outputs the second digital signal to an adaptive equalization circuit 615 as the main output signal.

The re-sampling DPLL section 614 includes a zero-cross detector which senses every point (every zero-cross point) at which the first digital signal (or 0°-phase-point data samples) crosses a zero level. The zero-cross detector generates 0-point information representative of every sensed point. In the re-sampling DPLL section 614, the timing of the re-sampling or the frequency and phase of the re-sampling are locked so that the levels represented by zero-cross-point-corresponding samples of the second digital signal will be equal to "0". The re-sampling DPLL section 614 outputs the 0-point information to the adaptive equalization circuit 615 as the sub output signal.

The adaptive equalization circuit 615 is similar to the adaptive equalization circuit 20 in FIGS. 2 and 3. The adaptive equalization circuit 615 subjects the main output signal (the second digital signal) from the re-sampling DPLL section 614 to automatic waveform equalization in response to the 0-point information fed from the re-sampling DPLL section 614, and also in response to an RLL mode signal and a PR mode signal. The automatic waveform equalization corresponds to a process of providing the signal in question with a partial-response (PR) characteristic. The adaptive equalization circuit 615 outputs the equalization-resultant signal to a decoding circuit 697. The decoding circuit 697 recovers original data from the output signal of the adaptive equalization circuit 615 through a viterbi decoding process. The decoding circuit 697 outputs the recovered data to an ECC (error checking and correcting) circuit 698.

The decoding circuit 697 includes a memory loaded with a plurality of candidate recovered data pieces. Also, the decoding circuit 697 includes a section for calculating branch metric values from samples of the output signal of the adaptive equalization circuit 615. Furthermore, the decoding circuit 697 includes a section for accumulating the branch metric values into path metric values respectively. The path metric values relate to the candidate recovered data pieces respectively. In addition, the decoding circuit 697 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 698 extracts an error correction code from the recovered data outputted by the decoding circuit 697. The ECC circuit 698 corrects errors in the recovered data in response to the error correction code. The ECC circuit 698 outputs the resultant recovered data.

The adaptive equalization circuit 615 includes a transversal filter 621, a multiplier and LPF (low pass filter) section 622, a tap delay circuit 623, a temporary decision circuit 624, and an inverter 625. The transversal filter 621 receives the main output signal (the second digital signal) from the re-sampling DPLL section 614. The transversal filter 621 is connected to the multiplier and LPF section 622, the temporary decision circuit 624, and the decoding circuit 697. The multiplier and LPF section 622 is connected to the inverter 625. The tap delay circuit 623 receives the 0-point information from the re-sampling DPLL section 614. The tap delay circuit 623 is connected to the temporary decision circuit 624. The temporary decision circuit 624 is connected to the inverter 625.

The transversal filter 621 subjects the main output signal of the re-sampling DPLL section 614 to PR equalization responsive to tap coefficients. The multiplier and LPF section 622 varies the tap coefficients in response to an output signal of the inverter 625. The tap delay circuit 623 defers or delays the 0-point information by a plurality of different time intervals, and thereby converts the 0-point information into different tap delayed signals. The tap delay circuit 623 outputs the tap delayed signals to the temporary decision circuit 624. The tap delayed signals indicate five successive samples of the 0-point information for every 1-bit-corresponding time interval (every 1-sample-corresponding time interval). The temporary decision circuit 624 receives the output signal of the transversal filter 621. The temporary decision circuit 624 generates an error signal on the basis of the output signal of the transversal filter 621, the tap delayed signals from the tap delay circuit 623, an RLL mode signal, and a PR mode signal. The temporary decision circuit 624 outputs the error signal to the inverter 625. The device 625 inverts the error signal in polarity. The inverter 625 causes negative feedback. The inverter 625 outputs the inversion-resultant error signal to the multiplier and LPF section 622.

The tap delay circuit 623 outputs one of the tap delayed signals, which corresponds to a signal sample of interest, to the error calculator 616 as second 0-point information. The temporary decision circuit 624 outputs the error signal to the error calculator 616.

Figure 45:
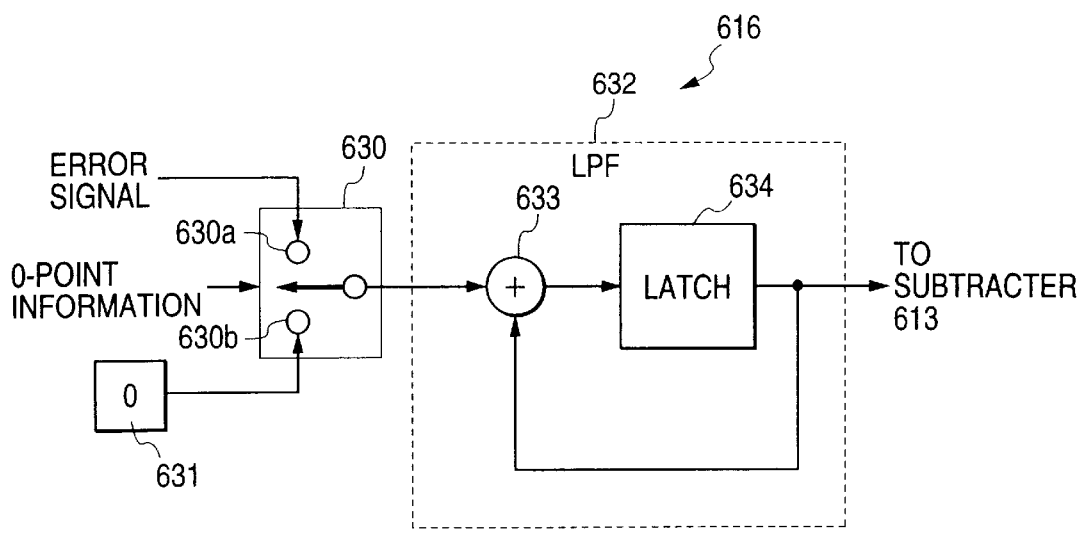
FIG. 45 is a block diagram of an error calculator in FIG. 44.

As shown in FIG. 45, the error calculator 616 includes a switch 630, a "0" generator 631, and a low pass filter 632. A first input side 630*a* of the switch 630 receives the error signal from the temporary decision circuit 624 within the adaptive equalization circuit 615 (see FIG. 44). The "0" generator 631 continuously applies a "0" signal to a second input side 630*b* of the switch 630. The switch 630 has a control terminal receiving the 0-point information from the tap delay circuit 623 within the adaptive equalization circuit 615 (see FIG. 44). The switch 630 selects one of the error signal and the "0" signal in response to the 0-point information, and outputs the selected signal to the low pass filter 632. Specifically, the switch 630 selects the error signal when the 0-point information is "1". The switch 630 selects the "0" signal from the "0" generator 631 when the 0-point information is "0".

The low pass filter 632 has an adder 633 and a latch circuit 634. A first input terminal of the adder 633 receives the output signal of the switch 630. A second input terminal of the adder 633 receives the output signal of the latch circuit 634. The device 633 adds the output signal of the switch 630 and the output signal of the latch circuit 634. The adder 633 outputs the addition-resultant signal to the latch circuit 634. The latch circuit 634 latches the output signal of the adder 633 in response to the bit clock signal. The latch circuit 634 outputs the latched signal to the subtracter 613 and the adder 633. The latch circuit 634 provides a 1-bit-corresponding signal delay (a 1-sample-corresponding signal delay). The low pass filter 632 integrates the output signal of the switch 630 into the DC offset signal. The low pass filter 632 outputs the DC offset signal to the subtracter 613.

As understood from the previous explanation, only signal samples corresponding to zero-cross points are selected by the switch 630, and are used by the low pass filter 632 in generating the DC offset signal.

It should be noted that the subtracter 613 may be moved to a place in the signal propagation path between the re-sampling DPLL section 614 and the transversal filter 621 within the adaptive equalization circuit 615.

Twenty-Third Embodiment

A twenty-third embodiment of this invention is similar to the twenty-second embodiment thereof except that an error calculator 616A replaces the error calculator 616 (see FIGS. 44 and 45).

Figure 46:
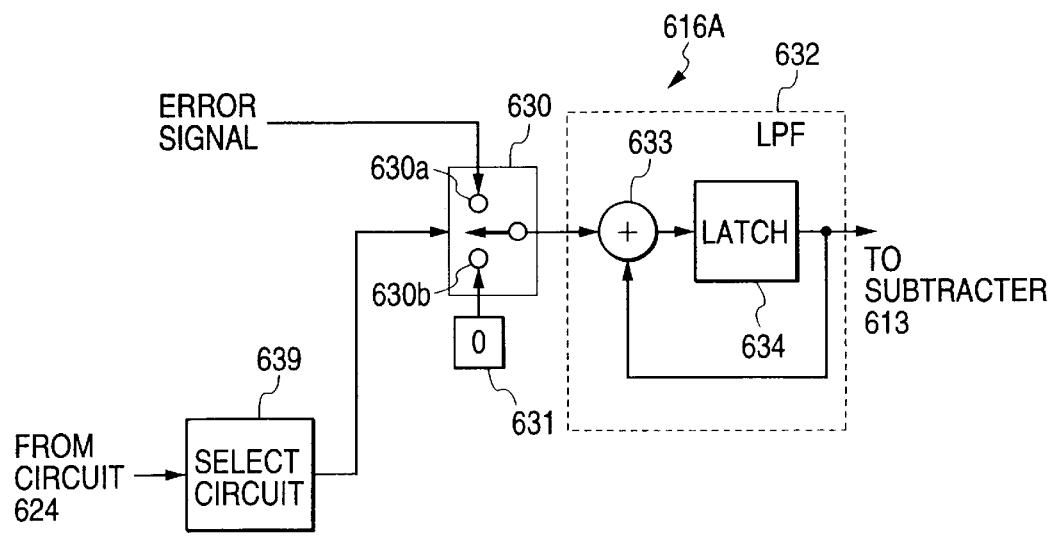
FIG. 46 is a block diagram of an error calculator in a twenty-third embodiment of this invention.

As shown in FIG. 46, the error calculator 616A includes a selection circuit 636. Regarding other points, the error calculator 616A is similar to the error calculator 616 (see FIGS. 44 and 45). The selection circuit 636 receives a temporary decision result signal, that is, a signal representative of a temporary decision value Q, from a temporary decision circuit 624 (see FIG. 44). The output terminal of the selection circuit 636 is connected to a control terminal of a switch 630. When a signal sample of interest corresponds to a zero-cross point, the temporary decision result signal corresponds to the value "0". Otherwise, the temporary decision result signal does not correspond to the value "0". The selection circuit 636 outputs a "1" signal to the control terminal of the switch 630 when the temporary decision result signal corresponds to the value "0". The selection circuit 636 outputs a "0" signal to the control terminal of the switch 630 when the temporary decision result signal does not correspond to the value "0".

The switch 630 receives an error signal from a temporary decision circuit 624 within an adaptive equalization circuit 615 (see FIG. 44). A "0" generator 631 continuously applies a "0" signal to the switch 630. The switch 630 selects one of the error signal and the "0" signal in response to the output signal of the selection circuit 636, and outputs the selected signal to a low pass filter 632.

Specifically, the switch 630 selects the error signal when the output signal of the selection circuit 636 is "1". The switch 630 selects the "0" signal from the "0" generator 631 when the output signal of the selection circuit 636 is "0".

Twenty-Fourth Embodiment

A twenty-fourth embodiment of this invention is similar to the twenty-second embodiment thereof except that an error calculator 616B replaces the error calculator 616 (see FIGS. 44 and 45).

Figure 47:
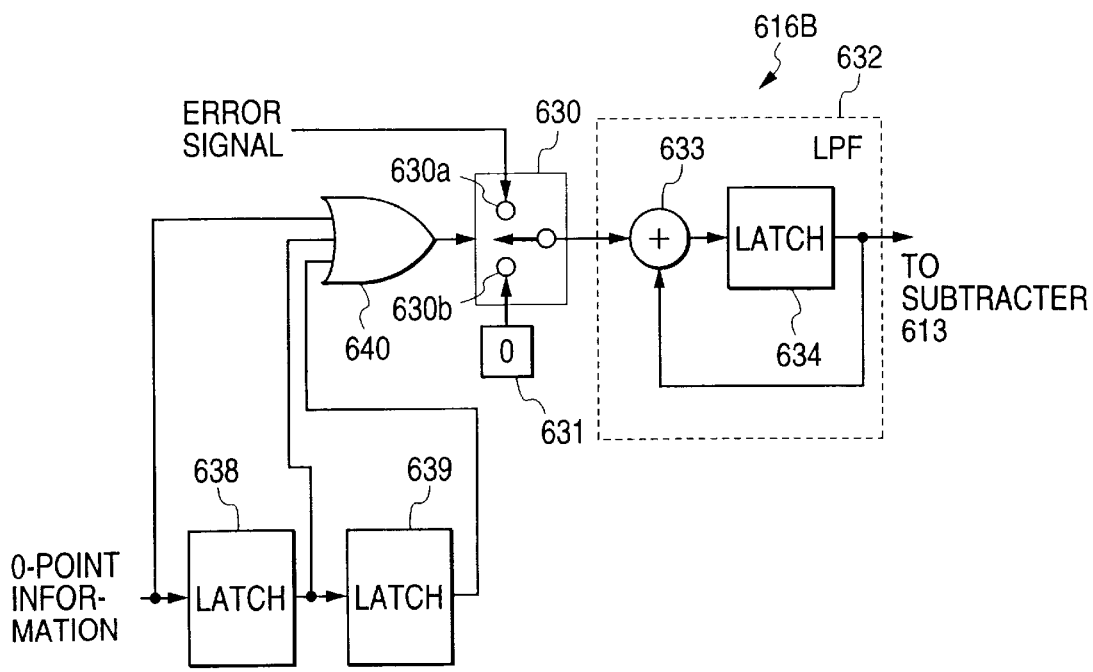
FIG. 47 is a block diagram of an error calculator and a portion of a tap delay circuit in a twenty-fourth embodiment of this invention.

As shown in FIG. 47, the error calculator 616B includes latch circuits 638 and 639, and an OR circuit 640. Regarding other points, the error calculator 616B is similar to the error calculator 616 (see FIGS. 44 and 45). The latch circuit 638 receives 0-point information from a tap delay circuit 623 within an adaptive equalization circuit 615 (see FIG. 44). Also, a first input terminal of the OR circuit 640 is subjected to the 0-point information. The output terminal of the latch circuit 638 is connected to the input terminal of the latch circuit 639 and a second input terminal of the OR circuit 640. The output terminal of the latch circuit 639 is connected to a third input terminal of the OR circuit 640. The output terminal of the OR circuit 640 is connected to a control terminal of a switch 630. The latch circuits 638 and 639 are subjected to a bit clock signal.

The latch circuit 638 delays the 0-point information by a time interval equal to one period of the bit clock signal. The latch circuit 638 outputs the resultant signal to the latch circuit 639 and the OR circuit 640. The latch circuit 639 delays the output signal of the latch circuit 638 by a time interval equal to one period of the bit clock signal. The latch circuit 639 outputs the resultant signal to the OR circuit 640. Accordingly, the OR circuit 640 receives the non-delayed 0-point information, the output signal of the latch circuit 638, and the output signal of the latch circuit 639 which are three successive 1-bit-corresponding segments or three successive samples of the 0-point information. When at least one of the three successive 1-bit-corresponding segments of the 0-point information is "1", the OR circuit 640 outputs a "1" signal to the control terminal of the switch 630. When all of the three successive 1-bit-corresponding segments of the 0-point information are "0", the OR circuit 640 outputs a "0" signal to the control terminal of the switch 630.

The switch 630 receives an error signal from a temporary decision circuit 624 within the adaptive equalization circuit 615 (see FIG. 44). A "0" generator 631 continuously applies a "0" signal to the switch 630. The switch 630 selects one of the error signal and the "0" signal in response to the output signal of the OR circuit 640, and outputs the selected signal to a low pass filter 632. Specifically, the switch 630 selects the error signal when the output signal of the OR circuit 640 is "1". The switch 630 selects the "0" signal from the "0" generator 631 when the output signal of the OR circuit 640 is "0".

As understood from the previous explanation, only signal samples corresponding to zero-cross points, and signal samples immediately preceding and immediately following the zero-cross-point signal samples are selected by the switch 630, and are used by the low pass filter 632 in generating a DC offset signal.

Twenty-Fifth Embodiment

A twenty-fifth embodiment of this invention is similar to the twenty-second embodiment thereof except that an error calculator 616C replaces the error calculator 616 (see FIGS. 44 and 45).

Figure 48:
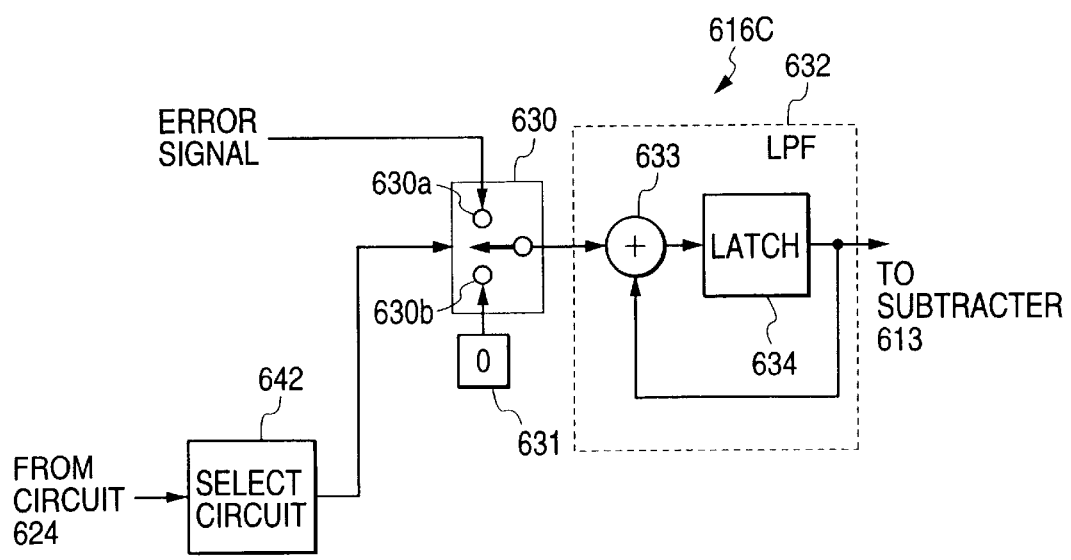
FIG. 48 is a block diagram of an error calculator in a twenty-fifth embodiment of this invention.

As shown in FIG. 48, the error calculator 616C includes a selection circuit 642. Regarding other points, the error calculator 616C is similar to the error calculator 616 (see FIGS. 44 and 45). The selection circuit 642 receives a temporary decision result signal, that is, a signal representative of a temporary decision value Q, from a temporary decision circuit 624 (see FIG. 44). The output terminal of the selection circuit 642 is connected to a control terminal of a switch 630.

The selection circuit 642 operates as follows. In the case of RLL (2, X), when the temporary decision result signal corresponds to the value "0" (the value 0*), the value +b*, or the value −b* , the selection circuit 642 decides that the present value occurs at a zero-cross point or immediately before or after a zero-cross point. Thus, in this case, the selection circuit 642 outputs a "1" signal to the control terminal of the switch 630. When the temporary decision result signal corresponds to a value equal to none of the value "0" (the value 0*), the value +b*, and the value −b*, the selection circuit 642 outputs a "0" signal to the control terminal of the switch 630.

In the case of RLL (1, X), when the temporary decision result signal corresponds to the value "0", the value +(b−a)*, or the value −(b−a)*, the selection circuit 642 decides that the present value occurs at a zero-cross point or immediately before or after a zero-cross point. Thus, in this case, the selection circuit 642 outputs a "1" signal to the control terminal of the switch 630. When the temporary decision result signal corresponds to a value equal to none of the value "0", the value +(b−a)*, and the value −(b−a)*, the selection circuit 642 decides that the present value occurs at a moment remote from zero-cross points. Thus, in this case, the selection circuit 642 outputs a "0" signal to the control terminal of the switch 630.

The switch 630 receives an error signal from a temporary decision circuit 624 within an adaptive equalization circuit 615 (see FIG. 44). A "0" generator 631 continuously applies a "0" signal to the switch 630. The switch 630 selects one of the error signal and the "0" signal in response to the output signal of the selection circuit 642, and outputs the selected signal to a low pass filter 632.

Specifically, the switch 630 selects the error signal when the output signal of the selection circuit 642 is "1". The switch 630 selects the "0" signal from the "0" generator 631 when the output signal of the selection circuit 642 is "0".

Twenty-Sixth Embodiment

Figure 49:
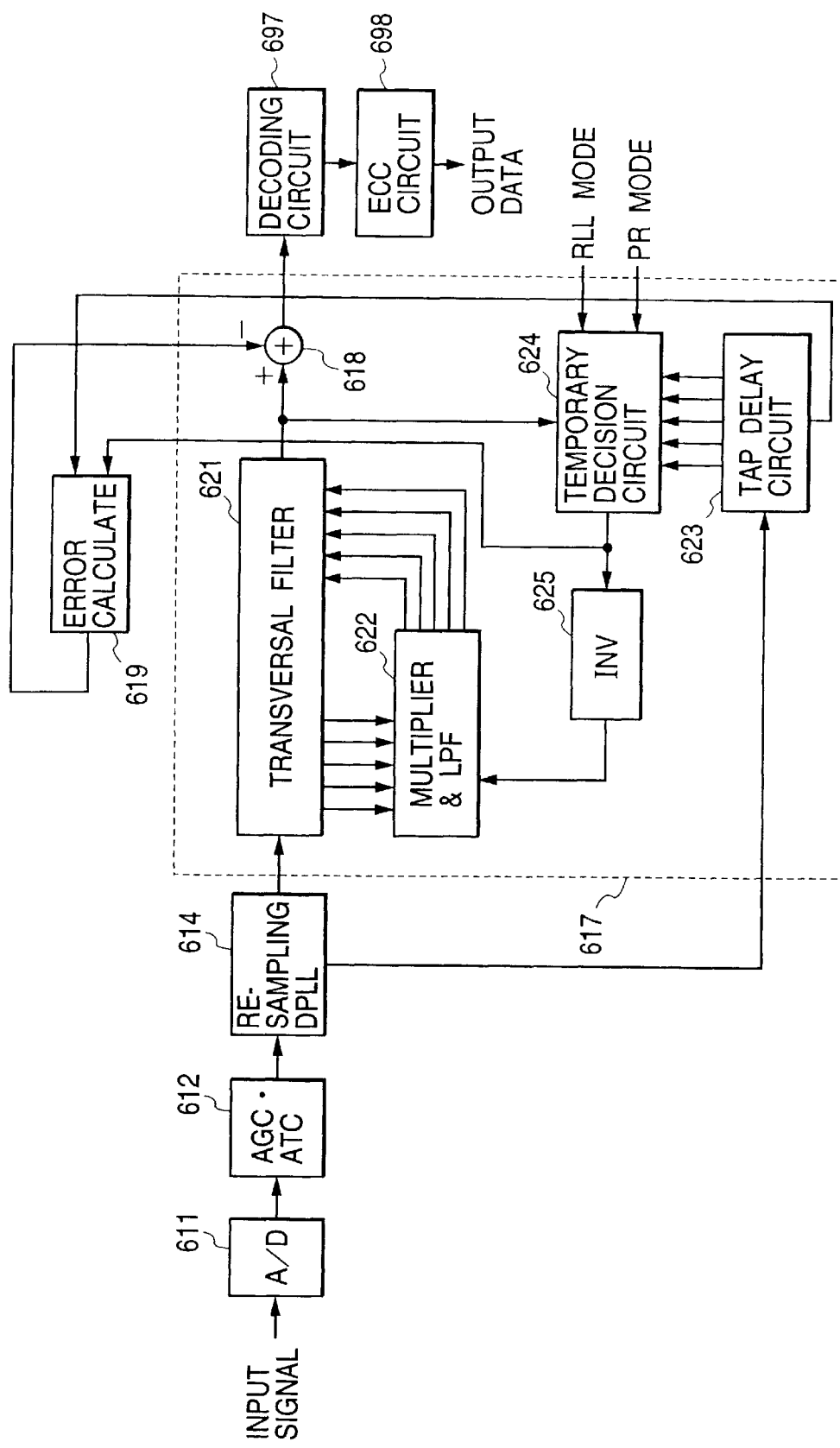
FIG. 49 is a block diagram of a portion of a reproducing apparatus according to a twenty-sixth embodiment of this invention.

FIG. 49 shows a portion of a reproducing apparatus according to a twenty-sixth embodiment of this invention. The reproducing apparatus in FIG. 49 is similar to the reproducing apparatus in FIG. 44 except for design changes mentioned hereinafter.

In the reproducing apparatus of FIG. 49, the output signal of an AGC&ATC circuit 612 is directly fed to a re-sampling DPLL section 614 as a first digital signal. The re-sampling DPLL section 614 generates a second digital signal and 0-point information in response to the first digital signal (the output signal of the AGC&ATC circuit 612). The re-sampling DPLL section 614 outputs the second digital signal to a transversal filter 621 within an adaptive equalization circuit 617 as the main output signal. The re-sampling DPLL section 614 outputs the 0-point information to a tap delay circuit 623 within the adaptive equalization circuit 617 as the sub output signal.

The adaptive equalization circuit 617 includes a subtracter 618. Regarding other points, the adaptive equalization circuit 617 is similar to the adaptive equalization circuit 615 in FIG. 44. The subtracter 618 receives the output signal of the transversal filter 621. The subtracter 618 receives a signal of a direct-current offset (a DC offset) from an error calculator 619. The device 618 subtracts the DC offset signal from the output signal of the transversal filter 621. Thus, the subtracter 618 removes DC offset components from the output signal of the transversal filter 621. The subtracter 618 outputs the subtraction-resultant digital signal to a decoding circuit 697.

The decoding circuit 697 recovers original data from the output signal of the subtracter 618 within the adaptive equalization circuit 617 through a viterbi decoding process. The decoding circuit 697 outputs the recovered data to an ECC (error checking and correcting) circuit 698.

The decoding circuit 697 includes a memory loaded with a plurality of candidate recovered data pieces. Also, the decoding circuit 697 includes a section for calculating branch metric values from samples of the output signal of the subtracter 618 within the adaptive equalization circuit 617. Furthermore, the decoding circuit 697 includes a section for accumulating the branch metric values into path metric values respectively. The path metric values relate to the candidate recovered data pieces respectively. In addition, the decoding circuit 697 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 698 extracts an error correction code from the recovered data outputted by the decoding circuit 697. The ECC circuit 698 corrects errors in the recovered data in response to the error correction code. The ECC circuit 698 outputs the resultant recovered data.

The tap delay circuit 623 within the adaptive equalization circuit 617 outputs one of the tap delayed signals, which corresponds to a signal sample of interest, to the error calculator 619 as second 0-point information. A temporary decision circuit 624 within the adaptive equalization circuit 617 outputs an error signal to the error calculator 619.

The error calculator 619 is similar to the error calculator 616 in FIGS. 44 and 45 or the error calculator 616B in FIG. 47. The error calculator 619 generates the DC offset signal in response to the 0-point information and the error signal fed from the adaptive equalization circuit 617. The error calculator 619 outputs the DC offset signal to the subtracter 618.

Twenty-Seventh Embodiment

Figure 50:
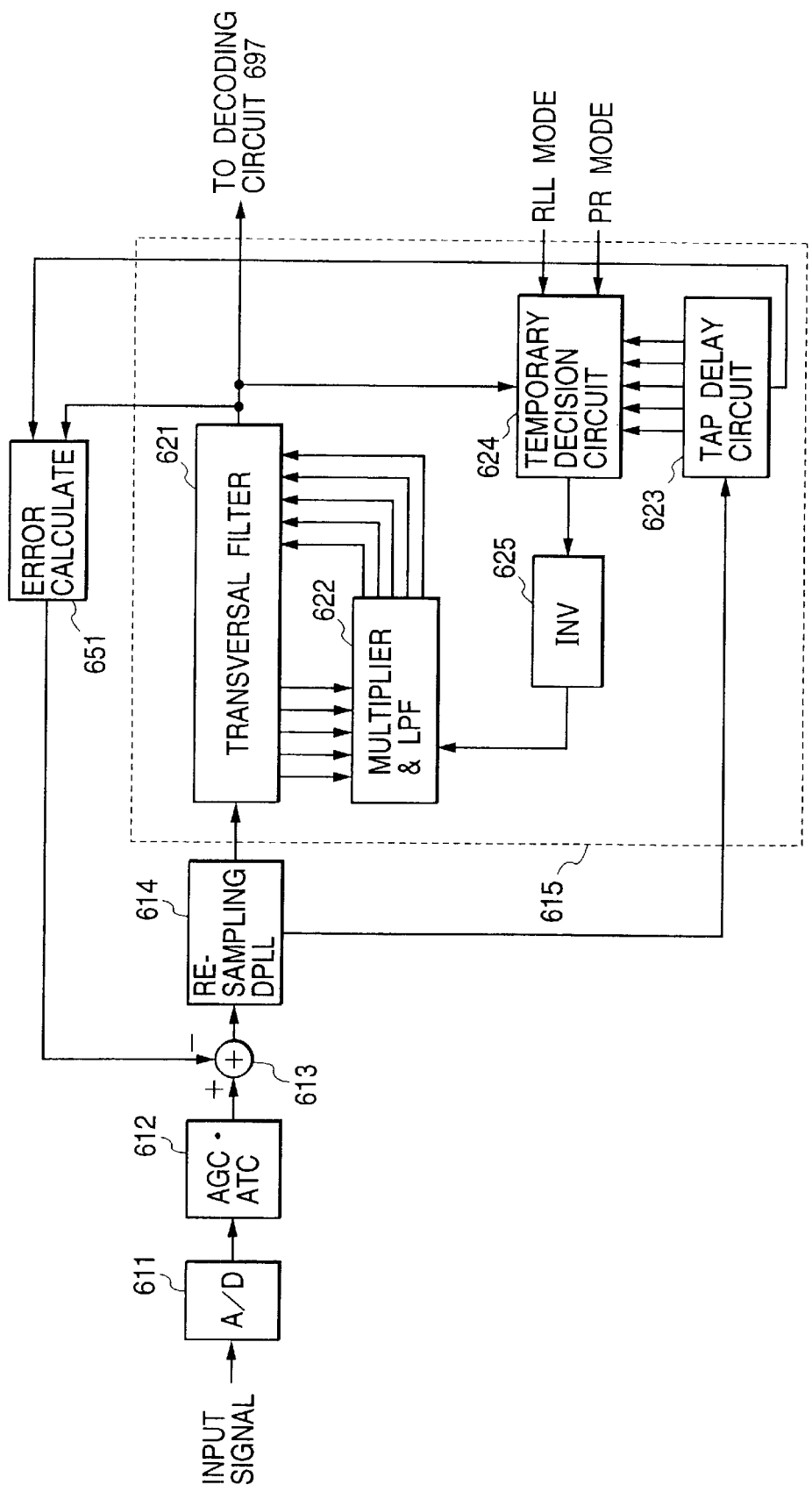
FIG. 50 is a block diagram of a portion of a reproducing apparatus according to a twenty-seventh embodiment of this invention.

FIG. 50 shows a portion of a reproducing apparatus according to a twenty-seventh embodiment of this invention. The reproducing apparatus in FIG. 50 is similar to the reproducing apparatus in FIG. 44 except that an error calculator 651 replaces the error calculator 616 (see FIG. 44).

The error calculator 651 receives 0-point information (second 0-point information) from a tap delay circuit 623 within an adaptive equalization circuit 615. The error calculator 651 receives the output signal of a transversal filter 621 within the adaptive equalization circuit 615. The error calculator 651 extracts DC offset components from the output signal of the transversal filter 621 in response to the 0-point information. The error calculator 651 generates a DC offset signal from the extracted DC offset signal components. The error calculator 651 outputs the DC offset signal to a subtracter 613.

Twenty-Eighth Embodiment

Figure 51:
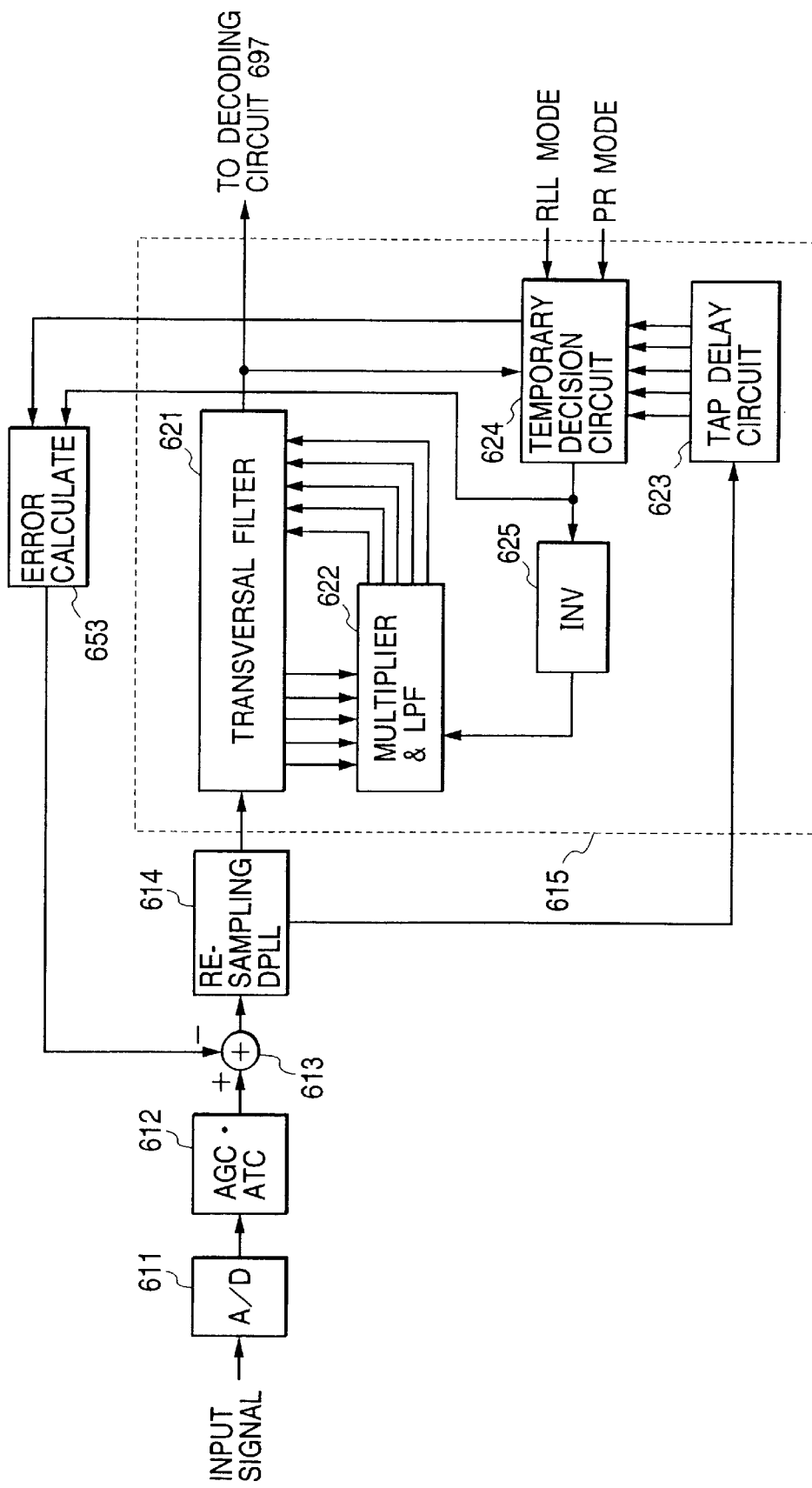
FIG. 51 is a block diagram of a portion of a reproducing apparatus according to a twenty-eighth embodiment of this invention.

FIG. 51 shows a portion of a reproducing apparatus according to a twenty-eighth embodiment of this invention. The reproducing apparatus in FIG. 50 is similar to the reproducing apparatus in FIG. 44 except that an error calculator 653 replaces the error calculator 616 (see FIG. 44). The error calculator 653 is similar to the error calculator 616A in FIG. 46 or the error calculator 616C in FIG. 48.

The error calculator 653 receives an error signal and a temporary decision result signal from a temporary decision circuit 624 within an adaptive equalization circuit 615. The error calculator 653 extracts DC offset components from the error signal in response to the temporary decision result signal. The error calculator 653 generates a DC offset signal from the extracted DC offset signal components. The error calculator 653 outputs the DC offset signal to a subtracter 613.

Twenty-Ninth Embodiment

Figure 52:
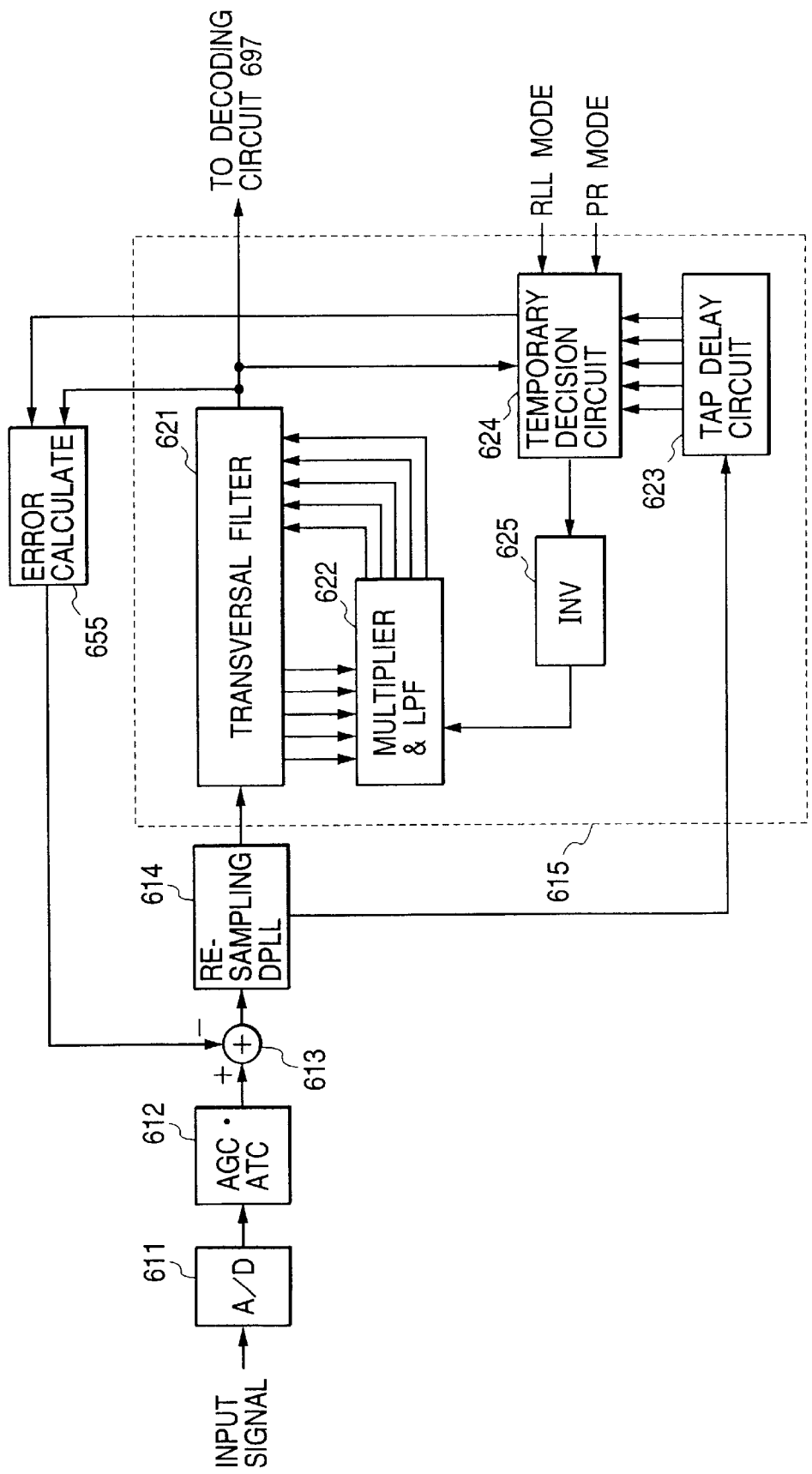
FIG. 52 is a block diagram of a portion of a reproducing apparatus according to a twenty-ninth embodiment of this invention.

FIG. 52 shows a portion of a reproducing apparatus according to a twenty-ninth embodiment of this invention. The reproducing apparatus in FIG. 52 is similar to the reproducing apparatus in FIG. 44 except that an error calculator 655 replaces the error calculator 616 (see FIG. 44). The error calculator 655 is similar to the error calculator 616A in FIG. 46 or the error calculator 616C in FIG. 48.

The error calculator 655 receives a temporary decision result signal from a temporary decision circuit 624 within an adaptive equalization circuit 615. The error calculator 655 receives the output signal of a transversal filter 621 within the adaptive equalization circuit 615. The error calculator 655 extracts DC offset components from the output signal of the transversal filter 621 in response to the temporary decision result signal. The error calculator 655 generates a DC offset signal from the extracted DC offset signal components. The error calculator 655 outputs the DC offset signal to a subtracter 613.

Thirtieth Embodiment

Figure 53:
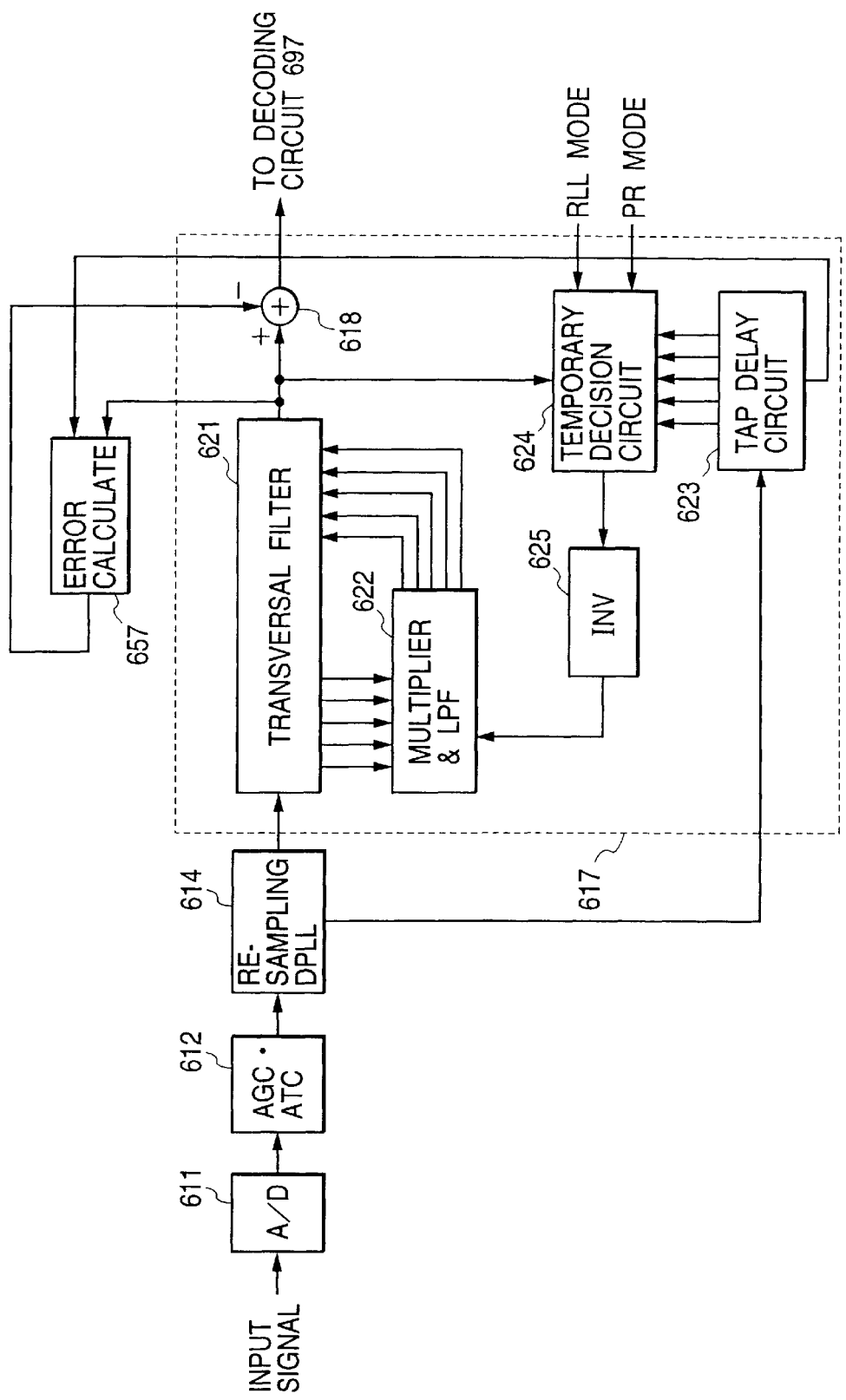
FIG. 53 is a block diagram of a portion of a reproducing apparatus according to a thirtieth embodiment of this invention.

FIG. 53 shows a portion of a reproducing apparatus according to a thirtieth embodiment of this invention. The reproducing apparatus in FIG. 53 is similar to the reproducing apparatus in FIG. 49 except that an error calculator 657 replaces the error calculator 619 (see FIG. 49). The error calculator 657 is similar to the error calculator 651 (see FIG. 50).

The error calculator 657 receives the output signal of a transversal filter 621 within an adaptive equalization circuit 617. In addition, the error calculator 657 receives 0-point information from a tap delay circuit 623 within the adaptive equalization circuit 617. The error calculator 657 extracts DC offset components from the output signal of the transversal filter 621 in response to the 0-point information. The error calculator 657 generates a DC offset signal from the extracted DC offset signal components. The error calculator 657 outputs the DC offset signal to a subtracter 618 within the adaptive equalization circuit 617.

Thirty-First Embodiment

Figure 54:
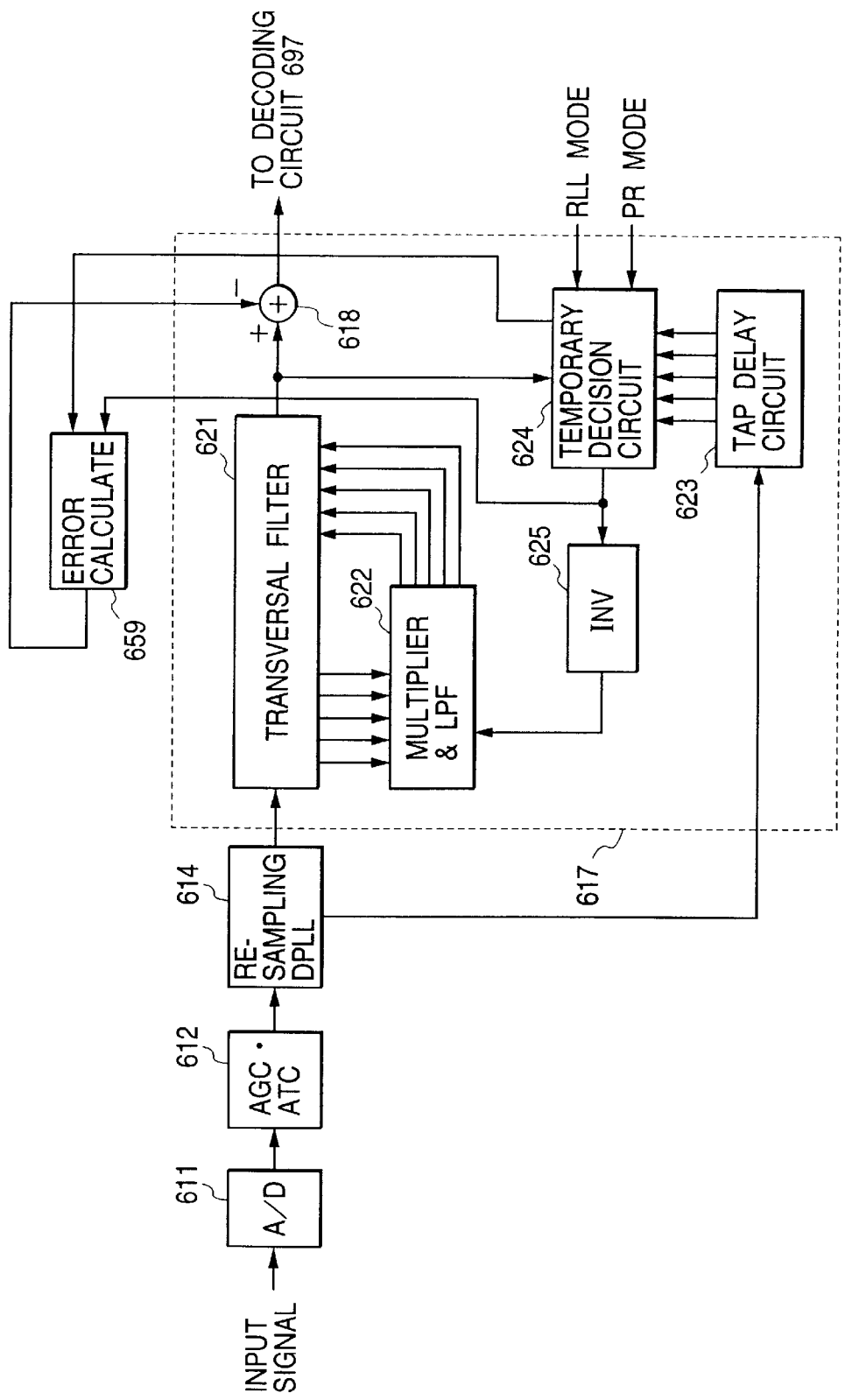
FIG. 54 is a block diagram of a portion of a reproducing apparatus according to a thirty-first embodiment of this invention.

FIG. 54 shows a portion of a reproducing apparatus according to a thirty-first embodiment of this invention. The reproducing apparatus in FIG. 54 is similar to the reproducing apparatus in FIG. 49 except that an error calculator 659 replaces the error calculator 619 (see FIG. 49). The error calculator 659 is similar to the error calculator 653 (see FIG. 51).

The error calculator 659 receives an error signal and a temporary decision result signal from a temporary decision circuit 624 within an adaptive equalization circuit 617. The error calculator 659 extracts DC offset components from the error signal in response to the temporary decision result signal. The error calculator 659 generates a DC offset signal from the extracted DC offset signal components. The error calculator 659 outputs the DC offset signal to a subtracter 618 within the adaptive equalization circuit 617.

Thirty-Second Embodiment

Figure 55:
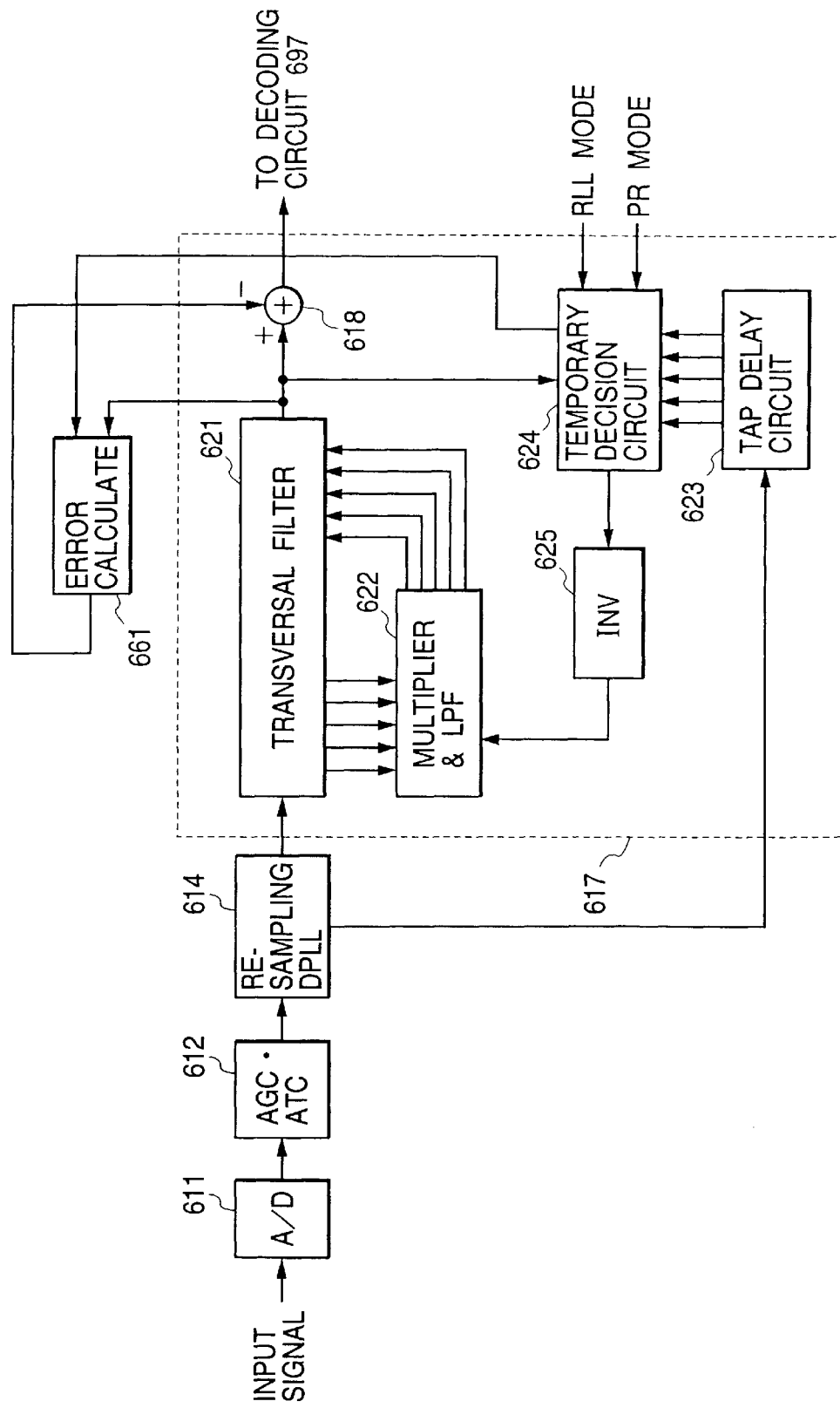
FIG. 55 is a block diagram of a portion of a reproducing apparatus according to a thirty-second embodiment of this invention.

FIG. 55 shows a portion of a reproducing apparatus according to a thirty-second embodiment of this invention. The reproducing apparatus in FIG. 55 is similar to the reproducing apparatus in FIG. 49 except that an error calculator 661 replaces the error calculator 619 (see FIG. 49). The error calculator 661 is similar to the error calculator 655 (see FIG. 52).

The error calculator 661 receives a temporary decision result signal from a temporary decision circuit 624 within an adaptive equalization circuit 617. The error calculator 661 receives the output signal of a transversal filter 621 within the adaptive equalization circuit 617. The error calculator 661 extracts DC offset components from the output signal of the transversal filter 621 in response to the temporary decision result signal. The error calculator 661 generates a DC offset signal from the extracted DC offset signal components. The error calculator 661 outputs the DC offset signal to a subtracter 618 within the adaptive equalization circuit 617.

What is claimed is:

1. A reproducing apparatus comprising:
   first means for reproducing a signal of a run-length-limited code from a recording medium;
   a transversal filter subjecting the signal reproduced by the first means to a partial-response waveform equalization to generate an equalization-resultant signal, the partial-response waveform equalization depending on tap coefficients;
   second means for detecting whether or not the signal reproduced by the first means corresponds to a zero-cross point, and generating 0-point information in response to a result of said detecting;
   a delay circuit responsive to the 0-point information generated by the second means for outputting at least three successive samples of the 0-point information;
   a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;
   third means for calculating a difference between the temporary decision value of the equalization-resultant signal and the actual value thereof, and generating an error signal in response to the calculated difference; and
   fourth means for controlling the tap coefficients of the transversal filter in response to the error signal generated by the third means.

2. A reproducing apparatus as recited in claim 1, wherein at least one of the PR mode signal and the RLL mode signal remains fixed.

3. A reproducing apparatus as recited in claim 1, further comprising fifth means for subjecting the signal reproduced by the first means to a re-sampling process to generate a re-sampling resultant signal, and feeding the re-sampling resultant signal to the transversal filter.

4. A reproducing apparatus comprising:
   first means for reproducing a signal of a run-length-limited code from a recording medium;

a transversal filter subjecting the signal reproduced by the first means to a partial-response waveform equalization to generate an equalization-resultant signal, the partial-response waveform equalization depending on tap coefficients;

second means for detecting whether or not the equalization-resultant signal generated by the transversal filter corresponds to a zero-cross point, and generating 0-point information in response to a result of said detecting;

a delay circuit responsive to the 0-point information generated by the second means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means.

5. A reproducing apparatus as recited in claim 4, wherein the second means comprises means for detecting a polarity inversion of the equalization-resultant signal, means for selecting one of two samples of the equalization-resultant signal which are adjacent to the detected polarity inversion, the selected one of the samples being closer to a value of "0", and means for generating the 0-point information in response to the selected sample.

6. A reproducing apparatus as recited in claim 4, further comprising fifth means for generating a signal representing a phase error between a bit clock signal and the zero-cross point of the equalization-resultant signal.

7. A reproducing apparatus as recited in claim 1, wherein the type of the partial-response waveform equalization which is represented by the PR mode signal is expressed as PR (a, b, b, a), and the successive samples of the 0-point information are three successive samples, and wherein the temporary decision device comprises means for calculating a value P on the basis of the successive samples of the 0-point information, the value P being equal to (a+b)*·G when none of the successive samples of the 0-point information corresponds to a zero-cross point, the value P being equal to (b−a)*·G when each of the successive samples of the 0-point information except a central sample corresponds to a zero-cross point and a minimum transition interval represented by the RLL mode signal is equal to "2", the value P being equal to b*·G when each of the successive samples of the 0-point information except a central sample corresponds to a zero-cross point and the minimum transition interval represented by the RLL mode signal is not equal to "2", the value P being equal to b*·G when only one of the successive samples of the 0-point information except a central sample corresponds to a zero-cross point, means for calculating the temporary decision value on the basis of the calculated value P, and means for setting the temporary decision value equal to "0" when the central sample among the successive samples of the 0-point information corresponds to a zero-cross point, where "*" denotes related values resulting from offset to equalize a central value (a+b) to "0", and G denotes a gain factor.

8. A reproducing apparatus as recited in claim 1, wherein the type of the partial-response waveform equalization which is represented by the PR mode signal is expressed as PR (a, b, b, a), and the successive samples of the 0-point information are five successive samples, and wherein the temporary decision device comprises means for calculating a value P on the basis of the successive samples of the 0-point information, the value P being equal to (a+b)*·G when none of second, third, and fourth samples among the successive samples of the 0-point information corresponds to a zero-cross point, the value P being equal to (b−a)*·G when only second and fourth samples among the successive samples of the 0-point information correspond to zero-cross points and a minimum transition interval represented by the RLL mode signal is equal to "2", the value P being equal to b*·G when only second and fourth samples among the successive samples of the 0-point information correspond to zero-cross points and the minimum transition interval represented by the RLL mode signal is not equal to "2", the value P being equal to b*·G when only one of second and fourth samples among the successive samples of the 0-point information corresponds to a zero-cross point, the value P being equal to b*·G when only first and fourth samples among the successive samples of the 0-point information corresponds to a zero-cross point, the value P being equal to b*·G when only second and fifth samples among the successive samples of the 0-point information corresponds to a zero-cross point, means for calculating the temporary decision value on the basis of the calculated value P, and means for setting the temporary decision value equal to "0" when a central sample among the successive samples of the 0-point information corresponds to a zero-cross point, where "*" denotes related values resulting from offset to equalize a central value (a+b) to "0", and G denotes a gain factor.

9. A reproducing apparatus as recited in claim 1, further comprising an error selection circuit for extracting effective components from the first error signal in response to the temporary decision value, and generating a second error signal in response to the extracted effective components.

10. A reproducing apparatus as recited in claim 1, further comprising an error selection circuit for extracting effective components from the first error signal in response to the successive samples of the 0-point information, and generating a second error signal in response to the extracted effective components.

11. A reproducing apparatus as recited in claim 1, wherein the type of the partial-response waveform equalization which is represented by the PR mode signal is expressed as PR (a, b, b, a), and the successive samples of the 0-point information are three successive samples, and wherein the temporary decision device comprises means for calculating a value P on the basis of the successive samples of the 0-point information, the value P being equal to (b−a)*·G when each of the successive samples of the 0-point information except a central sample corresponds to a zero-cross point and a minimum transition interval represented by the RLL mode signal is equal to "2", the value P being equal to b*·G when each of the successive samples of the 0-point information except a central sample corresponds to a zero-cross point and the minimum transition interval represented by the RLL mode signal is not equal to "2", the value P being equal to b*·G when only one of the successive samples of the 0-point information except a central sample corresponds to a zero-cross point, means for calculating the temporary decision value on the basis of the calculated value P, means for setting the temporary decision value equal to "0" when none of the successive samples of the 0-point information corresponds to a zero-cross point, and means for setting the temporary decision value equal to "0" when the central sample among the successive samples of the 0-point information corresponds to a zero-cross point, where "*" denotes related values resulting from offset to equalize a central value (a+b) to "0", and G denotes a gain factor.

12. A reproducing apparatus as recited in claim 1, wherein the type of the partial-response waveform equalization which is represented by the PR mode signal is expressed as PR (a, b, b, a), and the successive samples of the 0-point information are five successive samples, and wherein the temporary decision device comprises means for calculating a value P on the basis of the successive samples of the 0-point information, the value P being equal to (b−a)*·G when only second and fourth samples among the successive samples of the 0-point information correspond to zero-cross points and a minimum transition interval represented by the RLL mode signal is equal to "2", the value P being equal to b*·G when only second and fourth samples among the successive samples of the 0-point information correspond to zero-cross points and the minimum transition interval represented by the RLL mode signal is not equal to "2", the value P being equal to b*·G when only one of second and fourth samples among the successive samples of the 0-point information corresponds to a zero-cross point, the value P being equal to b*·G when only first and fourth samples among the successive samples of the 0-point information corresponds to a zero-cross point, the value P being equal to b*·G when only second and fifth samples among the successive samples of the 0-point information corresponds to a zero-cross point, means for calculating the temporary decision value on the basis of the calculated value P, means for setting the temporary decision value equal to "0" when none of second, third, and fourth samples among the successive samples of the 0-point information corresponds to a zero-cross point, and means for setting the temporary decision value equal to "0" when a central sample among the successive samples of the 0-point information corresponds to a zero-cross point, where "*" denotes related values resulting from offset to equalize a central value (a+b) to "0", and G denotes a gain factor.

13. A reproducing apparatus as recited in claim 1, further comprising a first memory into which the signal reproduced by the first means is written in response to a bit clock signal, and from which the reproduced signal is read out in response to a new clock signal before being fed to the transversal filter, and a second memory into which the 0-point information generated by the second means is written in response to the bit clock signal, and from which the 0-point information is read out in response to a new clock signal before being fed to the delay circuit.

14. A reproducing apparatus as recited in claim 4, further comprising a memory into which the signal reproduced by the first means is written in response to a bit clock signal, and from which the reproduced signal is read out in response to a new clock signal before being fed to the transversal filter.

15. A reproducing apparatus comprising:
first means for reproducing a signal of a run-length-limited code from a recording medium;
a subtracter for subtracting a DC offset signal from the signal reproduced by the first means to generate a subtraction-resultant signal;
second means for subjecting the subtraction-resultant signal generated by the subtracter to a re-sampling process to generate a re-sampling resultant signal;
third means for detecting whether or not the re-sampling resultant signal generated by the second means corresponds to a zero-cross point, and generating 0-point information in response to a result of said detecting; and
an error calculator for selecting some signals from the re-sampling resultant signal in response to the 0-point information generated by the third means, and extracting 0-corresponding components and generating the DC offset signal in response to the selected 0-corresponding components and outputting the DC offset signal to the subtracter.

16. A reproducing apparatus comprising:
first means for reproducing a signal of a run-length-limited code from a recording medium;
second means for subjecting the signal reproduced by the first means to a re-sampling process to generate a re-sampling resultant signal;
a subtracter for subtracting a DC offset signal from the re-sampling resultant signal generated by the second means to generate a subtraction-resultant signal;
a transversal filter subjecting the subtraction-result signal generated by the subtracter to a partial-response waveform equalization to generate an equalization-resultant signal;
third means for detecting whether or not the re-sampling resultant signal generated by the second means corresponds to a zero-cross point, and generating 0-point information in response to a result of said detecting; and
an error calculator for selecting 0-corresponding components from the re-sampling resultant signal in response to the 0-point information generated by the third means, and generating the DC offset signal in response to the selected 0-corresponding components and outputting the DC offset signal to the subtracter.

17. A reproducing apparatus comprising:
first means for reproducing a signal of a run-length-limited code from a recording medium;
a subtracter for subtracting a DC offset signal from the signal reproduced by the first means to generate a subtraction-resultant signal;
second means for subjecting the subtraction-resultant signal generated by the subtracter to a re-sampling process to generate a re-sampling resultant signal;
a transversal filter subjecting the re-sampling resultant signal generated by the second means to a partial-response waveform equalization to generate an equalization-resultant signal, the partial-response waveform equalization depending on tap coefficients;
third means for detecting whether or not the re-sampling resultant signal corresponds to a zero-cross point, and generating 0-point information in response to a result of said detecting;
a delay circuit responsive to the 0-point information generated by the third means for outputting at least three successive samples of the 0-point information;
a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the error signal in response to one of the successive samples of the 0-point information, and generating the DC offset signal in response to the selected 0-corresponding components and outputting the DC offset signal to the subtracter.

18. A reproducing apparatus comprising:

first means for reproducing a signal of a run-length-limited code from a recording medium;

second means for subjecting the signal reproduced by the first means to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

a subtracter for subtracting a DC offset signal from the equalization-resultant signal generated by the transversal filter to generate a subtraction-resultant signal;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the error signal in response to one of the successive samples of the 0-point information, and generating the DC offset signal in response to the selected 0-corresponding components and outputting the DC offset signal to the subtracter.

19. A reproducing apparatus comprising:

first means for reproducing a signal of a run-length-limited code from a recording medium;

a subtracter for subtracting a DC offset signal from the signal reproduced by the first means to generate a subtraction-resultant signal;

second means for subjecting the subtraction-resultant signal generated by the subtracter to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the error signal in response to the temporary decision value, and generating the DC offset signal in response to the selected 0-corresponding components and outputting the DC offset signal to the subtracter.

20. A reproducing apparatus comprising:

first means for reproducing a signal of a run-length-limited code from a recording medium;

second means for subjecting the signal reproduced by the first means to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

a subtracter for subtracting a DC offset signal from the equalization-resultant signal generated by the transversal filter to generate a subtraction-resultant signal;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the error signal in response to the temporary decision value, and generating the DC offset signal in response to the selected 0-corresponding components and outputting the DC offset signal to the subtracter.

21. A reproducing apparatus comprising:

first means for reproducing a signal of a run-length-limited code from a recording medium;

a subtracter for subtracting a DC offset signal from the signal reproduced by the first means to generate a subtraction-resultant signal;

second means for subjecting the subtraction-resultant signal generated by the subtracter to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the equalization-resultant signal in response to at least one of the successive samples of the 0-point information, and generating the DC offset signal in response to the selected 0-corresponding components and outputting the DC offset signal to the subtracter.

22. A reproducing apparatus comprising:

first means for reproducing a signal of a run-length-limited code from a recording medium;

second means for subjecting the signal reproduced by the first means to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

a subtracter for subtracting a DC offset signal from the equalization-resultant signal generated by the transversal filter to generate a subtraction-resultant signal;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the equalization-resultant signal in response to one of the successive samples of the 0-point information, and generating the DC offset signal in response to the selected 0-corresponding components and outputting the DC offset signal to the subtracter.

23. A reproducing apparatus comprising:

first means for reproducing a signal of a run-length-limited code from a recording medium;

a subtracter for subtracting a DC offset signal from the signal reproduced by the first means to generate a subtraction-resultant signal;

second means for subjecting the subtraction-resultant signal generated by the subtracter to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the equalization-resultant signal in response to the temporary decision value, and generating the DC offset signal in response to the selected 0-corresponding components and outputting the DC offset signal to the subtracter.

24. A reproducing apparatus comprising:

first means for reproducing a signal of a run-length-limited code from a recording medium;

second means for subjecting the signal reproduced by the first means to a re-sampling process to generate a re-sampling resultant signal;

a transversal filter subjecting the re-sampling resultant signal generated by the second means to a partial-response waveform equalization to generate an equalization-resultant signal, the partial-response waveform equalization depending on tap coefficients;

a subtracter for subtracting a DC offset signal from the equalization-resultant signal generated by the transversal filter to generate a subtraction-resultant signal;

third means for detecting whether or not the re-sampling resultant signal corresponds to a zero-cross point, and generating 0-point information in response to a result of said detecting;

a delay circuit responsive to the 0-point information generated by the third means for outputting at least three successive samples of the 0-point information;

a temporary decision device for calculating a temporary decision value of the equalization-resultant signal on the basis of a PR mode signal, an RLL mode signal, the successive samples of the 0-point information which are outputted from the delay circuit, and an actual value of the equalization-resultant signal, the PR mode signal representing a type of the partial-response waveform equalization, the RLL mode signal representing a type of the run-length-limited code;

fourth means for calculating a difference between the temporary decision value of the equalization-resultant signal and the actual value thereof, and generating an error signal in response to the calculated difference;

fifth means for controlling the tap coefficients of the transversal filter in response to the error signal generated by the fourth means; and an error calculator for selecting 0-corresponding components from the equalization-resultant signal in response to the temporary decision value, and generating the DC offset signal in response to the selected 0-corresponding components and outputting the DC offset signal to the subtracter.

* * * * *